(12) United States Patent
Vinciarelli et al.

(10) Patent No.: US 10,199,950 B1
(45) Date of Patent: Feb. 5, 2019

(54) POWER DISTRIBUTION ARCHITECTURE WITH SERIES-CONNECTED BUS CONVERTER

(71) Applicant: VLT, INC., Sunnyvale, CA (US)

(72) Inventors: Patrizio Vinciarelli, Boston, MA (US); Andrew D'Amico, Marina Del Rey, CA (US)

(73) Assignee: VLT, Inc., Sunnyvale, CA (US)

( * ) Notice: Subject to any disclaimer, the term of this patent is extended or adjusted under 35 U.S.C. 154(b) by 850 days.

(21) Appl. No.: 13/933,252

(22) Filed: Jul. 2, 2013

(51) Int. Cl.
*H02M 3/335* (2006.01)

(52) U.S. Cl.
CPC ... *H02M 3/33576* (2013.01); *H02M 3/33561* (2013.01)

(58) Field of Classification Search
CPC .................................................. H02M 3/33561
USPC ............................................................ 307/82
See application file for complete search history.

(56) References Cited

U.S. PATENT DOCUMENTS

| 443,441 | A | 12/1890 | Hanson |
| 1,181,803 | A | 5/1916 | Sargent |
| 2,042,274 | A | 5/1936 | Pollack |
| 2,497,534 | A | 2/1950 | Campbell |
| 2,852,730 | A | 9/1958 | Magnuski |
| 2,902,862 | A | 9/1959 | Twiford |
| 2,953,738 | A | 9/1960 | Bright |

(Continued)

FOREIGN PATENT DOCUMENTS

| CA | 1 181 803 | 1/1985 |
| CA | 2 042 274 | 12/1991 |

(Continued)

OTHER PUBLICATIONS

Cobos, J.A. et al. "Low Output Voltage DC/DC Conversion". 1994 IEEE, pp. 1676-1681.

(Continued)

*Primary Examiner* — Joseph Chang
(74) *Attorney, Agent, or Firm* — Foley & Lardner LLP

(57) ABSTRACT

Apparatus for power conversion are provided. One apparatus includes a power converter including an input circuit and an output circuit. The power converter is configured to receive power from a source for providing power at a DC source voltage $V_S$. The power converter is adapted to convert power from the input circuit to the output circuit at a substantially fixed voltage transformation ratio $K_{DC}=V_{OUT}/V_{IN}$ at an output current, wherein $V_{IN}$ is an input voltage and $V_{OUT}$ is an output voltage. The input circuit and at least a portion of the output circuit are connected in series across the source, such that an absolute value of the input voltage $V_{IN}$ applied to the input circuit is approximately equal to the absolute value of the DC source voltage $V_S$ minus a number N times the absolute value of the output voltage $V_{OUT}$, where N is at least 1.

40 Claims, 7 Drawing Sheets

(56) References Cited

U.S. PATENT DOCUMENTS

| | | |
|---|---|---|
| 3,008,068 A | 11/1961 | Wilting et al. |
| 3,008,506 A | 11/1961 | Hicks |
| 3,029,398 A | 4/1962 | McComb |
| 3,083,328 A | 3/1963 | Mallery et al. |
| 3,141,140 A | 7/1964 | Rich |
| 3,146,406 A | 8/1964 | Wilting |
| 3,161,837 A | 12/1964 | Lloyd |
| 3,174,042 A | 3/1965 | White |
| 3,229,111 A | 1/1966 | Schumacher et al. |
| 3,241,035 A | 3/1966 | Rhyne, Jr. |
| 3,295,042 A | 12/1966 | Evalds et al. |
| 3,307,073 A | 2/1967 | McLaughlin |
| 3,313,996 A | 4/1967 | Lingle |
| 3,343,073 A | 9/1967 | Mesenhimer |
| 3,400,325 A | 9/1968 | Webb |
| 3,435,375 A | 3/1969 | Miller, Jr. |
| 3,443,194 A | 5/1969 | Cielo |
| 3,448,370 A | 6/1969 | Harrigan |
| 3,454,853 A | 7/1969 | Hawkins et al. |
| 3,458,798 A | 7/1969 | Fang et al. |
| 3,459,957 A | 8/1969 | Kelley |
| 3,471,747 A | 10/1969 | Gershen |
| 3,495,157 A | 2/1970 | Nercessian |
| 3,506,908 A | 4/1970 | Resch |
| 3,514,692 A | 5/1970 | Lingle |
| 3,517,301 A | 6/1970 | Huber |
| 3,553,428 A | 1/1971 | McGhee |
| 3,564,393 A | 2/1971 | Williamson |
| 3,569,818 A | 3/1971 | Dahlinger et al. |
| 3,573,483 A | 4/1971 | White |
| 3,573,494 A | 4/1971 | Houpt et al. |
| 3,573,508 A | 4/1971 | Harris |
| 3,573,544 A | 4/1971 | Zonis et al. |
| 3,573,597 A | 4/1971 | Genuit et al. |
| 3,579,026 A | 5/1971 | Paget |
| 3,581,186 A | 5/1971 | Weinberger |
| 3,582,754 A | 6/1971 | Hoffmann et al. |
| 3,582,758 A | 6/1971 | Gunn |
| 3,584,289 A | 6/1971 | Bishop et al. |
| 3,588,595 A | 6/1971 | Silvers |
| 3,599,073 A | 8/1971 | Wilson et al. |
| 3,604,920 A | 9/1971 | Niles |
| 3,619,713 A | 11/1971 | Biega et al. |
| 3,629,648 A | 12/1971 | Brown |
| 3,629,725 A | 12/1971 | Chun |
| 3,638,099 A | 1/1972 | Centala |
| 3,643,152 A | 2/1972 | Matsumura et al. |
| 3,646,395 A | 2/1972 | De Pratti |
| 3,657,631 A | 4/1972 | Martens et al. |
| 3,660,672 A | 5/1972 | Berger et al. |
| 3,663,941 A | 5/1972 | Pasciutti |
| 3,665,203 A | 5/1972 | Barnett et al. |
| 3,668,508 A | 6/1972 | Archer et al. |
| 3,684,891 A | 8/1972 | Sieron |
| 3,696,286 A | 10/1972 | Ule |
| 3,704,381 A | 11/1972 | Nercessian |
| 3,710,231 A | 1/1973 | Baker |
| 3,714,545 A | 1/1973 | Chiffert |
| 3,733,538 A | 5/1973 | Kernick et al. |
| 3,735,235 A | 5/1973 | Hamilton et al. |
| 3,737,755 A | 6/1973 | Calkin et al. |
| 3,742,242 A | 6/1973 | Morio et al. |
| 3,743,861 A | 7/1973 | Bolmgren |
| 3,751,676 A | 8/1973 | Igarashi et al. |
| 3,753,071 A | 8/1973 | Engel et al. |
| 3,753,076 A | 8/1973 | Zelina |
| 3,754,177 A | 8/1973 | O'Reilly |
| 3,757,195 A | 9/1973 | Sklaroof |
| 3,769,545 A | 10/1973 | Crane |
| 3,771,040 A | 11/1973 | Fletcher et al. |
| 3,781,505 A | 12/1973 | Steigerwald |
| 3,781,638 A | 12/1973 | Anderson et al. |
| 3,787,730 A | 1/1974 | Ray et al. |
| 3,805,094 A | 4/1974 | Orlando |
| 3,816,810 A | 6/1974 | Friedman et al. |
| 3,818,237 A | 6/1974 | Straus |
| 3,818,312 A | 6/1974 | Luursema et al. |
| 3,820,008 A | 6/1974 | Guarnaschelli |
| 3,824,450 A | 7/1974 | Johnson et al. |
| 3,845,404 A | 10/1974 | Trilling |
| 3,848,175 A | 11/1974 | Demarest |
| 3,851,240 A | 11/1974 | Park et al. |
| 3,851,278 A | 11/1974 | Isono |
| 3,859,638 A | 1/1975 | Hume, Jr. |
| 3,873,846 A | 3/1975 | Morio et al. |
| 3,879,647 A | 4/1975 | Hamilton et al. |
| 3,879,652 A | 4/1975 | Billings |
| 3,904,950 A | 9/1975 | Judd et al. |
| 3,909,695 A | 9/1975 | Peck |
| 3,909,700 A | 9/1975 | Ferro |
| 3,912,940 A | 10/1975 | Vince |
| 3,913,002 A | 10/1975 | Steigerwald et al. |
| 3,913,036 A | 10/1975 | Hook |
| 3,916,289 A | 10/1975 | Lynch |
| 3,919,656 A | 11/1975 | Sokal |
| 3,927,363 A | 12/1975 | Mitchell et al. |
| 3,930,196 A | 12/1975 | Park et al. |
| 3,932,764 A | 1/1976 | Corey |
| 3,938,024 A | 2/1976 | Clarke |
| 3,940,682 A | 2/1976 | Park et al. |
| 3,949,238 A | 4/1976 | Brookes |
| 3,959,716 A | 5/1976 | Gilbert, Jr. et al. |
| 3,974,397 A | 8/1976 | Killough, Jr. |
| 3,976,932 A | 8/1976 | Collins |
| 3,986,052 A | 10/1976 | Hunter |
| 3,986,097 A | 10/1976 | Woods |
| 3,989,995 A | 11/1976 | Peterson |
| 3,991,319 A | 11/1976 | Servos et al. |
| 4,005,335 A | 1/1977 | Perper |
| 4,007,413 A | 2/1977 | Fisher et al. |
| 4,010,381 A | 3/1977 | Fickenscher et al. |
| 4,011,518 A | 3/1977 | Irvine et al. |
| 4,017,746 A | 4/1977 | Miller |
| 4,017,783 A | 4/1977 | Assow et al. |
| 4,017,784 A | 4/1977 | Simmons et al. |
| 4,027,228 A | 5/1977 | Collins |
| 4,037,271 A | 7/1977 | Keller |
| 4,044,268 A | 8/1977 | Hammel et al. |
| 4,051,445 A | 9/1977 | Boschert |
| 4,058,369 A | 11/1977 | Bentley et al. |
| 4,060,757 A | 11/1977 | McMurray |
| 4,066,945 A | 1/1978 | Korte, Jr. |
| 4,074,182 A | 2/1978 | Weischedel |
| 4,078,247 A | 3/1978 | Albrecht |
| 4,104,539 A | 8/1978 | Hase |
| 4,106,084 A | 8/1978 | Gibert |
| 4,109,192 A | 8/1978 | Burbank et al. |
| 4,114,048 A | 9/1978 | Hull et al. |
| 4,115,704 A | 9/1978 | Hannemann et al. |
| 4,122,359 A | 10/1978 | Breikss |
| 4,126,793 A | 11/1978 | de Vries |
| 4,128,868 A | 12/1978 | Gamble |
| 4,131,860 A | 12/1978 | Fyot |
| 4,140,959 A | 2/1979 | Powell |
| 4,150,423 A | 4/1979 | Boschert |
| 4,177,389 A | 12/1979 | Schott |
| 4,184,197 A | 1/1980 | Cuk et al. |
| 4,187,458 A | 2/1980 | Milberger et al. |
| 4,194,147 A | 3/1980 | Payne et al. |
| 4,205,368 A | 5/1980 | Erche et al. |
| 4,207,475 A | 6/1980 | Nercessian |
| 4,208,594 A | 6/1980 | Guicheteau |
| 4,208,706 A | 6/1980 | Suzuki et al. |
| 4,209,710 A | 6/1980 | Quarton |
| 4,210,858 A | 7/1980 | Ford et al. |
| 4,210,958 A | 7/1980 | Ikenoue |
| 4,238,690 A | 12/1980 | Clarke |
| 4,238,691 A | 12/1980 | Ebert, Jr. |
| 4,241,261 A | 12/1980 | Ebert, Jr. |
| 4,245,194 A | 1/1981 | Fahlen et al. |
| 4,245,286 A | 1/1981 | Paulkovich et al. |
| 4,251,857 A | 2/1981 | Shelly |
| 4,253,136 A | 2/1981 | Nanko |
| 4,254,459 A | 3/1981 | Belson |

(56) References Cited

U.S. PATENT DOCUMENTS

| | | |
|---|---|---|
| 4,257,087 A | 3/1981 | Cuk |
| 4,257,089 A | 3/1981 | Ravis |
| 4,262,214 A | 4/1981 | Patel |
| 4,268,476 A | 5/1981 | Raible |
| 4,270,164 A | 5/1981 | Wyman et al. |
| 4,270,165 A | 5/1981 | Carpenter et al. |
| 4,272,806 A | 6/1981 | Metzger |
| 4,274,133 A | 6/1981 | Cuk et al. |
| 4,275,317 A | 6/1981 | Frosch |
| 4,276,594 A | 6/1981 | Morley |
| 4,277,726 A | 7/1981 | Burke |
| 4,277,728 A | 7/1981 | Stevens |
| 4,288,739 A | 9/1981 | Nercessian |
| 4,288,865 A | 9/1981 | Graham |
| 4,292,581 A | 9/1981 | Tan |
| 4,293,902 A | 10/1981 | White |
| 4,293,904 A | 10/1981 | Brooks et al. |
| 4,297,590 A | 10/1981 | Vail |
| 4,300,191 A | 11/1981 | Baranowski et al. |
| 4,301,496 A | 11/1981 | Schwarz |
| 4,302,803 A | 11/1981 | Shelly |
| 4,307,441 A | 12/1981 | Bello |
| 4,310,771 A | 1/1982 | Wyatt et al. |
| 4,313,060 A | 1/1982 | Fickenscher et al. |
| 4,315,207 A | 2/1982 | Apfel |
| 4,316,097 A | 2/1982 | Reynolds |
| 4,317,056 A | 2/1982 | Alberts |
| 4,318,007 A | 3/1982 | Rizzi |
| 4,318,164 A | 3/1982 | Onodera et al. |
| 4,322,817 A | 3/1982 | Kuster |
| 4,323,787 A | 4/1982 | Sato et al. |
| 4,323,788 A | 4/1982 | Smith |
| 4,323,962 A | 4/1982 | Steigerwald |
| 4,325,017 A | 4/1982 | Schade, Jr. |
| 4,327,298 A | 4/1982 | Burgin |
| 4,328,482 A | 5/1982 | Belcher et al. |
| 4,330,816 A | 5/1982 | Imazeki et al. |
| 4,334,263 A | 6/1982 | Adachi |
| 4,336,587 A | 6/1982 | Boettcher, Jr. |
| 4,344,122 A | 8/1982 | Jones |
| 4,344,124 A | 8/1982 | Panicali |
| 4,346,342 A | 8/1982 | Carollo |
| 4,347,558 A | 8/1982 | Kalinsky |
| 4,353,113 A | 10/1982 | Billings |
| 4,355,884 A | 10/1982 | Honda et al. |
| 4,356,541 A | 10/1982 | Ikenoue |
| 4,357,654 A | 11/1982 | Ikenoue |
| 4,368,409 A | 1/1983 | Sivanesan et al. |
| 4,371,919 A | 2/1983 | Andrews et al. |
| 4,381,457 A | 4/1983 | Wiles |
| 4,386,394 A | 5/1983 | Kocher et al. |
| 4,393,316 A | 7/1983 | Brown |
| 4,395,639 A | 7/1983 | Bring |
| 4,398,156 A | 8/1983 | Aaland |
| 4,399,499 A | 8/1983 | Butcher et al. |
| 4,403,269 A | 9/1983 | Carroll |
| 4,415,960 A | 11/1983 | Clark, Jr. |
| 4,423,341 A | 12/1983 | Shelly |
| 4,427,899 A | 1/1984 | Bruns |
| 4,438,411 A | 3/1984 | Rubin et al. |
| 4,441,070 A | 4/1984 | Davies et al. |
| 4,442,339 A | 4/1984 | Mizuno et al. |
| 4,443,840 A | 4/1984 | Geissler et al. |
| 4,449,173 A | 5/1984 | Nishino et al. |
| 4,449,174 A | 5/1984 | Ziesse |
| 4,449,175 A | 5/1984 | Ishii et al. |
| 4,451,743 A | 5/1984 | Suzuki et al. |
| 4,451,876 A | 5/1984 | Ogata |
| 4,465,966 A | 8/1984 | Long et al. |
| 4,471,289 A | 9/1984 | Duley et al. |
| 4,473,756 A | 9/1984 | Brigden et al. |
| 4,476,399 A | 10/1984 | Yoshida et al. |
| 4,479,175 A | 10/1984 | Gille et al. |
| 4,484,084 A | 11/1984 | Cheffer |
| 4,499,531 A | 2/1985 | Bray |
| 4,504,895 A | 3/1985 | Steigerwald |
| 4,519,024 A | 5/1985 | Federico et al. |
| 4,520,296 A | 5/1985 | Lepper et al. |
| 4,523,265 A | 6/1985 | Deprez |
| 4,524,411 A | 6/1985 | Willis |
| 4,524,413 A | 6/1985 | Ikenoue |
| 4,527,228 A | 7/1985 | Chi Yu |
| 4,528,459 A | 7/1985 | Wiegel |
| 4,533,986 A | 8/1985 | Jones |
| 4,535,399 A | 8/1985 | Szepesi |
| 4,536,700 A | 8/1985 | Bello et al. |
| 4,538,073 A | 8/1985 | Freige et al. |
| 4,538,101 A | 8/1985 | Shimpo et al. |
| 4,539,487 A | 9/1985 | Ishii |
| 4,546,421 A | 10/1985 | Bello et al. |
| 4,553,039 A | 11/1985 | Stifter |
| 4,556,802 A | 12/1985 | Harada et al. |
| 4,561,046 A | 12/1985 | Kuster |
| 4,562,522 A | 12/1985 | Adams et al. |
| 4,564,800 A | 1/1986 | Orth et al. |
| 4,566,059 A | 1/1986 | Gallios et al. |
| 4,571,551 A | 2/1986 | Trager |
| 4,575,640 A | 3/1986 | Martin |
| 4,578,631 A | 3/1986 | Smith |
| 4,584,635 A | 4/1986 | MacInnis et al. |
| 4,586,119 A | 4/1986 | Sutton |
| 4,587,604 A | 5/1986 | Nerone |
| 4,591,782 A | 5/1986 | Germer |
| 4,593,213 A | 6/1986 | Vesce et al. |
| 4,605,999 A | 8/1986 | Bowman et al. |
| 4,607,195 A | 8/1986 | Valkestijn et al. |
| 4,607,323 A | 8/1986 | Sokal |
| 4,618,919 A | 10/1986 | Martin, Jr. |
| 4,621,313 A | 11/1986 | Kiteley |
| 4,622,511 A | 11/1986 | Moore |
| 4,622,629 A | 11/1986 | Glennon |
| 4,626,982 A | 12/1986 | Huber |
| 4,628,426 A | 12/1986 | Steigerwald |
| 4,635,179 A | 1/1987 | Carsten |
| 4,638,175 A | 1/1987 | Bradford et al. |
| 4,642,475 A | 2/1987 | Fischer et al. |
| 4,642,743 A | 2/1987 | Radcliffe |
| 4,644,440 A | 2/1987 | Kenny et al. |
| 4,648,017 A | 3/1987 | Nerone |
| 4,651,020 A | 3/1987 | Kenny et al. |
| 4,652,769 A | 3/1987 | Smith et al. |
| 4,659,942 A | 4/1987 | Volp |
| 4,663,699 A | 5/1987 | Wilkinson |
| 4,670,661 A | 6/1987 | Ishikawa |
| 4,672,517 A | 6/1987 | Mandelcorn |
| 4,672,518 A | 6/1987 | Murdock |
| 4,672,528 A | 6/1987 | Park et al. |
| 4,674,019 A | 6/1987 | Martinelli |
| 4,675,796 A | 6/1987 | Gautherin et al. |
| 4,677,311 A | 6/1987 | Morita |
| 4,677,534 A | 6/1987 | Okochi |
| 4,680,688 A | 7/1987 | Inou et al. |
| 4,680,689 A | 7/1987 | Payne |
| 4,683,528 A | 7/1987 | Snow et al. |
| 4,685,039 A | 8/1987 | Inou et al. |
| 4,688,160 A | 8/1987 | Fraidlin |
| 4,691,273 A | 9/1987 | Kuwata et al. |
| 4,694,384 A | 9/1987 | Steigerwald et al. |
| 4,694,386 A | 9/1987 | de Sartre |
| 4,695,935 A | 9/1987 | Oen et al. |
| 4,697,136 A | 9/1987 | Ishikawa |
| 4,698,738 A | 10/1987 | Miller et al. |
| 4,706,177 A | 11/1987 | Josephson |
| 4,709,316 A | 11/1987 | Ngo et al. |
| 4,709,318 A | 11/1987 | Gephart et al. |
| 4,716,514 A | 12/1987 | Patel |
| 4,717,833 A | 1/1988 | Small |
| 4,727,308 A | 2/1988 | Huljak et al. |
| 4,727,469 A | 2/1988 | Kammiller |
| 4,730,242 A | 3/1988 | Divan |
| 4,733,102 A | 3/1988 | Nakayama et al. |
| 4,734,839 A | 3/1988 | Barthold |
| 4,734,844 A | 3/1988 | Rhoads |
| 4,734,924 A | 3/1988 | Yahata et al. |

(56) References Cited

U.S. PATENT DOCUMENTS

| | | |
|---|---|---|
| 4,745,299 A | 5/1988 | Eng et al. |
| 4,745,538 A | 5/1988 | Cross et al. |
| 4,747,034 A | 5/1988 | Dickey |
| 4,748,550 A | 5/1988 | Okado |
| 4,754,160 A | 6/1988 | Ely |
| 4,754,161 A | 6/1988 | Fox |
| 4,760,276 A | 7/1988 | Lethellier |
| 4,763,237 A | 8/1988 | Wieczorek |
| 4,768,141 A | 8/1988 | Hubertus |
| 4,772,994 A | 9/1988 | Harada et al. |
| 4,777,382 A | 10/1988 | Reingold |
| 4,777,575 A | 10/1988 | Yamato et al. |
| 4,779,185 A | 10/1988 | Musil |
| 4,782,241 A | 11/1988 | Baker et al. |
| 4,783,728 A | 11/1988 | Hoffman |
| 4,785,387 A | 11/1988 | Lee et al. |
| 4,788,450 A | 11/1988 | Wagner |
| 4,788,634 A | 11/1988 | Schlecht et al. |
| 4,794,506 A | 12/1988 | Hino et al. |
| 4,796,173 A | 1/1989 | Steigerwald |
| 4,800,479 A | 1/1989 | Bupp |
| 4,805,078 A | 2/1989 | Munz |
| 4,809,148 A | 2/1989 | Barn |
| 4,811,191 A | 3/1989 | Miller |
| 4,812,672 A | 3/1989 | Cowan et al. |
| 4,814,962 A | 3/1989 | Magalhaes et al. |
| 4,814,965 A | 3/1989 | Petersen |
| 4,823,249 A | 4/1989 | Garcia, II |
| 4,825,348 A | 4/1989 | Steigerwald et al. |
| 4,829,216 A | 5/1989 | Rodriguez-Cavazos |
| 4,841,160 A | 6/1989 | Yon et al. |
| 4,853,832 A | 8/1989 | Stuart |
| 4,853,837 A | 8/1989 | Gulczynski |
| 4,855,858 A | 8/1989 | Boertzel et al. |
| 4,855,888 A | 8/1989 | Henze et al. |
| 4,860,184 A | 8/1989 | Tabisz et al. |
| 4,860,185 A | 8/1989 | Brewer et al. |
| 4,860,188 A | 8/1989 | Bailey et al. |
| 4,860,189 A | 8/1989 | Hitchcock |
| 4,864,479 A | 9/1989 | Steigerwald et al. |
| 4,864,483 A | 9/1989 | Divan |
| 4,866,588 A | 9/1989 | Rene |
| 4,866,589 A | 9/1989 | Satoo et al. |
| 4,868,729 A | 9/1989 | Suzuki |
| 4,870,555 A | 9/1989 | White |
| 4,873,616 A | 10/1989 | Fredrick et al. |
| 4,873,618 A | 10/1989 | Fredrick et al. |
| 4,877,972 A | 10/1989 | Sobhani et al. |
| 4,881,014 A | 11/1989 | Okochi |
| 4,882,646 A | 11/1989 | Genuit |
| 4,882,664 A | 11/1989 | Pennington |
| 4,882,665 A | 11/1989 | Choi |
| 4,885,674 A | 12/1989 | Varga |
| 4,890,210 A | 12/1989 | Myers |
| 4,890,214 A | 12/1989 | Yamamoto |
| 4,893,227 A | 1/1990 | Gallios et al. |
| 4,893,228 A | 1/1990 | Orrick et al. |
| 4,896,092 A | 1/1990 | Flynn |
| 4,899,271 A | 2/1990 | Seiersen |
| 4,900,885 A | 2/1990 | Inumada |
| 4,902,508 A | 2/1990 | Badylak et al. |
| 4,903,183 A | 2/1990 | Noguchi et al. |
| 4,903,189 A | 2/1990 | Ngo et al. |
| 4,908,857 A | 3/1990 | Burns et al. |
| 4,916,599 A | 4/1990 | Traxler et al. |
| 4,920,470 A | 4/1990 | Clements |
| 4,922,397 A | 5/1990 | Heyman |
| 4,922,404 A | 5/1990 | Ludwig et al. |
| 4,924,170 A | 5/1990 | Henze |
| 4,926,303 A | 5/1990 | Sturgeon |
| 4,929,605 A | 5/1990 | Domet et al. |
| 4,931,918 A | 6/1990 | Inou et al. |
| 4,935,857 A | 6/1990 | Nguyen et al. |
| 4,937,468 A | 6/1990 | Shekhawat et al. |
| 4,952,849 A | 8/1990 | Fellows et al. |
| 4,953,068 A | 8/1990 | Henze |
| 4,958,268 A | 9/1990 | Nagagata et al. |
| 4,959,764 A | 9/1990 | Bassett |
| 4,959,766 A | 9/1990 | Jain |
| 4,961,128 A | 10/1990 | Bloom |
| 4,975,823 A | 12/1990 | Rilly et al. |
| 4,982,149 A | 1/1991 | Shimanuki |
| 5,001,318 A | 3/1991 | Noda |
| 5,006,782 A | 4/1991 | Pelly |
| 5,008,795 A | 4/1991 | Parsley et al. |
| 5,010,261 A | 4/1991 | Steigerwald |
| 5,012,401 A | 4/1991 | Barlage |
| 5,013,980 A | 5/1991 | Stephens et al. |
| 5,016,245 A | 5/1991 | Lobjinski et al. |
| 5,017,800 A | 5/1991 | Divan |
| 5,019,717 A | 5/1991 | McCurry et al. |
| 5,019,719 A | 5/1991 | King |
| 5,019,954 A | 5/1991 | Bourgeault et al. |
| 5,023,766 A | 6/1991 | Laidler |
| 5,027,002 A | 6/1991 | Thornton |
| 5,027,264 A | 6/1991 | DeDoncker et al. |
| 5,029,062 A | 7/1991 | Capel |
| 5,036,452 A | 7/1991 | Loftus |
| 5,038,264 A | 8/1991 | Steigerwald |
| 5,038,265 A | 8/1991 | Paladel |
| 5,038,266 A | 8/1991 | Callen et al. |
| 5,041,777 A | 8/1991 | Riedger |
| 5,043,859 A | 8/1991 | Korman et al. |
| 5,047,911 A | 9/1991 | Sperzel et al. |
| 5,055,722 A | 10/1991 | Latos |
| 5,057,698 A | 10/1991 | Widener et al. |
| 5,057,986 A | 10/1991 | Henze et al. |
| 5,063,338 A | 11/1991 | Capel et al. |
| 5,063,489 A | 11/1991 | Inaba |
| 5,066,900 A | 11/1991 | Bassett |
| 5,073,848 A | 12/1991 | Steigerwald et al. |
| 5,077,486 A | 12/1991 | Marson |
| 5,079,686 A | 1/1992 | Vinciarelli |
| 5,097,403 A | 3/1992 | Smith |
| 5,099,406 A | 3/1992 | Harada et al. |
| 5,101,336 A | 3/1992 | Willocx et al. |
| 5,103,110 A | 4/1992 | Housworth et al. |
| 5,103,387 A | 4/1992 | Rosenbaum et al. |
| 5,105,351 A | 4/1992 | Harada et al. |
| 5,111,372 A | 5/1992 | Kameyama et al. |
| 5,111,374 A | 5/1992 | Lai et al. |
| 5,113,334 A | 5/1992 | Tuson et al. |
| 5,113,337 A | 5/1992 | Steigerwald |
| 5,119,013 A | 6/1992 | Sabroff |
| 5,119,283 A | 6/1992 | Steigerwald et al. |
| 5,119,284 A | 6/1992 | Fisher et al. |
| 5,122,726 A | 6/1992 | Elliott et al. |
| 5,122,945 A | 6/1992 | Marawi |
| 5,126,651 A | 6/1992 | Gauen |
| 5,128,603 A | 7/1992 | Wolfel |
| 5,132,888 A | 7/1992 | Lo et al. |
| 5,132,889 A | 7/1992 | Hitchcock et al. |
| 5,138,184 A | 8/1992 | Keefe |
| 5,138,249 A | 8/1992 | Capel |
| 5,140,509 A | 8/1992 | Murugan |
| 5,140,512 A | 8/1992 | O'Sullivan |
| 5,140,514 A | 8/1992 | Tuusa et al. |
| 5,144,547 A | 9/1992 | Masamoto |
| 5,146,394 A | 9/1992 | Ishii et al. |
| 5,157,269 A | 10/1992 | Jordan et al. |
| 5,159,541 A | 10/1992 | Jain |
| 5,161,241 A | 11/1992 | Kanai |
| 5,162,663 A | 11/1992 | Combs et al. |
| 5,164,609 A | 11/1992 | Poppe et al. |
| 5,168,435 A | 12/1992 | Kobayashi et al. |
| 5,173,846 A | 12/1992 | Smith |
| 5,177,675 A | 1/1993 | Archer |
| 5,179,512 A | 1/1993 | Fisher et al. |
| 5,206,800 A | 4/1993 | Smith |
| 5,208,740 A | 5/1993 | Ehsani |
| 5,216,351 A | 6/1993 | Shimoda |
| 5,218,522 A | 6/1993 | Phelps et al. |
| 5,221,887 A | 6/1993 | Gulczynski |
| 5,224,025 A | 6/1993 | Divan et al. |

(56) References Cited

U.S. PATENT DOCUMENTS

| | | |
|---|---|---|
| 5,233,509 A | 8/1993 | Ghotbi |
| 5,235,502 A | 8/1993 | Vinciarelli et al. |
| 5,237,208 A | 8/1993 | Tominaga et al. |
| 5,237,606 A | 8/1993 | Ziermann |
| 5,254,930 A | 10/1993 | Daly |
| 5,255,174 A | 10/1993 | Murugan |
| 5,264,736 A | 11/1993 | Jacobson |
| 5,267,135 A | 11/1993 | Tezuka et al. |
| 5,267,137 A | 11/1993 | Goebel |
| 5,268,830 A | 12/1993 | Loftus, Jr. |
| 5,272,612 A | 12/1993 | Harada et al. |
| 5,272,613 A | 12/1993 | Buthker |
| 5,274,539 A | 12/1993 | Steigerwald et al. |
| 5,274,543 A | 12/1993 | Loftus, Jr. |
| 5,289,364 A | 2/1994 | Sakurai |
| 5,303,138 A | 4/1994 | Rozman |
| 5,304,875 A | 4/1994 | Smith |
| 5,305,191 A | 4/1994 | Loftus, Jr. |
| 5,305,192 A | 4/1994 | Bonte et al. |
| 5,343,383 A | 8/1994 | Shinada et al. |
| 5,353,212 A | 10/1994 | Loftus, Jr. |
| 5,355,077 A | 10/1994 | Kates |
| 5,355,293 A | 10/1994 | Carlstedt |
| 5,355,294 A | 10/1994 | De Doncker et al. |
| 5,363,323 A | 11/1994 | Lange |
| 5,377,090 A | 12/1994 | Steigerwald |
| 5,383,858 A | 1/1995 | Reilly et al. |
| 5,386,359 A | 1/1995 | Nochi |
| 5,396,412 A | 3/1995 | Barlage |
| 5,398,182 A | 3/1995 | Crosby |
| 5,400,239 A | 3/1995 | Caine |
| 5,410,467 A | 4/1995 | Smith et al. |
| 5,412,308 A | 5/1995 | Brown |
| 5,412,557 A | 5/1995 | Lauw |
| 5,424,932 A | 6/1995 | Inou et al. |
| 5,428,523 A | 6/1995 | McDonnal |
| 5,430,632 A | 7/1995 | Meszlenyi |
| 5,430,633 A | 7/1995 | Smith |
| 5,434,770 A | 7/1995 | Dreifuerst et al. |
| 5,438,499 A | 8/1995 | Bonte et al. |
| 5,442,534 A | 8/1995 | Cuk et al. |
| 5,448,469 A | 9/1995 | Rilly et al. |
| 5,461,301 A | 10/1995 | Truong |
| 5,477,091 A | 12/1995 | Fiorina et al. |
| 5,481,178 A | 1/1996 | Wilcox et al. |
| 5,481,449 A | 1/1996 | Kheraluwala et al. |
| 5,500,791 A | 3/1996 | Kheraluwala et al. |
| 5,513,092 A | 4/1996 | Goebel |
| 5,514,921 A | 5/1996 | Steigerwald |
| 5,519,599 A | 5/1996 | Shinada et al. |
| 5,528,480 A | 6/1996 | Kikinis et al. |
| 5,528,482 A | 6/1996 | Rozman |
| 5,530,635 A | 6/1996 | Yashiro |
| 5,534,768 A | 7/1996 | Chavannes et al. |
| 5,535,112 A | 7/1996 | Vazquez Lopez et al. |
| 5,537,021 A | 7/1996 | Weinberg et al. |
| 5,539,630 A | 7/1996 | Pietkiewicz et al. |
| 5,539,631 A | 7/1996 | Partridge |
| 5,541,827 A | 7/1996 | Allfather |
| 5,552,695 A | 9/1996 | Schwartz |
| 5,559,423 A | 9/1996 | Harman |
| 5,559,682 A | 9/1996 | Kanouda et al. |
| 5,570,276 A | 10/1996 | Cuk et al. |
| 5,576,940 A | 11/1996 | Steigerwald et al. |
| 5,590,032 A | 12/1996 | Bowman et al. |
| 5,594,629 A | 1/1997 | Steigerwald |
| 5,621,621 A | 4/1997 | Lilliestrale |
| 5,625,541 A | 4/1997 | Rozman |
| 5,635,826 A | 6/1997 | Sugawara |
| 5,636,107 A | 6/1997 | Lu et al. |
| 5,636,116 A | 6/1997 | Milavec et al. |
| 5,663,876 A | 9/1997 | Newton et al. |
| 5,663,877 A | 9/1997 | Dittli et al. |
| 5,663,887 A | 9/1997 | Warn et al. |
| 5,691,870 A | 11/1997 | Gebara |
| 5,708,571 A | 1/1998 | Shinada |
| 5,719,754 A | 2/1998 | Fraidlin et al. |
| 5,726,869 A | 3/1998 | Yamashita et al. |
| 5,729,444 A | 3/1998 | Perol |
| 5,734,563 A | 3/1998 | Shinada |
| 5,736,843 A | 4/1998 | Amin |
| 5,742,491 A | 4/1998 | Bowman et al. |
| 5,745,359 A | 4/1998 | Faulk |
| 5,754,414 A | 5/1998 | Hanington |
| 5,757,625 A | 5/1998 | Schoofs |
| 5,757,627 A | 5/1998 | Faulk |
| 5,768,118 A | 6/1998 | Faulk et al. |
| 5,771,160 A | 6/1998 | Seong |
| 5,774,350 A | 6/1998 | Notaro et al. |
| 5,781,420 A | 7/1998 | Xia et al. |
| 5,781,421 A | 7/1998 | Steigerwald et al. |
| 5,784,266 A | 7/1998 | Chen |
| 5,805,432 A | 9/1998 | Zaitsu et al. |
| 5,818,704 A | 10/1998 | Martinez |
| 5,831,839 A | 11/1998 | Pansier |
| 5,841,641 A | 11/1998 | Faulk |
| 5,841,643 A | 11/1998 | Schenkel |
| 5,862,042 A | 1/1999 | Jiang |
| 5,870,299 A | 2/1999 | Rozman |
| 5,872,705 A | 2/1999 | Loftus, Jr. et al. |
| 5,880,939 A | 3/1999 | Sardat |
| 5,880,949 A | 3/1999 | Melhem et al. |
| 5,894,412 A | 4/1999 | Faulk |
| 5,901,052 A | 5/1999 | Strijker |
| 5,903,452 A | 5/1999 | Yang |
| 5,907,481 A | 5/1999 | Svardsjo |
| 5,916,313 A | 6/1999 | Brown |
| 5,929,692 A | 7/1999 | Carsten |
| 5,946,202 A | 8/1999 | Balogh |
| 5,946,207 A | 8/1999 | Schoofs |
| 5,949,658 A | 9/1999 | Thottuvelil et al. |
| 5,956,242 A | 9/1999 | Majid et al. |
| 5,956,245 A | 9/1999 | Rozman |
| 5,959,370 A | 9/1999 | Pardo |
| 5,991,167 A | 11/1999 | Van Lerberghe |
| 5,999,417 A | 12/1999 | Schlecht |
| 6,002,597 A | 12/1999 | Rozman |
| 6,005,773 A | 12/1999 | Rozman et al. |
| 6,011,703 A | 1/2000 | Boylan et al. |
| 6,016,258 A | 1/2000 | Jain et al. |
| 6,016,261 A | 1/2000 | De Wit et al. |
| RE36,571 E | 2/2000 | Rozman |
| 6,026,005 A | 2/2000 | Abdoulin |
| 6,038,148 A | 3/2000 | Farrington et al. |
| 6,046,920 A | 4/2000 | Cazabat et al. |
| 6,058,026 A | 5/2000 | Rozman |
| 6,066,943 A | 5/2000 | Hastings et al. |
| 6,069,799 A | 5/2000 | Bowman et al. |
| 6,069,804 A | 5/2000 | Ingman et al. |
| 6,084,792 A | 7/2000 | Chen et al. |
| 6,087,817 A | 7/2000 | Varga |
| 6,088,329 A | 7/2000 | Lindberg et al. |
| 6,091,616 A | 7/2000 | Jacobs et al. |
| 6,137,697 A | 10/2000 | Tarodo et al. |
| 6,137,698 A | 10/2000 | Yukawa et al. |
| 6,141,224 A | 10/2000 | Xia et al. |
| 6,169,675 B1 | 1/2001 | Shimamori et al. |
| 6,191,964 B1 | 2/2001 | Boylan et al. |
| 6,208,535 B1 | 3/2001 | Parks |
| 6,211,657 B1 | 4/2001 | Goluszek |
| 6,222,742 B1 | 4/2001 | Schlecht |
| 6,246,592 B1 | 6/2001 | Balogh et al. |
| 6,252,781 B1 | 6/2001 | Rinne et al. |
| 6,278,621 B1 | 8/2001 | Xia et al. |
| RE37,510 E | 1/2002 | Bowman et al. |
| 6,385,059 B1 | 5/2002 | Telefus et al. |
| 6,417,653 B1 | 7/2002 | Massie et al. |
| 6,421,262 B1 | 7/2002 | Saxelby et al. |
| 6,430,071 B1 | 8/2002 | Haneda |
| RE37,889 E | 10/2002 | Rozman |
| RE37,898 E | 11/2002 | Seragnoli |
| 6,477,065 B2 | 11/2002 | Parks |
| 6,487,093 B1 | 11/2002 | Vogman |
| 6,504,267 B1 | 1/2003 | Giannopoulos |

(56) References Cited

U.S. PATENT DOCUMENTS

| | | |
|---|---|---|
| 6,535,407 B1 | 3/2003 | Zaitsu |
| 6,552,917 B1 | 4/2003 | Bourdillon |
| 6,580,258 B2 | 6/2003 | Wilcox et al. |
| 6,594,159 B2 | 7/2003 | Schlecht |
| 6,608,768 B2 | 8/2003 | Sula |
| 6,696,882 B1 | 2/2004 | Markowski et al. |
| 6,700,365 B2 | 3/2004 | Isham et al. |
| 6,721,192 B1 | 4/2004 | Yang et al. |
| 6,728,118 B1 | 4/2004 | Chen et al. |
| 6,731,520 B2 | 5/2004 | Schlecht |
| 6,735,094 B2 | 5/2004 | Steigerwald et al. |
| 6,804,125 B2 | 10/2004 | Brkovic |
| 6,836,415 B1 | 12/2004 | Yang et al. |
| 6,845,019 B2 | 1/2005 | Kim et al. |
| 6,853,563 B1 | 2/2005 | Yoneyama et al. |
| 6,853,568 B2 | 2/2005 | Li et al. |
| 6,862,194 B2 | 3/2005 | Yang et al. |
| 6,862,198 B2 | 3/2005 | Muegge et al. |
| 6,927,987 B2 | 8/2005 | Farrington et al. |
| 6,930,893 B2 | 8/2005 | Vinciarelli |
| 6,970,366 B2 | 11/2005 | Apeland et al. |
| 6,987,679 B2 | 1/2006 | Gan et al. |
| 7,019,997 B2 | 3/2006 | Ooishi |
| 7,031,128 B2 | 4/2006 | Nam |
| 7,035,120 B2 | 4/2006 | Tobita |
| 7,050,309 B2 | 5/2006 | Farrington |
| 7,055,309 B2 | 6/2006 | Plote et al. |
| 7,072,190 B2 | 7/2006 | Schlecht |
| 7,145,786 B2 | 12/2006 | Vinciarelli |
| 7,187,562 B2 | 3/2007 | Stojcic et al. |
| 7,269,034 B2 | 9/2007 | Schlecht |
| 7,272,023 B2 | 9/2007 | Schlecht |
| RE40,438 E | 7/2008 | Urakawa et al. |
| 7,501,715 B2 | 3/2009 | Saeueng et al. |
| 7,558,083 B2 | 7/2009 | Schlecht |
| 7,564,702 B2 | 7/2009 | Schlecht |
| 7,727,021 B2 | 6/2010 | Haruna et al. |
| 7,768,801 B2 | 8/2010 | Usui et al. |
| 8,023,290 B2 | 9/2011 | Schlecht |
| 8,493,751 B2 | 7/2013 | Schlecht |
| 8,582,333 B2 | 11/2013 | Oraw et al. |
| 2003/0174522 A1 | 9/2003 | Xu |
| 2005/0047177 A1 | 3/2005 | Tobita |
| 2006/0209572 A1 | 9/2006 | Schlecht |
| 2006/0262575 A1 | 11/2006 | Schlecht |
| 2006/0285368 A1 | 12/2006 | Schlecht |
| 2008/0175024 A1 | 7/2008 | Schlecht |
| 2008/0211304 A1* | 9/2008 | Farrington ........ H02M 3/33592 307/31 |
| 2009/0051221 A1 | 2/2009 | Liu et al. |
| 2010/0091526 A1 | 4/2010 | Schlecht |
| 2011/0176333 A1 | 7/2011 | Schlecht et al. |
| 2014/0085939 A1 | 3/2014 | Schlecht |

FOREIGN PATENT DOCUMENTS

| | | |
|---|---|---|
| DE | 29 02 862 | 8/1979 |
| EP | 0 016 537 | 11/1983 |
| EP | 0 041 883 | 9/1984 |
| EP | 0 077 958 B1 | 1/1986 |
| EP | 0 058 400 B1 | 5/1986 |
| EP | 0 184 963 | 6/1986 |
| EP | 0 223 504 | 5/1987 |
| EP | 0 102 614 | 7/1987 |
| EP | 0 139 870 | 11/1987 |
| EP | 0 244 186 | 11/1987 |
| EP | 0 289 196 | 11/1988 |
| EP | 0 343 855 A2 | 11/1989 |
| EP | 0 410 866 A1 | 1/1991 |
| EP | 0 449 504 A2 | 10/1991 |
| EP | 0 467 778 A2 | 1/1992 |
| EP | 0 472 261 A2 | 2/1992 |
| EP | 0 481 466 A1 | 4/1992 |
| EP | 0 484 610 A1 | 5/1992 |
| EP | 0 291 403 B1 | 1/1993 |
| EP | 0 549 920 A1 | 7/1993 |
| EP | 0 550 167 A2 | 7/1993 |
| EP | 0 582 814 A2 | 2/1994 |
| EP | 0 588 569 A2 | 3/1994 |
| EP | 0 257 817 B1 | 4/1994 |
| EP | 0257817 B1 | 4/1994 |
| EP | 0 336 725 B1 | 7/1994 |
| EP | 0 605 752 A2 | 7/1994 |
| EP | 0 608 091 A2 | 7/1994 |
| EP | 0 610 158 A1 | 8/1994 |
| EP | 0 616 281 A2 | 9/1994 |
| EP | 0 622 891 A2 | 11/1994 |
| EP | 0 549 920 B1 | 8/1995 |
| EP | 0 665 634 B1 | 8/1995 |
| EP | 0 687 058 | 12/1995 |
| EP | 0 428 377 B1 | 1/1996 |
| EP | 0 694 826 A2 | 1/1996 |
| EP | 0 696 831 A2 | 2/1996 |
| EP | 0 529 180 B1 | 3/1996 |
| EP | 0 474 471 B1 | 5/1996 |
| EP | 0 709 949 A2 | 5/1996 |
| EP | 0 476 278 B1 | 6/1996 |
| EP | 0 720 278 A1 | 7/1996 |
| EP | 0 736 959 A1 | 10/1996 |
| EP | 0 741 447 A2 | 11/1996 |
| EP | 0 595 232 B1 | 1/1997 |
| EP | 0 599 814 B1 | 4/1997 |
| EP | 0 848 485 A2 | 6/1998 |
| EP | 0 508 664 B1 | 7/1998 |
| EP | 0 429 310 B1 | 9/1998 |
| EP | 0429310 B1 | 9/1998 |
| EP | 0 757 428 B1 | 11/1998 |
| EP | 0 575 626 B1 | 12/1998 |
| EP | 0 884 829 A1 | 12/1998 |
| EP | 0 503 806 B1 | 5/1999 |
| EP | 0 944 162 A1 | 9/1999 |
| EP | 0 954 088 A1 | 11/1999 |
| EP | 0 973 246 A1 | 1/2000 |
| EP | 0 996 219 A2 | 4/2000 |
| EP | 0 618 666 B1 | 2/2001 |
| EP | 0 925 638 B1 | 10/2001 |
| EP | 0 798 846 B1 | 1/2002 |
| EP | 0 932 929 B1 | 8/2002 |
| EP | 0 851 566 B1 | 3/2003 |
| EP | 0 805 540 B1 | 6/2004 |
| EP | 0 854 564 B1 | 3/2008 |
| EP | 1 231 705 | 8/2010 |
| FR | 2 535 133 A1 | 4/1984 |
| FR | 2 608 857 B1 | 5/1989 |
| GB | 2 11 0 493 A | 6/1983 |
| GB | 2 117 144 A | 10/1983 |
| GB | 2 131 238 A | 6/1984 |
| GB | 2 160 722 A | 12/1985 |
| GB | 2217931 | 11/1989 |
| GB | 2 233 479 A | 1/1991 |
| GB | 2 244 155 A | 11/1991 |
| GB | 2 255 865 A | 11/1992 |
| GB | 2 291 287 A | 1/1996 |
| GB | 2 313 495 A | 11/1997 |
| JP | 3 18275 | 1/1911 |
| JP | 61-49583 | 4/1986 |
| JP | 61 273171 | 12/1986 |
| JP | 61-277372 | 12/1986 |
| JP | 62-233067 | 10/1987 |
| JP | 63-257458 | 10/1988 |
| JP | 63-277471 | 11/1988 |
| JP | 64-50762 | 2/1989 |
| JP | 1 134989 | 5/1989 |
| JP | 1 278265 | 11/1989 |
| JP | 1 283061 | 11/1989 |
| JP | 2 155465 | 6/1990 |
| JP | 2 202362 | 8/1990 |
| JP | 2 246774 | 10/1990 |
| JP | 3 89851 | 4/1991 |
| JP | 4-105556 | 4/1992 |
| JP | H5-64446 | 3/1993 |
| JP | 05 199744 A | 8/1993 |
| JP | 5-207745 | 8/1993 |

(56) References Cited

FOREIGN PATENT DOCUMENTS

| | | |
|---|---|---|
| JP | 06 098540 A | 4/1994 |
| JP | 6-187056 | 7/1994 |
| JP | 6-315263 | 11/1994 |
| JP | 06 339266 A | 12/1994 |
| JP | 6-343262 | 12/1994 |
| JP | 07 007928 A | 1/1995 |
| JP | 07 115766 A | 5/1995 |
| JP | 7-194104 | 7/1995 |
| JP | 07 308062 A | 11/1995 |
| JP | 07 337005 A | 12/1995 |
| JP | 07 337006 A | 12/1995 |
| JP | H7-337005 | 12/1995 |
| JP | 08 019251 A | 1/1996 |
| JP | 08 205533 A | 8/1996 |
| JP | 8-223906 | 8/1996 |
| JP | 08 223906 A | 8/1996 |
| JP | 08 275518 A | 10/1996 |
| JP | 8-289538 | 11/1996 |
| JP | 08 336282 A | 12/1996 |
| JP | 09 093917 A | 4/1997 |
| JP | 09 172775 A | 6/1997 |
| JP | 09 182416 A | 7/1997 |
| JP | 1 066336 A | 3/1998 |
| JP | 10 136646 A | 5/1998 |
| JP | 10 146054 A | 5/1998 |
| JP | 10 210740 A | 8/1998 |
| JP | 10 248248 A | 9/1998 |
| JP | 11 004577 A | 1/1999 |
| JP | 11 069803 A | 3/1999 |
| JP | 11 103572 A | 4/1999 |
| JP | 11 146650 A | 5/1999 |
| JP | 11 178335 A | 7/1999 |
| JP | 2004-254393 | 9/2004 |
| PL | 177578 B3 | 5/1997 |
| WO | WO 84/04634 | 11/1984 |
| WO | WO 86/02787 | 5/1986 |
| WO | WO 87/05165 | 8/1987 |
| WO | WO 88/09084 | 11/1988 |
| WO | WO 89/01719 | 2/1989 |
| WO | WO 91/07803 | 5/1991 |
| WO | WO 95/23451 | 8/1995 |
| WO | WO 95/30182 | 11/1995 |
| WO | WO 95/32458 | 11/1995 |
| WO | WO 98/11658 | 3/1998 |
| WO | WO 98/18198 | 4/1998 |
| WO | WO 98/26496 | 6/1998 |
| WO | WO 01/97371 A1 | 12/2001 |
| WO | WO 2004/082119 A2 | 9/2004 |
| WO | WO 2005/008872 A1 | 1/2005 |
| ZA | 9711503 | 12/1997 |

OTHER PUBLICATIONS

Pressman, A. "Switching and Linear Power Supply, Power Converter Design". Hayden Book Company: Rochelle Park, New Jersey, 1977.
Jovanovic, M. et al. "Distributed Power Systems—Benefits and Challenges". Int. J. Electronics, vol. 77 No. 5, 1994, pp. 601-612.
Kassakian, J.G. et al. "Principles of Power Electronics". Addison-Wesley Publishing Company: Reading, MA, 1991.
Kassakian, J.G. et al. "High-Frequency High-Density Converters for Distributed Power Supply Systems". Proceedings of the IEEE, vol. 76 No. 4, Apr. 1988, pp. 362-376.
Uceda, J. et al. "Supplying Power at Low Voltage (3.3V)". 1995 IEEE, pp. 244-251.
De la Cruz, E. et al. "Analysis of Suitable PWM Topologies to Meet Very High Efficiency Requirements for on Board DC/DC Converters in Future Telecom Systems". DC/DC Converters: Distributed Power, pp. 207-214.
Narveson, B. "What is the Right Bus Voltage?" IEEE, 1988, pp. 883-888.

"BusQor Series". SynQor website, Aug. 14, 2002, retrieved from http://web.archive.org/web/20020814221649/ http://www.synqor.com/products/busqor_qb.html (2 pages).
"Specifications". SynQor website, Apr. 30, 2001, retrieved from http://web.archive.org/web/20010430163217/http://www.synqor.com/synqor/synqor.nsf/Content/852566E9:007C0DA6 (3 pages.).
Schlect, M. "The Fundamentals of Switching Regulators and Their Control Circuits". Aug. 27, 1998 (35 pages.).
"Technology Overview". SynQor website, Feb. 8, 2002, retrieved from http://web.archive.org/web/20020208055450/http://www.synqor.com/products/2_2_tech_overview.html (9 pages.).
"TI Unveils Next-Generation Point-of-Load Power Modules with Ultra-Fast Transient Response". Texas Instruments News Center website, Nov. 7, 2005, retrieved from http://newscenter.ti.com/Blogs/newsroom/archive/2005/11/07/ti-unveils-next-generation-point-of-load-power-modules-with-ultra-fast-transient-response-sc05226.aspx (2 pages.).
"3T Family, User Information Sheet", copyright 1982 Boschert Incorporated, Printed in USA, 1 page. (DMMP 0017631).
"Electronics Life" magazine excerpts, Mar. 1995, pp. 45-52. (Translation not provided). (DMMP0016106-DMMP0016114).
"Electronics Life"magazine excerpts, Nov. 1995, pp. 81-90. (Translation not provided). (DMMP0016095-DMMP0016105).
"Information on Viewing the Powerbook," Ericsson tutorial, copyright 1996 Ericsson Components AB, 128 pages. (DMMP0017633-DMMP0017760).
"Specifications", SynQor website, retrieved on Apr. 30, 2001, from http://web.archive.org/web/20010430163217/http://www.synqorcom/synqor/synqor.nsf/Content/852566E9:007CODA6, copyright 1999, 3 pages.
"Technology Overview", SynQor website, retrieved on Feb. 8, 2002, from http://www.archive.org/web/20020208055450/http://www.synqorcom/products/2_2_tech_overview.html, copyright 2002, 9 pages.
"Ti Unveils Next-Generation Point-of-Load Power Modules with Ultra-Fast Transient Response", Texas Instruments News Center website, retrieved on Nov. 7, 2005, from http://newscenterti .com/Blogs/newsroom/archive/2005/11/07/ti-unveils-next-generation-point-of-load-power-modules-with-ultra-fast-transient-response-sc05226.aspx, copyright 1995-2011, 2 page.
Abe, Seiya, et al., "Stability Improvement of Distributed Power System by Using Full-Regulated Bus Converter," pp. 2549-2553, Nov. 6-10, 2005, Annual Conference of IEEE. (ARTN00000424-ARTN00000428).
Abramczyk, Edward R.,et al., "Mospower Applications Handbook," Siliconix Incorporated, copyright 1984, 495 pages, ISBN 0-930519-00-0. (DMMP0016840-DMMP0017334).
Abramovitz, Alexander, et al., "A Novel Self-Oscillating Synchronously-Rectified DC-DC Converter," PESC '91 Record: 22nd Annual IEEE Power Electronics Specialists Conference, pp. 163-170, 1991, ISBN 0-7803-0090-4. (DMMP0017411-DMMP0017419).
Acker, Brian, et al., "Current-Controlled Synchronous Rectification", Applied Power Electronics Conference and Exposition (APEC) Proceedings, vol. 1, Feb. 1994, copyright 1994 IEEE, pp. 185-191, ISBN 0-7803-1456-5. (DMMP 0001506-DMMP0001512).
Acker, Brian, et al., "Synchronous Rectification With Adaptive Timing Control," pp. 88-95. ISBN 078032730-6. (DMMP0001513-DMMP0001520).
Aguilar, C., et al., "An Improved Battery Charger/Discharger Topology with Power Factor Correction," CIEP '95, San Luis Potosf, Mexico, Oct. 16-19, 1995, copyright 1995 IEEE, pp. 2-7, ISBN 0-7803-3071-4. (DMMP0001521-DMMP0001526).
Ahn, K.S., et al., "Clamp Mode Forward ZVS-MRC with Self-Driven Synchronous Rectifier," pp. 470475,(1996). ISBN 0-7803-3507-4. (ARTN00000458-ARTN00000463).
Alou, P., et al., "A High Efficiency Voltage Regulator Module with Single Winding Self-Driven Synchronous Rectification," copyright 2000 IEEE, pp. 1510-1515, ISBN 0-7803-5692-6. (DMMP0017420-DMMP0017425).
Alou, P., et al., "Design of a low output voltage Dc/Dc converter for Telecom application with a new scheme for Self-Driven Synchronous Rectification," copyright 1999 IEEE, pp. 866-872. ISBN 0-780351606/99. (DMMP0001533-DMMP0001539).

(56) References Cited

OTHER PUBLICATIONS

Alou, P., et al., "Design of a 1,5V Output Voltage On-Board Dc/Dc Converter with Magnetic Components Integrated in a Multilater PCB," pp. 764-769. ISBN 0-7803-3704-2/97. (DMMP0001527-DMMP0001532).

Alvarez, Leon Scott, "Control of Multi-Switch Multi-Output Power Converters," Unpublished Master of Science in Electrical Engineerign thesis, Massachusetts Institute of Technology, May, 1988, 32 pages. (DMMP0001547-DMMP0001578).

Alvarez-Barcia, L., et al., "Low Power Multioutput Converter with Post-Regulation based on Synchronous Rectification and Windings Integrated in the PCB," copyright 1998, pp. 191-197. ISBN 0-7803-43409/98. (DMMP0001540-DMMP0001546).

Amtex Electronics Pty Ltd., "Chapter 1: Principles of Power Conversion," pp. 1-17, undated. (DMMP0006388-DMMP0006388).

Andreycak, Bill, "Power Management Solution Delivers Efficient Multiple Outputs," Aug. 1, 2001, Power Electronics Technology website, http://www.printthis.clickability.com/pt/cpt?action=cpt&title=Power+Management+Solut . . . printed on Dec. 15, 2007. (DMMP0001579-DMMP0001583).

Ashdown, B., et al., "L'Alimentation Repartie—line Solution Pour Les Annees Quatre Vingt Dix," S.21.A Distributed Power System, Programme General, Intelec '93, pp. xv-xxxxii, and pp. 47-50. (DMMP0001617-DMMP0001649).

Astec Powerpoint Presentation, "AMPSS®, Astec Modular Power Supply System," undated, 99 pages. (ARTN00000464-ARTN00000562).

Author unknown, "Chapter II: Inverters and Converters," and "Chapter III, Regulated Power Supplies." Undated, pp. 2-1 through 2-65 and pp. 3-1 through 3-31, 49 pages. (DMMP0016369-DMMP0016417).

Balogh, Laszlo, "Design Review: 100W, 400kHz, DC/DC Converter With Current Doubler Synchronous Rectification Achieves 92% Efficiency," DC/DC Converter by Texas Instruments, copyright 2001, pp. 2-1-2-26.(ARTN00000563-ARTN00000588).

Balogh, Laszlo, "The Performance of the Current Doubler Rectifier with Synchronous Rectification," Technical Papers of the Tenth International High Frequency Power Conversion 1995 Conference, May 6-12, 1995, copyright 1995, pp. 216-225, 12 pages, ISBN 0-931033-54-3. (DMMP 0017426 DMMP0017437).

Balogh, Laszlo, et al., "Unique Cascaded Power Converter Topology for High Current Low Output Voltage Applications," 2001 Texas Instruments Incorporated, pp. 1-1 through 1-23. (DMMP0001650-DMMP0001673).

Barlage, F. Michael; "Synchronous Rectification and Regulation in Multiple Cross Regulated Outputs," Technical Papers of the Ninth International High Frequency Power Conversion 1994 Conference, pp. 185-193, Apr. 17-21, 1994. (DMMP0017438-DMMP0017447).

Barry, Mike, "Design Issues in Regulated and Unregulated Intermediate Bus Converters," pp. 1389-1394. ISBN 0-7803-8269-2/04. (DMMP0001698-DMMP0001703).

Beatty, Debra, et al., "Topical Overview of Soft-Switching Pvvm High Frequency Converters," Electrical and Computer Engineering Department, University of Central Florida, Mar. 1995, pp. 47-52. (DMMP0001710-DMMP0001715).

Bel Fuse Inc. Datasheet, Isolated DC\DC Converters, ORCM-27S12L, Nov. 3, 2008.

Belopolsky, Yakov, et al, "Hybrid Technologies for High Frequency Switching Power Supplies," pp. 103-108. ISSN 0569-5503/91. (DMMP0001716-DMMP0001721).

Benefits of the DC Bus Converter in Distributed Power Architectures for Networking & Communications Systems, Carl Smith, Apr. 2004 (PTX 1823).

Berkowitz, R., et al., "A Distributed Power Architecture for System 75 Digital Communications System," The Power Sources Conference 1984, pp. S9/I-1 through S9/1-6. (DMMP0001722-DMMP0001727).

Billings, Keith H., "Handbook of Switchmode Power Supplies," McGraw-Hill Publishing Company, copyright 1989, 678 pages, ISBN 0-07-005330-8. (DMMP0015233-DMMP0015911).

Bindra, Ashok, "Two-Stage Conversion Redefines Dsitributed Power Architecture," May 1, 2003, Power Electronics Technology website, http://www.printthis.clickability.com/pt/cpt&title=Two-Stage-Conversion+R printed on Dec. 15, 2007. (DMMP0001793-DMMP0001795).

Blake, Carl, et al., "Synchronous Rectifiers Versus Schottky Diodes: A Comparison of the Losses of a Sychronous Rectifier Versus the Losses of a Schottky Diode Rectifier," pp. 17-23 (1994). IEEE 0-7803-1456-5. (DMMP0017448-DMMP0017454).

Blanc, J., "Practical Application of MOSFET Synchronous Rectifiers," Intelec Thirteenth International Telecommunications Energy Conference, 494-501 (1991). IEEE Catalog Number: CH2970-2/91/0000-0495. (DMMP0001796-DMMP0001803).

Blanc, James, et al, "Use of Enhancement-And Depletion-Mode Mosfets in Sychronous Rectification," Proceedings of the Power Electronics Show & Conference, pp. 1-8, 390-395; Oct. 7-9, 1986. (DMMP0017455-DMMP0017469).

Blanchard, R. And R. Severns, "MOSFETs Move in on Low Voltage Rectification," Intertec Communications, Inc., 1984, PCI 1984 Proceedings, pp. 213-222. (DMMP 0016061-DMMP 0016072).

Blanchard, R. And Thibodeau, P. E.. "The design of a high efficiency, low voltage power supply using MOSFET synchronous rectification and current mode control," PESC '85; Annual Power Electronics Specialists Conference, 16th, Toulouse, France, Jun. 24-28, 1985, Record (A86-40426 19-33). New York, Institute of Electrical and Electronics Engineers, Inc., 1985, p. 355-361.

Boschert Incorporated marketing brochure, "Boschert an International Leader in Switching Power Supplies," undated, pp. 1-24. (DMMP 0001813-DMMP 0001836).

Boschert Incorporated marketing brochure, Boschert an International Leader in Switching Power Supplies. (DMMP0001837-DMMP0001851).

Boschert Switching Power Supplies Test Report, Model: 3T12AP; PN: 10484, Passed, undated, 1 page.

Boschert, Inc., "Power module lets users customize supplies," Electronic Design, Jun. 25, 1981, p. 213. (DMMP0002590).

Bowles, B.A., et al., "Modelling Interference Properties of SMPS DC Power Distribution Busses," copyright, 1989 IEEE, pp. 119-126, CH2736-7/89/0000-0119 (DMMP 0001861-DMMP 0001868).

Bowman, Wayne C., et al., "A High Density Board Mounted Power Module for Distributed Powering Architectures," copyright 1990 IEEE, pp. 43-54, IEEE Catalog No. CH2853-0/90/0000-0043. (DMMP 000186-DMMP 0001880).

Brakus, Bogdan, "DC/DC Modules for Low Voltage Applications: The New Generation of Board Mounted Modules in Thick-Copper Multilayer Technology," Intelec '98, Twentieth International Telecommunications Energy Conference Oct. 4-8, 1998, copyright 1998, 21 pages, ISBN: 0-7803-5069-3, IEEE Catalog Number: 98CH36263C. (DMMP 0001881-DMMP 0001901).

Briskman, R.D., et al., "Comsat Technical Review," vol. 7, No. 1, Spring 1977, pp. 1-349, 176 pages. (DMMP0001902-DMMP0002077).

Brown, Jess, "Addressing the topologies, converters, and switching devices for intermediate bus architectures," undated, pp. 1-9, EPE 2005—Dresden, ISBN 90-75815-08-05. (ARTN00000677-ARTN00000685).

Brush, L., Distributed Power Architecture Demand Characteristics, APEC 2004 (19th Annual IEEE Applied Power Electronics Conference and Exposition), Feb. 22-26, 2004.

Burns, J., et al., "An Intelligent, Fault Tolerant, High Power, Distributed Power System for Massively Parallel Processing Computers," pp. 795-800 (1994). ISBN 0-7803-1456-5/94. (DMMP0002078-DMMP0002084).

Bus Converter 48V Input/9.4V Output/36A Datasheet, Bel Power Products, Bel Fuse, Inc. (PTX 1077).

Bus Converters Aim to Boost Efficiency in IBA-Based Power Designs, Application Note DATEL, Jul. 2003 (PTX 558).

BusQor® specification, "BusQor Series", Aug. 14, 2002 (formerly exhibit A219).

Carbone, Jim, "Distributed Power Tags Keep Falling." Purchasing. Jul. 11, 1996. (DMMP0002121-DMMP0002121).

Carpenter, B., et al., "A Distributed Power System for Military VLSI Applications," Technical Papers of the Third International

(56) References Cited

OTHER PUBLICATIONS

High Frequency Power Conversion 1988 Conference, May 1-5, 1988, copyright 1988, pp. 430-441, 14 pages. ISBN 0-931033-07-1. (DMMP 0002122-DMMP 0002135).
Carr, Gregory A., et al., "X2000 Power System Architecture," Jet Propulsion Laboratory, California Institute of Technology, 1997, pp. 381-386. (DMMP0002136-DMMP0002141).
Carsten, B., "VLSI & VHSIC Power System Design Considerations," International PCI '86 Conference, Oct. 1986, pp. 1-15. (DMMP 0002142-DMMP 0002158).
Carsten, Bruce, "Distributed Power Systems of the Future Utilizing High Frequency Converters," Technical Papers of the Second International High Frequency Power Conversion 1987 Conference, Apr. 21-23, 1987, pp. 1-14, 15 pages. (DMMP 0002159-DMMP 0002173).
Casey, Leo F., et al., "A high-frequency, low volume, point-of-load power supply for distributed power systems," Proceedings of the 18th Annual IEEE Power Electronics Specialists Conference—PESC, Jun. 21-26, 1987, copyright 1987 IEEE, pp. 439-450, ISBN 0275-3908/87/0000-0439. (DMMP 0002189-DMMP 0002200).
Casey, Leo Francis, "Circuit Design for 1-10 MHZ DC-DC Conversion," MIT Doctoral Thesis Jan. 1989, pp. 1-217, 218 pages.
Chen, W., et al., "Design of a High-Efficiency, Low-Profile Forward Converter with 3.3-v Output," The Thirteenth Annual VPEC Power Electronics Seminar, pp. 105-112; Sep. 24-26, 1995. (DMMP0017470-DMMP0017479).
Chen, Wei, et al., "Design of High Efficiency, Low Profile, Low Voltage Converter with Integrated Magnetics," copyright 1997 IEEE, pp. 911-917, ISBN 0-7803-3704-2/97. (DMMP 0002201-DMMP 0002207).
Chen, Y., "New Multi-Output Switching Converters with Mosfet-Rectifier Post Regulators," IEEE Transactions on Industrial Electronics, vol. 45, No. 4 (1998). ISSN 0278-0046/98. (DMMP0002208-DMMP0002215).
Cheng, K.W.E., "Comparative Study of AC/DC Converters for More Electric Aircraft," Power Electronics and Variable Speed Drives, Sep. 21-23, 1998, Conference Publication No. 456, copyright 1998 IEE, pp. 299-304. (DMMP0002216-DMMP0002221).
Cho, B.H., et al., "Analysis and Design of Multi-Stage Distributed Power Systems," Virginia Power Electronics Center, undated, pp. 55-61. (DMMP0002222-DMMP0002228).
Choi, Byungcho, et al., "Intermediate Line Filter Design to Meet Both Impedance Compatibility and EMI Specifications," IEEE Transactions on Power Electronics, vol. 10, No. 5, Sep. 1995, copyright 1995 IEEE, pp. 583-588, ISBN 0885-8993/95. (ARTN00001183-ARTN00001188).
Choi, Byungcho, Ph.D., "Dynamics and Control of Switchmode Power Conversions in Distributed Power Systems," Unpublished doctoral dissertation, Virginia Polytechnic Institute and State University, 1992, pp. 1-189, 200 pages. (ARTN00000983-ARTN00001182).
Cobos, J., et al., "Active Clamp Pwm Forward Converter with Self Driven Synchronous Rectification," S.20.0 DC/DC Converters: Distributed Power, pp. 200-206, undated.(DMMP0002229-DMMP0002235).
Cobos, J.A., "Resonant reset forward topologies for low output voltage on board converters," Applied Power Electronics Conference and Exposition, 1994. APEC '94. Conference Proceedings 1994., Ninth Annual, pp. 703-708, vol. 2.
Cobos, J.A., et al., "Comparison of High Efficiency Low Output Voltage Forward Topologies," copyright 1994 IEEE, pp. 887-894, ISBN 0-7803-1859-5/94. (DMMP0002236-DMMP0002243).
Cobos, J.A., et al., "Optimized Synchronous Rectification Stage for Low Output Voltage (3.3V) DC/DC Conversion," 25th Annual IEEE Power Electronics Specialists Conference, Jun. 20-25, 1994, vol. 2, pp. 902-908, 8 pages. (DMMP0002258-DMMP0002265).
Cobos, J.A., et al., "RCD Clamp PWM Forward Converter With Self Driven Synchronous Rectification," copyright 1993 IEEE, pp. 1336-1341, ISBN 0-7803-0891-3/93. (DMMP0002266-DMMP0002271).

Cobos, J.A., et al., "Low Output Voltage DC/DC Conversion," 20th International Conference on Industrial Electronics, Control and Instrumentation, Sep. 5-9, 1994, copyright 1994 IEEE, pp. 1676-1681, ISBN 0/7803-1328-3/94.
Cobos, J.A., et al., "New Driving Scheme for Self Driven Synchronous Rectifiers," Fourteenth Annual Applied Power Electronics Conference and Expedition, vol. 2, pp. 840-846, Mar. 14-18, 1999. ISBN 0-7803-5160-6. (DMMP0002250-DMMP0002257).
Cobos, J.A., et al., "Self Driven Synchronous Rectification in Resonant Topologies: Forward ZVS-MRC, Forward ZCS-QRC and LCC-PRC," 0-7803-0582-5, 1992 IEEE, pp. 185-190.
Cobos, J.A., et al., "Several Alternatives for Low Output Voltage on Board Converters," pp. 163-169(1998). ISBN 0-7803-4340-9. (DMMP 0002278-DMMP 0002284).
Copy of photograph from Tektronix, Inc.'s, "TM 503 Power Module Instruction Manual," Rev. May 1984. (See DMMP0007937-DMMP0007995). (DMMP0007936).
Croll, P., et al., "Multiple Output DC/DC Zero-Current Switch Quasi-Resonant Converter," S.20.0 DC-DC Converters—Distributed Power, Convertisseurs Continu-Continu, pp. 215-220. (ARTN00001260-ARTN00001265).
Curatolo, T., "Choosing a power architecture", © 2008, cited in SynQor's Supplemental Information Disclosure Statement filed Apr. 8, 2015.
Da Ponte, Manuel Dos Santos, "Hybrid Generator Apparatus," ZA Application No. 97/11503, Jun. 24, 1998, 49 pages. (DMMP 0014736-0014784).
Data Sheet-HW100F and HW100A Power Modules dc-dc Converters, 36Vdc to 75 Vdc Input, 3.3Vdc or 5Vdc Output, 100W, May 1999. (DMMP 0051717-DMMP 0051732).
De Hoz, A., et al., "Analysis and Design of a Zero Current Switched Quasi-Resonant Converter with Synchronous Rectification for Low Output Voltage Applications," pp. 221-228 (1992). ISBN 0-78030695-3. (DMMP0002312-DMMP0002319).
De la Cruz, E., et al., "Performances Comparison of Four Practical Implementations Based on PWM, Quasi and Multiresonant Topologies for on Board DC/DC Converters in Distributed Power Architectures," pp. 917-925 (1992). ISBN 0-7803-0695-3. (DMMP0002296-DMMP0002304).
De la Cruz, et al. "Analysis of Suitable PWM Topologies to Meet Very High Efficiency Requirements for on Board DC/DC Converters in Future Telecom Systems," 15th International Telecommunications Enemy Conference-vol. 2 Sep. 27-30 1993 pp. 207-214.
Delphi Series E48SB, 240W Eighth Brick Bus Converter DC/DC Power Modules: 48Vin, 12V/20A Out Datasheet, Delta Electronics, Inc. (PTX 321).
Diaz, J., et al., "A New Family of Loss-Less Power MOSFET Drivers," Power Electronics Congress, 1994. Technical Proceedings. CIEP '94., 3rd International, pp. 43-48; ISBN: 0-7803-2068-9.
Diaz, J., et al., "A New Lossless Power Mosfet Driver Based on Simple DC/DC Converters," pp. 37-43 (1995). ISBN 0-7803-2730-6. (DMMP0016081-DMMP0016087).
Diazzi, C, et al., "80W-400W Monolithic Buck Regulators Integrated in Multipower BCD Technology," HFPC May 1988 Proceedings, pp. 212-226. (DMMP0002538-DMMP0002552).
Dixon, L.H., Jr., "High Power Factor Preregulators for Off-Line Power Supplies," Unitrode Corporation and Texas Instruments Incorporated, pp. 6-1 through 6-16(2003). (DMMP0002568-DMMP0002585).
Dr. Martin Schlecht, "Choosing an On-Board Power Architecture", EDN, May 2004. (formerly exhibit A220).
Dwane, Patrick, et al., "A Resonant High Side Gate Driver for Low Voltage Applications," copyright 2005 IEEE, pp. 1979-1985, ISBN 0-7803-9033-4/05. (DMMP0016088-DMMP0016094).
Ericsson, Inc., "Selection of Architecture for Systems using Bus Converters and Pol Converters," Ericsson Design Note 023, copyright May 2005, pp. 1-7. (DMMP0003503-DMMP0003509).
EUS34-096 Isolated Bus Converter Datasheet, Murata Power Solutions, 2008 (PTX 516).
Excerpt from the IEEE Standard Dictionary of Electrical and Electronic Terms, ANSI/IEEE Std 100-1984.

(56) References Cited

OTHER PUBLICATIONS

Farrington, R., et al, "Comparison of Single-Ended-Parallel MRC and Forward MRC," pp. 203-210(1992). ISBN 0-7803-0485-3. (DMMP0003510-DMMP0003517).

Ferencz, Andrew, "A 250 W High Density Point-of-Load Converter," S.B.E.E. Massachusetts Institue of Technology, Partial Master's Thesis, Sep. 1989, 117 pages. (DMMP 0003518-0003577).

Ferenczi, Odon, "Power Supplies, Part B: Switched-Mode Power Supplies," StuElsevier Science Publishers, copyright 1987, pp. 352-558, 88 pages, ISBN 0-444-98998-6/87. (DMMP0003638-DMMP0003725).

Ferreira, J.A., et al., "A Self Oscillating Bidirectional DC to DC Converter Employing Minimum Circuitry," Undated, pp. 125-129. (DMMP0017541-DMMP0017545).

Firek, C. And Kent, B. "Reduce Load Capacitance in Noise-Sensitive High-Transient Applications, through Implementation of Active Filtering." PICOR Corporation, Aug. 2007. Accessed: May 10, 2016. <http://www.vicorpower.com/documents/whitepapers/wp_load_capa citance.pdf>.

Fisher, R.A., et al., "A 1 MHz 100W Commercial, High-DensityPoint-of-Load Power Supply Using Direct-Bond Copper and Surface Mount Technologies," Fifth Annual IEEE Applied Power Electronics Conference and Exposition, Mar. 11-16, 1990, pp. 55-63. (DMMP0003737-DMMP0003747).

Franz, Gerhard A., "Multilevel Simulation Tools for Power Converters," copyright 1990 IEEE, pp. 629-633, IEEE Catalog No. CH 2853-0/90/0000-0629. (DMMP 0003779-DMMP0003783).

Gachora, John Mburu, "Design of a Four-Phase Switchmode High Efficiency Power Supply," Unpublished master's thesis, Massachusetts Institute of Technology, Cambridge, MA (May 16, 1994). (ART00001449-ART00001516) (DMMP 0052003-DMMP0052070).

Garcia O., "Zero voltage switching in the PWM half bridge topology with complementary control and synchronous rectification," Power Electronics Specialists Conference, 1995. PESC '95 Record, 26th Annual IEEE (vol. 1), pp. 286-291.

Garcia, O., et al., "PCB Based Transformers for Multiple Output DC/DC Converters," pp. 51-55 (1995). ISBN 0-7803-3071-4. (DMMP0003784-DMMP0003788).

Gaudreau, M.P.J., et al., "Solid-State High Voltage, DC Power Distribution & Control," Proceedings of the 1999 Particle Accelerator Conference, New York, 1999, copyright 1999 IEEE, pp. 568-570. ISBN 07803-5573-3/99. (DMMP0003795-DMMP0003797).

Gegner, J.P., et al., "High Power Factor AC-to-DC Converter Using a Reactive Shunt Regulator," pp. 349-355 (1994). ISBN 0-7803-1859-5. (DMMP0003931-DMMP0003937).

Ghislanzoni, L., "Parallel Power Regulation of a Constant Frequency, ZV-ZC Switching Resonant Push-Pull," Proceedings of the European Space Power Conference, Florence, Italy, Sep. 2-6, 1991. (ESA SP-320, Aug. 1991). ISBN 92-9092-122-6. (DMMP 0003938-DMMP 0003947).

Gillett, J.B., et al., "Transistor Rectifier-Regulator," IBM Technical Disclosure Bulletin, vol. 22, No. 6, Nov. 1979, pp. 2319-2320. (ART00001517-ART00001519).

Goodenough, Frank, "Building-block converters distribute power throughout large systems," Electronic Design, Jan. 24, 1995 pp. 202-203, 1 page (DMMP 0002586).

Goodenough, Frank, "Power-Supply Rails Plummet and Proliferate," Electronic Design, Jul. 24, 1995, pp. 51-54. (DMMP 0003948-DMMP 0003951).

Gottlieb, Irving M., "Power Supplies, Switching Regulators, Inverters and Converters, Second Editiion," Tab Books, copyright 1994, pp. 1-479, 483 pages, ISBN 0-8306-4405-9 (H). (DMMP0003952-DMMP0004434).

Gottlieb, Irving M., "Power Control with Solid State Devices," pp. 1-372, Reston Publishing Company, Inc. 1987.

Graf, Rudolf F., "Converter and Filter Circuits," Butterworth-Heinemann, (1997). ISBN 0-75069878-0. (DMMP 0004435-DMMP 0004629).

Grant, Duncan A., et al., "Power MOSFETS: Theory and Applications," Chapter 7.1, pp. 183-253; John Wiley & Sons. (DMMP0017546-DMMP0017617). Apr. 1989.

Greenland, P., "Start:DPA Developments: A Reason for Change in Power Conversion," retrieved from http://www.powermanagmentdesignline.com/52200069 on Dec. 15, 2007, Nov. 5, 2004, 4 pages. (DMMP0004630-DMMP0004633).

Greenland, Paul, et al., "A Two Chip Set Achieves Isolation Without Compromising Power Supply Performance," Proceedings of the Power Electronics Show & Conference, Oct. 7-9, 1986, pp. 390-395, 6 pages. (DMMP0017464-DMMP0017469).

Grossman, Morris, "Power Module Lets Users Customize Supplies," Electronic Design for Engineers and Engineering Managers—Worldwide, Jun. 25, 1981, p. 213, 3 pages. (DMMP0017618-DMMP0017620).

Gutmann, R.J., "Application of RF Circuit Design Principles to Distributed Power Converters," IEEE Transactions of Industrial Electronics and Control Instrumentation, pp. 156-164 (1980). ISSN 0018-9421. (DMMP0004638-DMMP0004646).

Hadjivassilev, ST., et al., "Front-End Converter System for Distributed Power Supply," ENE Conference on Power Electronics and Applications, Sep. 13-16, 1993, Publication No. 377 vol. 3 Electronic Power Supply Systems. ISBN 0-85296-585-0. (DMMP 0004672-DMMP 0004679).

Hamo, D., "A 360W, Power Factor Corrected, Off-Line Power Supply, Using the HIP5500," Intersil Intelligent Power, No. AS9417, Nov. 1994, pp. 1-6. (DMMP0004680-DMMP0004685).

Harada, Kazurou, et al., "A Novel ZVS-PMW Half-Bridge Converter," copyright 1994 IEEE, pp. 588-593, ISBN 0-7803-2034-4/94. (DMMP0016222-DMMP0016227).

Harada, Kazurou, et al., "Analysis and Design of ZVS-PWM Half-Bridge Converter with Secondary Switches," copyright 1995 IEEE, pp. 280-285, ISBN 0/7803-2730-6/95. (DMMP0016228-DMMP0016233).

Harper, D.J. et al.; "Controlled Synchoronous Rectifier," Proc. IEEE Applied, Power Electronics Conf., 1988, pp. 165-172 (DMMP 0017438-00174447) (DMMP 007486-0017).

Hartman, W.D., "System Designer's Guide to Modular DC/DC Converters," Electronic Products, vol. 30, No. 19, Mar. 1, 1998. (DMMP0004686-DMMP0004692).

Hartman, William D., "System Designer's Introduction to Modular DC/DC Converters," Proceedings of the Power Electronics Show & Conference, Anaheim, CA, Feb. 22-25, 1988, copyright 1998, pp. 185-190, 8 pages. (DMMP0004693-DMMP0004700).

Heath, "The market for Distributed Power Systems," Proc. Of the Sixth Annual Applied Power Electronics Conference and Exposition (Mar. 10-15, 1991) pp. 225-229.

Higashi, T., et al., "On the Cross Regulation of Multi-Output Resonant Converters," 1988 Spring National Convention Record, The Institute of Electronics, Information and Communication Engineers, pp. 289-290 (Mar. 28-31, 1988). (DMMP0016234-DMMP0016236). Translation not available.

Honeywell, Inc., "Low Input Voltage D.C. to D.C. Converter, Final Report, Contract No. NAS 5-3441, National Aeronautics and Space Administration," Jun. 26, 1963-Mar. 26, 1984. (DMMP0007745-DMMP0007862).

Hsieh, Guan-Chyun, et al., "A Study on Full-Bridge Zero-Voltage Switched PWM Converter: Design and Experimentation," copyright 1993 IEEE, pp. 1281-1285, 5 pages, ISBN 0-7803-0891-3/93. (DMMP0004711-DMMP0004715).

Hua, G.C., et al., "Development of a DC Distributed Power System," pp. 763-769 (1994). ISBN 0-7803-1456-5. (DMMP0004716-DMMP0004722).

Huang, Hong, "Coordination Design Issues in the Intermediate Bus Architecture," DCDC Technical White Paper from Astec Power, Jul. 2004, 8 pages. (DMMP0004723-DMMP0004730).

Huillet, H., et al., "High Frequency Quasi-Resonant Buck Converter on Insulated Metal Substrate for Avionics Distributed Power Systems," pp. 647-653 (1992). ISBN 0-7803-0485-3. (DMMP0004731-DMMP0004737).

Huliehel, F.A., et al., "A New Design Approach for Distributed Power Systems," VPEC, copyright 1993 VPEC, pp. 214-218. (DMMP0004738-DMMP0004742).

(56) References Cited

OTHER PUBLICATIONS

Hunter, R.D., "Regulatory and Technological Trends in Power Supplies," pp. 10-15 (1993). IEEE Catalog No. CH3310-0/93/0000-0002. (DMMP0004743-DMMP0004748).
IBM Technical Disclosure Bulletin, "Cross-Coupled Gates Synchronous Rectifier," vol. 35, No. 4A, Sep. 1992, pp. 462-463, 3 pages. [ARTN00002775-ARTN00002777].
IEEE Technology Update Series, "Power Electronics Technology and Applications 1993," Pierre A. Thollot, ed., NJ: IEEE Technical Activities Board, 1992, 85 pages. ISBN 0-7803-0880-8. (DMMP0007560-DMMP0007644).
International Search Report dated Jul. 14, 1998 for PCT Application PCT/98/01498.
Intersil Corp., Intersil's New PWM Controller Advances Power Conversion Performance for Telecom, Datacom and File Server Applications, Jun. 2004.
Ivensky, G., et al., "A Resonant DC-DC Transformer," IEEE, copyright 1992, pp. 731-737, ISBN 07803-0485-3. (DMMP0004781-DMMP0004787).
Jacobs, ME., et al., "Distributed Power Architecture Concepts," Intelec International Telecommunications Energy Conference, New Orleans, LA, Nov. 4-7, 1984, copyright 1984 IEEE, pp. 105-109, 7 pages, IEEE Catalog No. CH2073-5/84/0000-0105. (DMMP0004788-DMMP0004794).
Jamerson, C, "Post-Regulation Techniques for 100 KHz to 300 KHz Multiple-Output PWM Supplies (Limitations, Trends, and Predictions)," Technical Papers of the Fourth International High Frequency Power Conversion Conference, May 14-18, 1989, Naples, FL, pp. 260-273. (DMMP0004817-DMMP 0004831).
Jamerson, Cliff, et al., "1500 Watt Magnetics Design Comparison: Parallel Forward Converter vs. Dual Forward Converter," Technical Papers of the Fifth International High Frequency Power Conversion 1990 Conference, Santa Clara, CA, May 6-11, 1990, copyright 1990, pp. 347-358, 14 pages. ISBN 0-931033-25-X. (DMMP0004803-DMMP 0004816).
Jenson, James Lee, "An Improved Square-Wave Oscillator Circuit," IEEE Transactions on Circuit Theory, pp. 276-279, Sep. 1957. (DMMP0016237-DMMP0016240).
Jitaru, I.D., et al., "High efficiency DC-DC converter," Applied Power Electronics Conference and Exposition, 1994. APEC '94. Conference Proceedings 1994., Ninth Annual, pp. 638-644, vol. 2.
Jitaru, Ionel Dan, "Zero Voltage PWM, Double Ended Converter," HFPC, 1992, pp. 394-405.
Jitaru, Ionel Dan, "The Impact of Low Output Voltage Requirements on Power Converters," Technical Papers of the Tenth International High Frequency Power Conversion 1995 Conference, San Jose, CA, May 6-12, 1995, pp. 1-10, ISBN 0-931033-54-3. (DMMP 0004855-DMMP 0004866).
Jovanovic, M. et al. "Distributed power systems—benefits and challenges". Int. J. Electronics, vol. 77 No. 5, 1994, copyright 1994 Taylor & Francis Ltd, pp. 601-612, ISBN 0020-7217/94.
Jovanovic, M.M., et al, "Design Considerations for Forward Converter with Synchronous Rectifiers," Virginia Power Electronics Center, 1993 Power Electronics Seminar, Sep. 19-21, 1993, pp. 163-173. (DMMP0004867-DMMP0004879).
Jovanovic, Milan M., et al., "Evaluation of Synchronous-Rectification Efficiency Improvement Limits in Forward Converters," IEEE Transactions on Industrial Electronics, vol. 42, No. 4, Aug. 1995, copyright 1995 IEEE, pp. 387-395, ISSN 0278-0046/95. (DMMP0004880-DMMP0004888).
Kagan, Richard, et al., "Improving Power Supply Efficiency with MOSFET Synchronous Rectifiers," Proceedings of Powercon9 Ninth International Solid-State Power Electronics Conference Washington, D.C, Jul. 13-15, 1982, copyright 1982, D-4 pp. 1-5, 6 pages. (DMMP0004978-DMMP0004983).
Kang, Young G., et al., "A Parallel Resonant Converter with Postregulators," IEEE Transactions on Power Electronics. Apr. 1992.

Kassakian, John G., et al., "High-Frequency High-Density Converters for Distributed Power Supply Systems," Proceedings of the IEEE, vol. 76, No. 4, Apr. 1988, copyright 1988 IEEE, pp. 362-376, ISBN 0018-9219/88/0400-0362.
Klapfish, M., "Trends in AC/DC Switching Power Supplies and DC/DC Converters," pp. 361-365 (1993). ISBN 0/7803-0982-0. (DMMP0005149-DMMP0005153).
Kociecki, John, et al., "A High Power-Density DC-DC Converter Board," Second Annual IEEE Applied Power Electronics Conference and Exposition, Mar. 2-6, 1987, copyright 1987, San Diego, CA, pp. 169-180, 14 Pages, IEEE Catalog No. 87CH2402-6. (DMMP0005154-DMMP0005167).
Kollman, R., et al., "Processor Power Subsystem Architectures," pp. 1183-1189 (2000). ISBN 07803-5864-3. (DMMP0005175-DMMP0005181).
Korman, C.S., et al., "A Synchronous Rectifier for High-Density Power Supplies," HFPC—May 1985 Proceedings, pp. 126-139. (ARTN00001864-ARTN00001875).
Krauthamer, S., "High Efficiency Synchronous Rectification in Spacecraft Power Systems," European Space Power Conference, Graz, Austria, Aug. 23-27, 1993, pp. 1-5. (DMMP0017506-DMMP0017510).
Krauthamer, Stan, et al., "State-of-the-Art of DC Components for Secondary Power Distribution on Space Station Freedom," Fifth Annual IEEE Applied Power Electronics Conference and Exposition, Los Angeles, CA, Mar. 11-16, 1990, 16 pages. (DMMP0005182-DMMP0005197).
Krein, P.T., et al., "Autonomous Control Technique for High-Performance Switches," IEEE Transactions on Industrial Electronics, vol. 39, No. 3, Jun. 1992, copyright 1992 IEEE, pp. 215-222, ISSN 0278-0046/92. (DMMP0005198-DMMP0005205).
Lam, E., et al., "Revolutionary Advances in Distributed Power Systems," pp. 30-36 (2003). ISBN 0-7803-7768-0. (DMMP0005206-DMMP0005212).
Lee, F.C., et al., "Power Management Issues for Future Generation Microprocessors," pp. 27-33 (1999). ISBN 0-7803-5290-4. (DMMP0005213-DMMP0005219).
Lemnios, Zachary J., et al., "Low-Power Electronics," IEEE Design & Test of Computers, winter 1994, copyright 1994 IEEE, pp. 8-13, ISSN 0740-7475/94. (DMMP0005220-DMMP0005225).
Leu, C.S., et al., "Analysis and Design of R-C-D Clamp Forward Converter," HFPC, 1992.
Leu, Ching-shan, et al, "A High-Frequency AC Bus Distributed Power System," Virginia Power Electronics Center, 1990 Power Electronics Seminar, Sep. 17-19, 1990, pp. 98-107. (DMMP0005226-DMMP0005237).
Leung, H.M., "SPICE Simulation and Modeling of DC-DC Flyback Converter," Master fo Science in Electrical Engineering and Computer Science Thesis, Massachusetts Institute of Technology, Aug. 1995, 65 pages. (DMMP0005250-DMMP0005314).
Lewis, L.R., et al., "Modeling, Analysis and Design of Distributed Power Systems," pp. 152-159 (1989). IEEE Catalog Number: CH2721-9/89/0000/0152. (DMMP0005315-DMMP0005322).
Lewis, R., et al., "Distributed Power System Analysis, Final Report Prepared for IBM Corporation," Mar. 1989, Virginia Power Electronic Center, Bradley Department of Electrical Engineering, Virginia Polytechnic Institute and State University, Mar. 1989. (ARTN00001905-ARTN00002179).
Liang, Y.C., et al, "Design Considerations of Power MOSFET for High Frequency Synchronous Rectification," IEEE Transactions on Power Electronics, vol. 10, No. 3, May 1995, pp. 388-395, 10 pages, ISSN 0885-8993/95. (DMMP0005323-DMMP0005332).
Lindman, P., "Powering Tomorrow's Data Internetworking Systems," Ericsson Microelectronics, pp. 506-511, undated. (DMMP0005342-DMMP0005347).
Lindman, P., et al., "Applying Distributed Power Modules in Telecom Systems," IEEE transactions on Power Electronics, vol. 11, No. 2, Mar. 1996, copyright 1996 IEEE, pp. 365-373, ISSN 0885-8996/96. (DMMP0005333-DMMP0005341).
Lineage Power Datasheet, QUK240 Series Power Modules; DC-DC Converters, Jun. 17, 2009.
Linera, F.F., et al., "Closing the Feedback Loop in the Half-Bridge Complementary-Control DC-to-DC Converter," Twelfth Annual

(56) References Cited

OTHER PUBLICATIONS

Applied Power Electronics Conference and Exposition vol. 2, Feb. 23-27, 1997, Atlanta, GA. ISBN 0-7803-3704-2. (DMMP0005348-DMMP0005354).
Lingle, John T., "Low Input Voltage D.C. To D.C. Converter Final Report," National Aeronautics and Space Administration, Contract No. NAS May 3441, pp. 1-64, Appendices A-C; Jun. 26, 1963-Mar. 26, 1964. (DMMP0016245-DMMP0016362).
Lo, D.S., et al, "Development of a DC-to-DC Power Converter for Distributed Power Processing," Unisys Corporation, IEEE Catalog No. CH2719-3/89/0000-0413, copyright 1989 IEEE, pp. 413-422. (ARTN00002211-ARTN00002220).
Lo, D.S., et al., "A Compact DC-to-DC Power Converter for Distributed Power Processing," IEEE Transactions on Power Electronics, 7:714-724 (1992). ISSN 0885-8993/92. (DMMP0005355-DMMP0005367.
Lo, Edward Wai-chau, "Cost Analysis of Powering an Optical Customer Access Network," ntelec Fourteenth International Telecommunications Energy Conference, Oct. 4-8, 1992, Washington, D.C, pp. 96-103. ISBNO-7803-0779-8. (DMMP 0005368-DMMP 0005377).
Lucent Technologies, "Data Sheet-NH020-Series Power SIPs: 5 Vdc input; 1.5Vdc Output; 20W", Jun. 1999.
Maksimovic, Dragan, "A Mos Gate Drive with Resonant Transitions," copyright 1991, pp. 527-532, ISBN 0-7803-0090-4. (DMMP0016363-DMMP0016368).
Malik, R., "The Power System Challenge—Understanding the Total Picture," IEEE, pp. 202-208 (2003). ISBN 0-7803-7768-0. (DMMP0005378-DMMP0005384).
Mammano, B., "Distributed Power Systems," pp. 1-1-1-12, Unitrode Corporation (1993). (DMMP0005385-DMMP0005396).
Mammano, R., "Isolating the Control Loop," Unitrode Corporation and Texas Instruments Incorporation, 2001, pp. 2-1-2-16. (DMMP0005397-DMMP0005413).
Mannion, Patrick, "New Challenges Place Power Squarely in the Spotlight," Electronic Design, Nov. 3, 1997, 8 pages, numbers illegible. (ARTN00002826-ARTN00002832).
Marchetti, R. "Make a noise for DC-DC Converters." Web article. Electronic Product Design & Test. Jul. 24, 2008. Accessed: May 13, 2016. < http://www.epdtonthenet.net/article/17812/Make-a-noise-for-DC-DC-converters.aspx>.
Marchetti, R., "Power Systems Architectures What's in? What's Out?," Battery Power Products & Technology, Nov. 2003, 2 pages. (DMMP 0005414-DMMP 0005415).
Matsuo, H., "Comparison of Multiple-Output DC-DC Converters using Cross Regulation," IEEE Power Electronics Specialists Conference, San Diego, CA, Jun. 18-22, 1979. IEEE Catalog No. 79CHI461-3 AES. (DMMP0005416-DMMP0005434).
Maxim Integrated Products, "Synchronous Rectification Aids Low-Voltage Power Supplies," Maxim Application Note, http://www.maxim-ic.com/appnotes.cfm/an_pk/652, Jan 31, 2001. (DMMP0005450-DMMP0005457).
Maxim Integrated Products, "Power Supplies for Telecom Systems," Sep. 6, 2000. (DMMP0005435-DMMP0005449).
McHale, J. "Complex military systems require efficient power electronics." Web article. Military Embedded Systems. MMXVI Military Embedded Systems, Dec. 17, 2013. Accessed: May 12, 2016. < http://mil-embedded.com/articles/complex-efficient-power-electronics/>.
MC-Service, "Service Manual for Sony DCR-VX1000/VX1000E RMT-803 Sony Digital Video Camera Recorder, (DMMP0007137-DMP0007435)." Contains the following supplements: "DCR-VC 1000NX 1000E RMT-803, Service Manual, Supplement-3: Electrical Part Changed," (DMMP0007382); "DCR-VX 1000NX 1000E RMT-803, Service Manual, Supplement-2: Addition for Bist Check," (DMMP0007383-DMMP0007386) "DCR-VX 1000NX1000E RMT-803, Service Manual, Supplement-2: Addition for Bist Check," (DMMP0007387-DMMP0007390); "DCR-VX 1000/VX 1000E RMT-803, Service Manual, Supplement-1," (DMMP0007391-DMMP0007394); "DV Mechanical Adjustment Manual 1," (DMMP0007395-DMMP0007435).
Micro Linear "ML4873 Battery Power Control 1C General Description and Features", Jan. 1997 (DMMP 0005467-DMMP 0005467).
Micros Linear Corporation, "ML4873 Battery Power Control IC," Advance Information Data Sheet, Mar. 15, 1993, pp. 1-8 [DMMP 0005458-0005466].
Miles, F.M., et al., "Market Trends Toward Enhanced Control of Electronic Power Systems," copyright 1993 IEEE, pp. 92-98, ISBN 0-7803-0982-0. (DMMP0005468-DMMP0005474).
Miwa, B.A., "Hybrid Construction of a 10MHz DC-DC Converter for Distributed Power Systems," Unpublished master's thesis, Massachusetts Institute of Technology, Feb. 1989, 63 pages. (DMMP0005475-DMMP 0005537).
Miwa, B.A., et al., "High Efficiency Power Factor Correction Using Interleaving Techniques," copyright 1992 IEEE, pp. 557-568, ISBN 0-7803-0485-3. (DMMP 0005538-DMMP 0005549).
Miwa, Brett, et al., "Copper-Based Hybrid Fabrication of a 50W, 5 MHz 40V-5V DC/DC Converter," Massachusetts Institute of Technology, IEEE Catalog Number: CH 2719-3/89/0000-0256, copyright 1989 IEEE, pp. 256-264. (ART00002247-ART00002255).
Mohandes, Bijan, MOSFET Synchronous Rectifiers Achieve 90% Efficiency—Part I and Part II PCIM, Jun. 1991, pp. 10-13 & 55, 56, 58-61.
Moore, B.D., "Step-Up/Step-Down Converters Power Small Portable Systems," EDN, Feb. 3, 1994, pp. 79-84. (DMMP0005550-DMMP0005554).
Moore, Bruce, "Synchronous rectification aids low-voltage power supplies," EDN Access—Apr. 27, 1995, retrieved from http://www.edn.eom/archives/1995/042795/09dF4.htm on May 16, 2008. (ART00002256-ART00002262).
Morrison, D.G. "Sine Amplitude Converters: A New Class of Topologies for DC-DC Conversion." Web article. Electronic Design. Oct. 27, 2003. Accessed: Jun. 10, 2016. <http://electronicdesign.com/energy/sine-amplitude-converters-new-class-topologies-dc-dc-conversion>.
Motto, Jr., John William, "Introduction to Solid State Power Electronics", Powerex, Inc., Feb. 1977, 111 pages. (DMMP0005561-DMMP0005671).
MP1570 Design Note, MPS The Future of Analog IC Technology, Jan. 25, 2005 (PTX 1807).
Mullett, C.E., "The Role of the Power Source in System Design," Proceedings of the Power Sources Users Conference, Anaheim, CA, Oct. 15-17, 1985, 9 pages. (DMMP0005672-DMMP0005680).
Mullett, Charles E., "Practical Design of Small Distributed Power Systems," Power Conversion & Intelligent Motion, Jan. 1991, pp. 21-27, 9 pages. (DMMP0017511-DMMP0017519).
Murakami, N., et al, "A Highly Efficient Low-Profile 300-W Power-Pack for Telecommunications Sytems," pp. 786-792 (1994). ISBN 0-7803-1456-5. (DMMP0005697-DMMP0005703).
Murakami, N., et al., "A high-efficiency 30 W board mounted power supply module," Telecommunications Energy Conference, 1991. INTELEC '91., 13th International, pp. 122-127.
Murakami, N., et al., "A Simple and Efficient Synchronous Rectifier for Forward Dc-Dc Converters," copyright 1993 IEEE, pp. 463-468. ISBN 0-7803-0982-0. (ARTN0002288-ARTN00002293).
Mweene, L, et al., "A high-efficiency 1.5 kW, 390-50 V half-bridge converter operated at 100% duty-ratio," Applied Power Electronics Conference and Exposition, 1992. APEC '92. Conference Proceedings 1992., Seventh Annual, pp. 723-730.
Mweene, Loveday H., et al, "A 1 kW, 500 kHz Front-end Converter for Distributed Power Supply System," pp. 423-432 (1989). IEEE Catalog No. CH2719-3/89. (DMMP0017520-DMMP0017529).
Mweene, Loveday Haachitaba, "The Design of Front-End DC-DC Converters of Distributed Power Supply Systems with Improved Efficiency and Stability" Doctor of Science, Massachusetts Institute of Technology, Sep. 1992, 184 pages. (DMMP 0005712-DMMP0005895).
Narveson, "How Many Isolated DC-DC's Do you Really Need?" Proc: of the Eleventh Annual Applied Power Electronics Conference. Mar. 1996.

(56) References Cited

OTHER PUBLICATIONS

Narveson, B., "What is the Right Bus Voltage?," copyright 1998 IEEE, pp. 883-888, ISBN 0-7803-4340-9. (DMMP0005900-DMMP0005905).
Narveson, B., et al., "Why the Market is Ready for a Non-Isolated DC/DC Power Module Standard," copyright 2004 IEEE, pp. 335-341, ISBN 0-7803-8269-2. (DMMP0005906-DMMP0005912).
Newhart, Milton, "Product Report on DC-DC Converters," Electronic Design, vol. 34, Issue 21, pp. 169-170, Sep. 11, 1986. (DMMP0005920-DMMP0005921).
Niemela, V. A., et al., "Comparison of GaAs and Silicon Synchronous Rectifiers in a 3.3V Out, 50W DC-DC Converter", Jul. 1996, 861-867, PESC96 Record, vol. 1 27th Annual IEEE Power Electronics Specialists Conference.
Nochi, H., et al., "Full-Wave Current Resonant Multi-Output Converters," Copyright 1990 IEEE, pp. 528-535, IEEE Catalog No. CH2873-8/90. (DMMP0005922-DMMP0005929).
Ollero, S., et al., "New Post-Regulation and Protection Methods for Multiple Output Power Converters With Synchronous Rectification," copyright 1996 IEEE, pp. 462-469, ISBN 0-7803-3507-4. (DMMP0005930-DMMP0005937).
Osiichin, N., et al., "Evolving Central-Office Powering Architecture," Fifth International Telecommunications Energy Conference; Oct. 18-21, 1983, 7 pages, IEEE Catalog No. 83CH1855-6. (DMMP0016418-DMMP001624).
Pagotto, L., "Distributed Power Supplies, Course Notes for a Seminar Presented During the Power Electronics Conference '90," the Power Electronics Conference '90, Feb. 14-16, 1990, pp. 176-185, 12 pages. (DMMP0005938-DMMP0005949).
Panov, Y., et al., "Design and Performance Evaluation of Low-Voltage/High-Current DC/DC OnBoard Modules," Fourteen Annual Applied Power Electronics Conference and Exposition, vol. 1, Mar. 14-18, 1999, pp. 545-552, Dallas, TX. ISBN 0-7803-5160-6. (DMMP0005950-DMMP0005958).
Patel, R. "Power Supply Design Seminar," Unitrode Corporation, copyright 1993, 267 pages. (5YN00865314-5YN00865578).
Pedersen, F.H., "Low Voltage High Efficiency Power Conversion," Proceedings of the Fifth European Space Power Conference, Tarragon, Spain, Sep. 21-25, 1998, ESA SP-416, Sep. 1998, pp. 51-56. (ARTN00002519-ARTN00002524).
Pepper, S.H., "A New High Efficiency Post-Regulation Technique for Multiple Output Converters," Ninth International Solid-State Power Electronics Conference, Washington, D.C, Jul. 13-15, 1982, pp. D-3 p. 1-D-3 p. 9. (DMMP0005968-DMMP0005977).
Perkinson, Joseph, "UPS Systems—A Review," Third Annual IEEE Applied Power Electronics Conference and Exposition, Feb. 1-5, 1988, pp. 151-154, 5 pages, IEEE Catalog No. CH2504-9. (DMMP0016425-DMMP0016429).
Peterson, William A., et al., "A Half Bridge, Self-Oscillating, Multi-Resonant Converter Circuit," copyright 1993, pp. 77-84, ISBN 0-7803-0982-0. (DMMP0016430-DMMP0016437).
Power-Management Solutions for Telecom Systems Improve Performance, Cost, and Size, Brian C. Narveson, Texas Instruments Incorporated, 2007 (PTX 1850).
Proposal for Celestica FixedRatio Product Family, Celestica, 2002 (PTX 536).
PTX 1801, Choi, B., et al., The Stacked Power System: A New Power Conditioning Architecture for Mainframe Computer Systems, IEEE 1991.
PTX 1802, Balogh, L., Design Review: 140W, Multiple Output High Density DC/DC Converter, Power Supply Design Seminar, Unitrode/Texas Instruments 1997.
PTX 1804, Lukasik, T., Driving Today's Power Systems, Power Technology: A Special Supplement to EDN, Pt. 2, Power Technology Architectures, May 2004.
PTX 1805, Greenland, P., Trends in distributed-power architecture, National Semiconductor; Aug. 2004.
PTX 1806, Morrison, D., Bus Converters Push Power Levels Higher, Power Electronics Technology, Jul. 2005.
PTX 1811, Lee, F.C., "Center Overview and Highlights", Center for Power Electronics Systems (CPES), an Engineering Research Center; Virginia Polytechnic University (lead), Apr. 2007.
PTX 1813, Miftakhutdinov, R., Improving System Efficiency with a New Intermediate-Bus Architecture.
PTX 1814, International Rectifier, Press Release: International Rectifier Introduces DC Bus Converter Chip Set Re-Defining Distributed Power Architecture for Networking and Communication Systems, (archived at International Rectifier's corporate website), Apr. 2003.
PTX 1822, Ren, Y., Ph.D. Dissertation (Virginia Polytechnic Institute): High Frequency, High Efficiency Two-Stage Approach for Future Microprocessors, Apr. 2005.
PTX 1824, Hendrix, T., The Evolution of Power Management and Conversion, Power Systems Design Europe, vol. 2, No. 2, Mar. 2005.
PTX 1849, Mweene, L., et al., Communications System Power Supply Designs, National Semiconductor, Jan. 2004 (archived at National Semiconductor website).
PWS727 PWS728 Isolated, Unregulated DC/DC Converters, Burr-Brown Data Sheet, Burr-Brown Corp., 1989, copyright Jun. 1992.
Qian, J., "Advance Single-Stage Power Factor Correction Techniques," unpublished doctoral thesis, Virginia Polytechnic Institute and State University, Sep. 25, 1997, 185 pages. (DMMP0006547-DMMP0006731.
QSW025A0B Series Power Modules Datasheet, Lineage Power Corporation, Feb. 16, 2009 (PTX 422).
Quarter-Brick IBC Series Application Note 190, Artesyn, Aug. 27, 2007 (PTX 104).
Ratajczak, Robin, "Linear/Switching Supply Isolates, Holds Down Noise," Electronic Design 25, Dec. 6, 1979, p. 156. (DMMP0002589-DMMP0002589).
Ren, Y., et al., "Two-Stage 48V Power Pod Exploration for 64-Bit Microprocessor," copyright 2003 IEEE, pp. 426-431, ISBN 0-7803-7768-0. (DMMP0006772-DMMP0006777).
Ren, Y., et al., A Family of High Power Density Unregulated Bus Converters, IEEE Transactions on Power Electronics, pp. 1045-54; 2005.
Renauer, J.G., "Challenges in Powering High Performance Low Voltage Processors," Eleventh Annual Applied Power Electronics Conference and Exposition, vol. 2, Mar. 3-7, 1996, San Jose, CA, 10 pages. ISBN 0-7803-3045-5. (DMMP0006778-DMMP0006787).
Rittenhouse, G.E., et al., "A Low-Voltage Power MOSFET With a Fast-Recovery Body Diode for Synchronous Rectification," 1990 IEEE, pp. 96-106, IEEE Catalog No. CH2873-8/90. [DMMP0006788-DMMP0006798).
Rodriguez, G.E., "Voltage Conversion and Regulation Techniques Employed in the Prime Converter for the Anchored Interplanetary Monitoring Platform (AIMP) Spacecraft," Supplement to IEEE Transactions on Aerospace and Electronics Systems, vol. AES-2, No. 6, Nov. 1966, pp. 466-476. (DMMP0006799-DMMP0006809).
Rostek, Paul M., "Power System Design for Massive Parallel Computer Systems," Ninth Annual Applied Power Electronics Conference and Exposition, vol. 2, Feb. 13-17, 1994, Orlando, FL, pp. 808-814, 9 pages. ISBN 0-7803-1456-5. (DMMP 0006810-DMMP 0006818).
Rozman, A.F., et al., "Circuit Considerations for Fast, Sensitive Low-Voltage Loads in a Distributed Power System," 1995 IEEE, pp. 34-42, ISBN 0-7803-2482-X. (DMMP0006828-DMMP0006836).
Rutledge, W.T., "Distributed Power 'Time for a Second Look,'", Conference Proceedings Intelec '86 International Telecommunications Energy Conference, Oct. 19-22, 1986, Toronto, Canada, 9 pages, ISBN 0-9692316-1-X. (DMMP0006837-DMMP0006845).
Sakai, E., et al., "Mosfet Synchronous Rectifier with Saturable Transformer Commutation for High Frequency Converters," 1993, pp. 1024-1031, ISBN 0-7803-1243-0. (DMMP0006846-DMMP0006853).
Sakai, Eiji, et al., "A New Synchronous Rectifier Using Bipolar Transistor Driven by Current Transformer," pp. 424-429 (1992). ISBN 0-7803-0779-8. (DMMP0017530-DMMP0017535).
Sakai, Eiji, et al., "Synchronous Rectifier for Low Voltage Switching Converter," pp. 1-5 (1995). ISBN 0-7803-2750-0. (DMMP0017536-DMMP0017540), pp. 471-475.

(56) References Cited

OTHER PUBLICATIONS

Salato, M. "The Sine Amplitude ConverterTM Topology Provides Superior Efficiency and Power Density in Intermediate Bus Architecture Applications." Rev. 1.1, Vicor Corporation, Jun. 2011. Accessed: Jun. 10, 2016. <http://cdn.vicorpower.com/documents/whitepapers/wp_sac.pdf>.
Sampson, P. et al., "Energy Systems Meeting the Requirements for Distributed Telecommunications Systems," Trends in Telecommunications, vol. 8, No. 3, pp. 24-32, undated. (DMMP0006854-DMMP0006862).
Sayani, M., et al., Analyzing and Determining Optimum On-Board Power Architectures for 48V-input Systems, Celestica Inc., Power Systems, 2003.
Schlecht, M., "The Fundamentals of Switching Regulators and Their Control Circuits", Aug. 27, 1998 (35 pages).
Schlecht, M., Research Results from the Study of a High Efficiency Highly Manufacturable DC-DC Converter, unpublished, pp. 1-32.
Schlect, SynQor, Inc., "IBA vs. DPA: What to Consider When Choosing an On-Board Power Architecture," A Technical White Paper by SynQor, pp. 1-4, undated. (DMMP0006863-DMMP0006866).
Schulz, S., et al., "Integrating a Series of High-Density Converters," PowerTechnics Magazine, pp. 32-37 (Jan. 1990). (DMMP0006874-DMMP0006878).
Schulz, S., et al., "Design Considerations for a Distributed Power System," pp. 611-617 (1990). IEEE Catalog No. CH2873-8/90. (DMMP0006867-DMMP0006873).
Schulz, Steven, "System Interactions and Design Considerations for Distributed Power Systems," Thesis submitted to Faculty of the Virginal Polytechnic Institute & State University, Jan. 21, 1991, 164 pages [ARTN00002558-00002721].
Schwarz, F.C., "A Controllable DC Transformer," Paper 18.3, presented at the 1970 Intermag Conference, Washington, D.C, Apr. 21-24, pp. 657-658. (DMMP0006879-DMMP0006880).
Sebastian, J., "Small-Signal Modeling Of The Half-Bridge Complementary-Control DC-to-DC Converter," 1995 IEEE, Oct. 16-19, 1995 [ARTN00002722-00002728].
Sebastian, J., el al., "An Overall Study of the Half-Bridge Complementary-Control DC-to-DC Converter," pp. 1229-1235 (1995). ISBN 0-7803-2730-6. (DMMP0006926-DMMP0006932).
Sebastian, J., et al., "A Complete Study of the Double Forward-Flyback Converter," PESC '88 Record, pp. 142-149(1988). IEEE Catalog No. CH2523-9/88. (DMMP0006881-DMMP 0006888).
Sebastian, J., et al., "A Study of the Two-Input DC-to-DC Switching Post-Regulators," pp. 35-45 (1996). ISBN 0-7803-3633-4. (DMMP0006904-DMMP0006914).
Sebastian, J., et al., "Average-Current-Mode Control of Two-Input Buck Postregulators Used in Power-Factor Correctors," pp. 569-576 (1999). ISSN 0278-0046/99. (DMMP0006889-DMMP0006896).
Sebastian, J., et al., "Input Current Shaper Based on the Series Connection of a Voltage Source and Loss-Free Resistor," pp. 461-467 (1998). ISBN 0-7803-4340-9. (DMMP0006897-DMMP0006896).
Sebastian, J., et al., "Very Efficient Two-Input DC-to-DC Switching Post-Regulators," pp. 874-880 (1996). ISBN 0/7803-3500-7. (DMMP0006933-DMMP0006939).
Severns, Rudolf P., et al., "Modern DC-To-DC Switchmode Power Converter Circuits," Van Nostrand Reinhold Company, 1985. ISBN 0-442-21396-4. (DMMP0016482-DMMP0016839).
Severns, Rudy, "Switchmode Converter Topologies-Make Them Work for You!", Intersil Inc. Application Bulletin A035, undated, 32 pages. (DMMP0004749-DMMP0004780).
Severns, Rudy, "The Power MOSFET As a Rectifier," Power Conversion International, Mar.-Apr. 1980, 3 pages [ARTN00002729-RTN0002731].
SGS-Thomson, "Microelectronics Application Note: Designing with the L296 Monolithic Power Switching Regulator," pp. 1-43 (1996). (DMMP0007082-DMMP0007124).

Shepard, Jeffrey D., "Power Supplies," by Reston Publishing Company (1984) 5 pages. ISBN 0-8359-5568-0. (DMMP 0007125-DMMP 0007129).
Shi, F., et al. "Fault Tolerant Distributed Power," pp. 671-677 (1996) 7 pages. ISBN 0/7803-3044-75. (DMMP0007130-DMMP0007136).
Shoyama, Masahito, et al., "Zero-Voltage-Switching by Magnetizing Current of Transformer in Push-Pull DC-DC Converter," Intelec'91, Nov. 1991, pp. 640-647. (ARTN00002763-ARTN0002770).
Small Services, Inc. Company Profile, retrieved from http://www.smallservices.net/, date: May 11, 2009 (8 pages).
Smith, Craig D., "Distributed Power Systems Via ASICs Using SMT," Surface Mount Technology, Oct. 1990, pp. 29-32. (ARTN00002771-ARTN00002774).
SQT54T38096 DC-DC Converter Preliminary Data Sheet, Power-One, Mar., 29, 2007 (PTX 624).
Steigerwald, Robert L., et al., "Investigation of Power Distribution Architectures for Distributed Avionics Loads," PESC95 Record, vol. 1, 26th Annual IEEE Power Electronics Specialists Conference, 1995, 9 pages. ISBN 0-7803-2730-6. (DMMP0007436-DMMP0007444).
Sun, Ning, et al., "Forward Converter Regulator Using Controlled Transformer," IEEE Transactions on Power Electronics, vol. 11, No. 2, Mar. 1996, pp. 356-364. ISSN 08858993/96. (DMMP0007445-DMMP0007453).
Suranyi, Gabriel G., "The Value of Distributed Power," pp. 104-110 (1995). ISBN 0-7803-2482-X. (DMMP0007465-DMMP0007471).
Suranyi, Gabriel G., "Bus Voltage Level Comparisons for Distributed Power Architectures," PCIM'94, Official Proceedings of the Twenty-Ninth International Power Conversion Conference, Sep. 17-22, 1994, pp. 10-18. ISBN 0-931033-51-9. (DMMP0007454-DMMP0007464).
SynQor Marketing Brochure, "SynQor High Efficiency DC/DC Converters," Rev. B, Nov. 2003, 24 pages. (DMMP0007472-DMMP0007495).
SynQor Marketing Brochure, "The PowerQor Series of DC/DC Converters." undated, 6 pages. (DMMP0007496-DMMP0007501).
SynQor, Inc. "SynQor, Inc. Technical Specification Non-Isolated SIP Cover 3.0-5.5V in 16A-NiQor", Jul. 6, 2004.
SynQor, Inc. "SynQor, Inc. Technical Specification Non-Isolated SMT Converter 9.6-14.4V in 16A-NiQor", May 28, 2004.
SynQor, Inc. "Technical Specification BQ50120QTA20," Mar. 17, 2006, 12 pages. (ARTN00005664.01-ARTN00005664.12).
SynQor, Inc. "Technical Specification: Product # NQ04T33VMA16, 16Amp, Wide Output Range, Non-Isolated DC/DC Converter," Jul. 6, 2006, 20 pages. (ARTN00005664.13-ARTN00005664.32).
SynQor, Inc. "Technical Specification: Product # NQ12T5OSMA16, 16A Non-Isolated, SMT DC/DC Converter with Wide Trim," May 28, 2004, 15 pages. (ARTN00005664.33-ARTN00005664.47).
SynQor, Inc. Press Release, "SynQor Introduces 1.2V output Module for60A series of Half-Brick DC/DC Converters," Mar. 28, 2002, 1 pages. (ARTN00002801-ARTN00002801).
SynQor, Inc. Press Release, "SynQor Introduces Wide-Input, Point-of-Load DC/DC Converters," Apr. 30, 2004, 1 page. (ARTN00002802-ARTN00002802).
SynQor, Inc. Press Release, "SynQor's Bus Converter Delivers 240 Watts in Quarter-Brick," Aug. 2, 2002, 1 page. (ARTN00005664.51-ARTN00005664.51).
SynQor, Inc., "SynQor-Advancing the Power Curve", Nov. 2003.
Tabisz, Wojciech, et al., "Present and Future of Distributed Power Systems," pp. 11-18 (1992). ISBN 0-7803-0485-3. (DMMP007502-DMMP0007509).
Takagi, Masakazu, et al., "Ultra High Efficiency of 95% for DC/DC Converter—Considering Theoretical Limitation of Efficiency," Seventeenth Annual IEEE Applied Power Electronics Conference and Exposition, Mar. 10-14, 2002, vol. 2, pp. 735-741. ISBN 0-7803-7404-5. (DMMP0007510-DMMP0007518).
Tam, Kwa-Sur, et al., "Functional Models for Space Power Electronic Circuits," IEEE Transactions on Aerospace and Electronic Systems, vol. 31, No. 1, Jan. 1995, pp. 288-296. (DMMP0007519-DMMP0007527).

(56) References Cited

OTHER PUBLICATIONS

Taylor, T.M., et al, "Distributed Power Processing: The Systems Solution," Fifth International Telecommunications Energy Conference, Tokyo, Japan, Oct. 18-21, 1983. (DMMP0007528-DMMP0007535).
TDK Innoveta Inc., and TDK Corporation Powerpoint Presentation, "Stability Analysis of Bus Architecture," 2004 IBM Power Technology Symposium, Sep. 14-15, 2004. (DMMP0007536-DMMP0007559).
Tektronix, Inc. "Instruction Manual for AA501 Distortion Analyzer With Options," Artek Media, Revised Nov. 1981, 161 pages. (DMMP0001345-DMMP0001505).
Tektronix, Inc., "PS5004 Precision Power Supply, Instruction Manual," Rev. Jan. 1986, 142 pages. (DMMP0006405-DMMP0006546).
Tektronix, Inc., "TM 5003 Power Module Instruction Manual," Rev. Dec. 1981, 73 pages.(DMMP0007863-DMMP0007935).
Tektronix, Inc., "TM 503 Power Module Instruction Manual," Rev. May 1984, 59 pages. (DMMP0007937-DMMP0007995).
Theron, P.C., et al, "Soft Switching Self-Oscillating FET-Based DC-DC Converters," pp. 641-648 (1992). ISBN 0-7803-0695-3. (DMMP0007645-DMMP0007652).
Thomas Financial, Venture Economics' Venture Capital Financings, Portfolio Company Report, pp. 1-2 (date not provided) (DMMP 0017621-DMMP 0017622).
Thomas Roddam, "Transistor Inverters and Converters," 1963 (Book).
Thorsell, Lars, "Mini DC-DC Supplies Simplify Redundancy in Parallel Systems," Academic OneFile, Gale. Northeastern University, Gale Document No. A6321372; Jul. 2008, 4 pages (DMMP0017335-DMMP0017338).
Thorsell, Lars, "Will Distributed On-Board DC/DC Converters Become Economically Beneficial in Telecom Switching Equipment," pp. 63-69 (1990). IEEE Catalog No. CH2928-0/90, 7 pages (DMMP0007738-DMMP0007744).
Traister, Robert J., "Voltage Regulator Circuit Manual," CA: Academic Press, Inc., et al. (1989), 153 pages. ISBN 0-12-697410-1. (DMMP0007996-DMMP0008148).
Tsai, Fu-Sheng, "A Low-Cost, Low-Loss Active Voltage-Clamp Circuit for Interleaved Single-Ended Forward PWM Converter," 1993 IEEE, pp. 729-733. (DMMP0008154-DMMP0008158).
Two-Stage Conversion Redefines Distributed Power Architecture, Ashok Bindra, May 1, 2003, webpage (PTX 1803).
Unknown, "Transistor Inverters and Converters," Chapters 7-11, pp. 116-204. (DMMP0016438-DMMP0016481).
Vazquez, M., et al., "Fixed Frequency Forward-Flyback Converter with Two Fully Regulated Outputs," pp. 161-166 (1995). ISBN 0-7803-2750-0. (DMMP0014238-DMMP0014243).
Vazquez, Manuel, et al., "A Systematic Approach to Select Distributed, Centralised or Mixed Power Architecture in Telecom Applications," pp. 129-136 (1998). ISBN 0-7803-5069-3. (DMMP0014230-DMMP0014237).
Vithanage, A., et al., "150W Board Mounted Power Supply Module Using Highly Compact and Efficient Synchronous Rectifiers," pp. 177-183. (1998). ISBN 0-7803-4340-9. (DMMP014244-DMMP0014250).
Vlatkovic, Vlatko, "Small-Signal Analysis of the Phase-Shifted PWM Converter," pp. 128-135 (1992). ISSN 0885-8993/92. (DMMP0014251-DMMP0014258).
Watson, Robert, "New Techniques in the Design of Distributed Power Systems," unpublished doctoral thesis, Virginia Polytechnic Institute and State University, Aug. 7, 1998, 12 pages. (DMMP0014259-DMMP0014270).
Webpage of CBQ25 Series, Intermediate Bus Converters, Lineage Power Corporation, 2010 (PTX1212).
Weinberg, Alan H., et al., "A New Zero Voltage and Zero Current Power-Switching Technique," IEEE Transactions on Power Electronics, vol. 2, No. 4, pp. 655-665; Oct. 4, 1992. ISSN 0885-8993. (DMMP0014271-DMMP0014281).
Weinberg, S.H., "A Novel Lossless Resonant MOSFET Driver," pp. 1003-1010 (1992). ISBN 0-7803-0695-3. (DMMP0017358-DMMP0017365).
White, Robert V., "Emerging On-Board Power Architectures," pp. 799-804 (2003). ISBN 0-7803-7768-0/03. (DMMP0014282-0014287).
White, Robert V., et al., "Principles of Fault Tolerance," pp. 18-25 (1996). ISBN 0-7803-3044-7/96. (DMMP0014294-DMMP0014301).
Wiegman, H.L.N., et al., "A Dual Active Bridge SMPS Using Synchronous Rectifiers," HFPC May 1990 Proceedings, pp. 336-346.
Wiegman, Herman L., "A Resonant Pulse Gate Drive for High Frequency Applications," pp. 738-743 (1992). ISBN 0-7803-0485-3. (DMMP0017366-DMMP0017371).
Wildrick, Carl M., et al., "A Method of Defining the Load Impedance Specification for a Stable Distributed Power System," IEEE Transactions on Power Electronics, vol. 10, No. 3, May, 1995, pp. 280-285. (ARTN00002865-ARTN00002870).
Xi, Y., et al., "A Zero Voltage Switching and Self-Reset Forward Converter Topology," pp. 827-833 (1999). ISBN 0-7803-5160-6/99 (DMMP0014694-DMMP0014700).
Xi, Y., et al., "An Improved Technique for the Synchronous Rectifier Mosfets in the Forward Converter Topology," CCECE'97, pp. 552-555 (1997). ISBN 0-7803-3716-6. (DMMP0014701-DMMP0014704).
Xi, Y., et al., "The Point of Use DC/DC Power Distribution: The Architecture and an Implementation," pp. 498-505 (2000). ISBN 0/7803-6407-4 (DMMP0004795-DMMP0004802).
Xi, Youhao, et al., "A Precisely Regulated Multiple Output Forward Converter Topology," Fifteenth Annual IEEE Applied Power Electronics Conference and Exposition, \i \i0 vol. 2, \i \i0 pp. 986-992; Feb. 6-10, 2000. IEEE Catalog No. 00CH37058 (DMMP0014686-DMMP0014693).
Xiao, Li et at al., "Soft Switched PWM DC/DC Converter With Synchronous Rectifiers," 1996 IEEE, pp. 476-484 [DMMP 0014705-0014713].
Xuefei, Xie, et al., "Studies of Self-Driven Synchronous Rectification in Low Voltage Power Conversion," IEEE 1999 International Conference on Power Electronics and Drive Systems, PEDS '99, pp. 212-217 (1999). ISBN 0-7803-5769-8 (DMMP0014714-DMMP0014719).
Yang, E.X., et al., "Isolated Boost Circuit for Power Factor Correction," Virginia Power Electronics Center: The VPEC Annual Power Electronics Seminar, pp. 97-104 (Sep. 20-22, 1992) (DMMP0014720-DMMP0014729).
Yang, Zhihua, et al., "A New Dual Channel Resonant Gate Drive Circuit for Synchronous Rectifiers," pp. 756-762 (2006). ISBN 0-7803-9547-6 (DMMP0017397-DMMP0017403).
Yoshida, Koji, et al., "A Novel Zero Voltage Switching Half Bridge Converter," pp. 566-572 (1994). ISBN 0-7803-2034-4 (DMMPOO 17404-DMMP0017410).
Yoshida, Koji, et al., "Zero Voltage Switching Approach for Flyback Converter," pp. 324-329 (1992). ISBN 0-7803-0779-8 (DMMP 0014730-DMMP0014735).
Yuancheng, Ren, et al., "Two-Stage Approach for 12V VR," pp. 1306-1312. ISBN 0-7803-8269-2. (ARTN00002525-ARTN00002531).
Yuhui, Chen, et al., "Resonant MOSFET Gate Driver with Efficient Energy Recovery," IEEE Transactions on Power Electronics, vol. 19, No. 2, pp. 470-477 (Mar. 2004). ISSN 0885-8993. (DMMP0016073-DMMP016080.
Zhang, Michael T., et al. "Analysis and Evaluation of Interleaving Techniques in Forward Converters," IEEE Transactions on Power Electronics, vol. 13, No. 4, pp. 690-698 (Jul. 1998). ISSN 0885-8993 (DMMP0014793-DMMP0014801).
Zhang, Michael T., et al., "Commutation Analysis of Self-Driven Synchronous Rectifiers in an Active-Clamp Forward Converter," pp. 868-873 (1996). ISBN 0-7803-3500-7 (DMMP0014802-DMMP0014807).
Zhang, Michael T., et al., "Design Considerations and Performance Evaluations of Synchronous Rectification in Flyback Converters," pp. 623-630 (1997). ISBN 0-7803-3704-2 (DMMP0014785-DMMP0014792).
Zhang, Michael T., et al., "Design Considerations for Low-Voltage On-Board DC/DC Modules for Next Generations of Data Processing Circuits," pp. 328-337 (1996). ISSN 0885-8993 (DMMP0014814-DMMP0014823).

(56) References Cited

OTHER PUBLICATIONS

Zhou, Xunwei, et al., "A Novel High-input-voltage, High Efficiency and Fast Transient Voltage Regulator Module—Push-pull Forward Converter," pp. 279-283 (1999). ISBN 0-7803-5160-6 (DMMP0014834-DMMP0014838).

Zhou, Xunwei, et al., "Investigation of Candidate VRM Topologies for Future Microprocessors," Thirteenth Annual Applied Power Electronics Conference and Exposition, vol. 1, pp. 145-150 (Feb. 15-19, 1988). ISBN 0-7803-4340-9 (DMMP0014844-DMMP0014851).

"Isolated Unregulated DC/DC Converters", Burr-Brown Data Sheet, Burr-Brown Corp., 1996, 16 pages (VC01371349-VC01371356).

Yee, H.P., et al., "A Self-Driven Synchronous Rectifier," Power Electronics Specialists Conference, PESC'94 Record, 25th Annual IEEE, 1994, pp. 627-633.

"Power Module Lets Users Customize Supplies," Electronic Design, Jun. 25, 1961, p. 213 (DMMP 0001852).

Artesyn Technologies and Amtex Electronics Pty. Ltd., "Chapter I: Principles of Power Conversion," undated, pp. 1-17. (DMMP0001600-DMMP0001616).

Cobos, J. A., et al. "Low voltage power electronics," Journal of Circuits, Systems, and Computers vol. 5, No. 04, 1995, pp. 575-588.

Fisher, R. A., et al. "Performance of low loss synchronous rectifiers in a series-parallel resonant dc-dc converter." Applied Power Electronics Conference and Exposition, 1989. APEC'89. Conference Proceedings 1989, Fourth Annual IEEE, 1989, pp. 240-246.

Fukumochi, Y., et al., "Synchronous Rectifiers using New Structure MOSFET," Power Semiconductor Devices and ICs, 1995. ISPSD'95., Proceedings of the 7th International Symposium on IEEE, 1995, pp. 252-255.

Langford-Smith, F. (Ed.), Radiotron designer's handbook, Wireless Press, 1953 (Reproduced Jan. 1960), pp. v, vii-xl, 1202-1222, 1496-1497.

P.R. Mallory & Co., Inc., Fundamental Principles of Vibrator Power Supply Design, 1947, pp. 3-5, Table of Contents (1 page), Introduction (1 page), 9-21, 23-31, 33-47, 49-105, 107-129, 131-135.

Slurzberg, M., and Osterheld, W., Essentials of Radio-electronics, McGraw-Hill, 1961, pp. 358-362; 623-624.

Wildrick, Carl M., "Stability of Distributed Power Supply Systems," Unpublished doctoral dissertation, Virginia Polytechnic Institute and State University, Feb. 1993. (ARTN00002871-ARTN00002974).

Morrison, "Distributed Power Moves to Intermediate Bus Voltage", Electronic Design, 2002.

Pressman, Abraham I., Building Block Assembly of Compound Regulating Systems, in Switching and Linear Power Supply, Power Converter Design (New Jersey, Hayden Book Company 1977), Chapter 3, pp. 74-104.

Abe, Seiya, et al. "System Stability of Full-Regulated Bus Converter in Distributed Power System." International Telecommunications Energy Conference Proceedings, Sep. 2005, pp. 563-568.

Can, Gregory A., et al., "X2000 Power System Architecture," pp. 381-386. Unpublished paper, California Institute of Technology, Jet Propulsion Laboratory. (DMMP0002136-DMMP0002141).

Fu-Sheng, Tsai, "A Low-Cost, Low-Loss Active Voltage-Clamp Circuit for Interleaved Single-Ended Forward PWM Converter," 1993 IEEE, pp. 729-733. (DMMP0008154-DMMP0008158).

Tabisz, W.A., et al., "A MOSFET Resonant Synchronous Rectifier for High-Frequency DC/DC Converters," Proceedings of the Power Electronics Specialists Conference, San Antonio, TX, Jun. 10-15, 1990, pp. 769-779.

"Background to Factorized Power Architecture." Web log post. Vicor PowerBlog. Vicor Corporation, Nov. 25, 2011. Accessed: May 10, 2016. <http://powerblog.vicorpower.com/2011/11/background-to-factorized-power-architecture/>.

"Build Small, Lighter Power Systems by Eliminating Bulk Capacitance." Web log post. Vicor PowerBlog. Vicor Corporation, Oct. 6, 2015. Accessed: May 10, 2016. <http://powerblog.vicorpower.com/2015/10/build-small-lighter-power-systems-eliminating-bulk-capacitance/>.

PTX 1816, White, R., Emerging On-Board Power Architectures, IEEE Applied Power Electronics Conference, Feb. 2003.

PTX 1820, Zhang, M. et al.; Design Considerations for Low-Voltage On-Board DC/DC Modules for Next Generation of Data Processing Circuits, 11th IEEE Trans. on Power Electr., Mar. 1996.

PTX 1839, Mankikar, M., Power Electronics Industry Newsletter, MTC/PowerElectronics Industry News, Issue 107, Sep. 2003.

Trial Testimony Transcript of Dec. 14, 2010, *AM Session, SynQor, Inc.* v. *Artesyn Technologies, et al.*, Case No. 2:07-CV-479 (51 pages).

Schlecht Technology Tutorial.

R.L. Steigerwald, et al., "High Density Power for Low Voltage Pulsed Loads", APEC '93. Conference Proceedings (1993).

Kassakian, John G., et al., "Principles of Power Electronics", Chapter 20, Massachusetts Institute of Technology, Addison-Wesley Publishing Company, copyright 1991, pp. 576-581, 8 pages.

PTX 1799, Ericsson Power Modules AB, Design Note 23: Selection of Architecture for Systems using Bus Converters and POL Converters, May 2005.

BusQor Series. SynQor website, retrieved on Aug. 14 2002, from http://web.archive.org/web/20020814221649/http://www.synqorcom/products/buscior_qb.html, copyright 2002, 2 pages.

Choosing a Power Architecture, Tom Curatolo, Vicor, Mar. 2004 (PTX 1846).

Cobos, J.A. et al. "Study of the Applicability of Self-Driven Synchronous Rectification to Resonant Topologies". 1992 IEEE, pp. 933-940.

Factorized Power Architecture & VI Chips—Power Paradigm of the Future? Webcast. Dr. Patrizio Vinciarelli, President & CEO, Vicor Corporation, date unknown. Accessed: May 23, 2016. (Vicor Webcast) <http://cdn.vicorpower.com/documents/webcasts/fp_webcast.swf>.

PTX 1819, Goodenough, F., Power-Supply Rails Plummet and Proliferate; Electronic Design; Jul. 1995.

PTX 1821, Power-One, Inc., Form 10-K 2003 Annual Report, Mar. 2004.

Ji, H.K. et al. "Active Clamp Forward Converter with MOSFET Synchronous Rectification". 1994 IEEE, pp. 895-901.

Office Action dated Nov. 21, 2014 in U.S. Appl. No. 13/947,893, which published as U.S. 2014-0085939 A.

J.A. Cobos & J. Uceda, Low Output Voltage DC/DC Conversion, 1994 20th Int'l Conf. on Indus. Electronics, Control & Instrumentation 1676.

Arduini, Douglas P., "A Distributed Power System with a Low-Cost Universal DC/DC Converter," Power Conversion Electronics Sep. 1995 Proceedings, pp. 315-322. (DMMP0001584-DMMP0001591).

Miwa, B.A., Interleaved Conversion Techniques for High Density Power Supplies, Massachusetts Institute of Technology, May 1992, 194 pages.

de la Cruz, E., et al., "Review of Suitable Topologies for on Board DC/DC Converters in Distributed Power Architectures for Telecom Applications," copyright 1992 IEEE, pp. 59-65, ISBN 0-78030779-8/92. (DMMP0002305-DMMP0002311).

Uceda et al., "Supplying Power at Low Voltage (3.3V)," Proc of the 1995 First IEEE International Caracas Conference on Devices, Circuits and Systems (Dec. 12-14, 1995) pp. 244-251.

*Tokai Corp.* v. *Eastern Enterprises, Inc.*, 632 F.3d 1358, 1369 (Fed. Cir. 2011). Jan. 31, 2011, 39 pages.

Mammano, B., "Fueling the Megaprocessors—Empowering Dynamic Energy Management," Unitrode Power Design Seminar SEM-1200, 1996, pp. 1-1 to 1-22.

Chen, Jikang, "Resonant Switched Capacitor DC-DC Converter with Stackable Conversion Ratios," Electrical Engineering and Computer Sciences, Univ. of California at Berkeley, Technical Report No. UCB/EECS-2016-187, 21 pages (Dec. 1, 2016).

Oraw, Bradley et al., "Load Adaptive, High Efficiency, Switched Capacitor Intermediate Bus Converter," Telecommunications Energy Conference, IEEE 2007, pp. 628-635 (Sep. 30-Oct. 4, 2007).

Kesarwani, K. et al., "Resonant switched-capacitor converters for chip-scale power delivery: Modeling and design," 2013 IEEE 14th Workshop on Control and Modeling for Power Electronics (COMPEL), pp. 1-7, published Oct. 10, 2013 (date of conference: Jun. 23-26, 2013).

(56) References Cited

OTHER PUBLICATIONS

Sanders, S., et al., "The road to fully integrated dc-dc conversion via the switched-capacitor approach," Power Electronics, IEEE Transactions on, vol. 28, pp. 4146-4155, Sep. 2013.

Le, H.P., et al., "Design techniques for fully integrated switched-capacitor dc-dc converters," Solid-State Circuits, IEEE Journal of, vol. 46, pp. 2120-2131, Sep. 2011.

Seeman, M., et al. "Analysis and optimization of switched-capacitor dc-dc converters," Power Electronics, IEEE Transactions on, vol. 23, pp. 841-851, Mar. 2008.

Lei, Y., et al., "A general method for analyzing resonant and soft-charging operation of switched-capacitor converters," Power Electronics, IEEE Transactions on, vol. 30, pp. 5650-5664, Oct. 2015.

Sano, K., et al., "Performance of a high-efficiency switched-capacitor-based resonant converter with phase-shift control," Power Electronics, IEEE Transactions on, vol. 26, pp. 344-354, Feb. 2011.

Lei, Y., et al., "Split-phase control: Achieving complete soft-charging operation of a dickson switched-capacitor converter," Power Electronics, IEEE Transactions on, vol. PP, No. 99, pp. 1-1,2015.

Kesarwani, et al., "Resonant switched-capacitor converters for chip-scale power delivery: Design amp; implementation," Power Electronics, IEEE Transactions on, vol. PP, No. 99, pp. 1-1, 2014.

Li, Y., et al., "Lossless voltage regulation and control of the resonant switched-capacitor dc-dc converter," in Control and Modeling for Power Electronics (COMPEL), 2015 IEEE 16th Workshop on, pp. 1-7, Jul. 2015.

Feng, W., et al., "A hybrid strategy with simplified optimal trajectory control for LLC resonant converters," in Proc. IEEE Appl. Power Electron. Conf., Feb. 2012, pp. 1096-1103.

Cervera, A., et al., "A high-efficiency resonant switched capacitor converter with continuous conversion ratio," Power Electronics, IEEE Transactions on, vol. 30, pp. 1373-1382, Mar. 2015.

Cao et al.," A Family of Zero Current Switching Switched-Capacitor DC-DC converters," Applied Power Electronics Conference and Exposition (APEC), 2010 Twenty-Fifth Annual IEEE, Mar. 18,2010.

Cao et al., " Zero-Current-Switching Multilevel Modular Switched-Capacitor DC-DC Converter" IEEE Transactions on Industry Applications, 46(6):2536-2544, Sep. 2010.

Y. P. B. Yeung, K. W. E. Cheng, D. Sutanto and S. L. Ho, "Zerocurrent switching switched-capacitor quasiresonant step-down converter," *Electric Power Applications, IEE Proceedings—*, vol. 149, pp. 111-121, 2002.

Y. P. B. Yeung, K. W. Cheng, S. L. Ho and D. Sutanto, "Generalised analysis of switched-capacitor step-down quasi-resonant converter," *Electronics Letters*, vol. 38, pp. 263-264, 2002.

Kester, W., et al., "Section 3, Switching Regulators," pp. 3.1-3.71, (2015).

\* cited by examiner

US 10,199,950 B1

POWER DISTRIBUTION ARCHITECTURE WITH SERIES-CONNECTED BUS CONVERTER

TECHNICAL FIELD

This invention relates to apparatus and methods of converting and distributing power in electrical systems such as computer and telecommunication systems and servers.

BACKGROUND

Referring to FIG. 1, a prior art power distribution system 1 such as an Intermediate Bus Architecture ("IBA") is shown having a DC power source 5, supplying power at a source voltage, $V_S$, to the input of a bus converter 10. The output of the bus converter 10 supplies power to one or more down-stream regulators, e.g. regulators 6, 7 which in turn provide regulated power, e.g. regulated voltage, to respective loads 8, 9. The bus converter 10 may include a DC Transformer which is a switching power converter that may provide voltage transformation from its input to output at an essentially fixed voltage gain and also provide galvanic isolation between its input and output. The bus converter 10 may adjust its output slightly during predetermined operating conditions to provide in-rush current limiting, e.g. during start up and may provide partial regulation over selected portions of the source voltage range. Although a single bus converter is shown in FIG. 1, a plurality of bus converters may be connected to receive power from a single source 5 and provide power at one or more voltages to a plurality of down-stream regulators, such as regulators 6 and 7. Additionally, two or more bus converters or two or more DC Transformers may be connected in parallel to increase power throughput or to provide a measure of fault tolerance.

SUMMARY

One embodiment of the disclosure relates to an apparatus that includes a power distribution system comprising a source for providing power at a DC source voltage $V_S$. The apparatus further includes a bus converter that includes an input circuit and an output circuit. The bus converter is adapted to convert power from the input circuit to the output circuit at a substantially fixed voltage transformation ratio $K_{DC}$ at an output current. An input voltage $V_{IN}$ is applied to the input circuit and an output voltage $V_{OUT}$ is produced by the output of the bus converter, and the substantially fixed voltage transformation ratio can be represented as $K_{DC}=V_{OUT}/V_{IN}$. The apparatus further includes a power distribution bus connected to distribute power from the output circuit of the bus converter at the output voltage $V_{OUT}$. The apparatus further includes a plurality of regulators. Each regulator includes a regulator input connected to the power distribution bus to receive power from the output circuit of the bus converter and a regulator output connected to supply power to a respective load. The plurality of regulators each are separated by a distance from the bus converter. The input circuit of the bus converter and at least a portion of the output circuit of the bus converter are connected in series across the source such that an absolute value of the input voltage $V_{IN}$ applied to the input circuit is approximately equal to the absolute value of the DC source voltage $V_S$ minus a number N times the absolute value of the output voltage $V_{OUT}$, where N is at least 1.

Another embodiment relates to an apparatus that includes a power converter including an input circuit and an output circuit. The power converter is configured to receive power from a power distribution system comprising a source for providing power at a DC source voltage $V_S$. The power converter is adapted to convert power from the input circuit to the output circuit at a substantially fixed voltage transformation ratio $K_{DC}$ at an output current. An input voltage $V_{IN}$ is applied to the input circuit and an output voltage $V_{OUT}$ is produced by the output of the power converter. The substantially fixed voltage transformation ratio can be represented as $K_{DC}=V_{OUT}/V_{IN}$. The power converter further includes a series connection between the input circuit of the power converter and at least a portion of the output circuit of the power converter across the source, such that an absolute value of the input voltage $V_{IN}$ applied to the input circuit is approximately equal to the absolute value of the DC source voltage $V_S$ minus a number N times the absolute value of the output voltage $V_{OUT}$, where N is at least 1.

Yet another embodiment relates to an apparatus that includes a bus converter including an input circuit and an output circuit. The bus converter is configured to receive power from a power distribution system including a source for providing power at a DC source voltage $V_S$. The bus converter is adapted to convert power from the input circuit to the output circuit at a substantially fixed voltage transformation ratio $K_{DC}$ at an output current. An input voltage $V_{IN}$ is applied to the input circuit and an output voltage $V_{OUT}$ is produced by the output of the bus converter, and the substantially fixed voltage transformation ratio can be represented as $K_{DC}=V_{OUT}/V_{IN}$. The apparatus further includes a power distribution bus connected to distribute power from the output circuit of the bus converter at the output voltage $V_{OUT}$. The apparatus further includes a plurality of regulators. Each regulator includes a regulator input connected to the power distribution bus to receive power from the output circuit of the bus converter and a regulator output connected to supply power to a respective load. The plurality of regulators each are separated by a distance from the bus converter. The input circuit of the bus converter and at least a portion of the output circuit of the bus converter are connected in series across the source such that an absolute value of the input voltage $V_{IN}$ applied to the input circuit is approximately equal to the absolute value of the DC source voltage $V_S$ minus a number N times the absolute value of the output voltage $V_{OUT}$, where N is at least 1.

Another embodiment relates to an apparatus comprising an intermediate bus architecture power distribution system for a telecommunications system comprising a source for providing power at a DC source voltage; a circuit board comprising a bus converter, the bus converter comprising an input circuit, the input circuit comprising a primary transformer winding, the bus converter further comprising an output circuit, the output circuit comprising a secondary transformer winding, wherein the primary and secondary transformer windings are galvanically connected in series, and wherein the bus converter is configured to provide power to a power distribution bus that is not galvanically isolated from the source; and the circuit board further comprising a plurality of regulators, wherein each regulator comprises a regulator input connected to the power distribution bus to receive power from the output circuit of the bus converter and a regulator output connected to supply power to a respective load, the plurality of regulators each being separated by a distance from the bus converter.

DETAILED DESCRIPTION

Power Distribution Architecture

Figure 3:
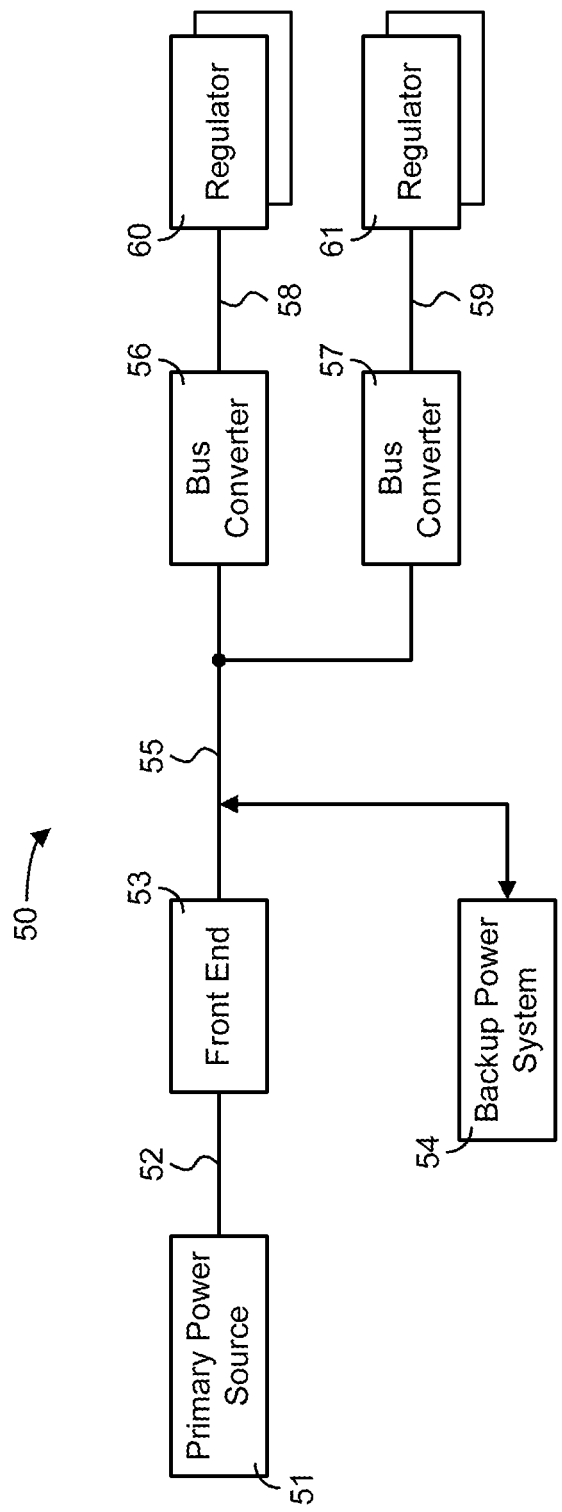
FIG. 3 shows a schematic diagram of a new power distribution architecture according to an illustrative embodiment.

A power distribution system 50 is shown in FIG. 3 having a primary power source 51 delivering power via a connection 52 to a front-end power-processing unit 53. The primary power source 51 may be an AC utility line, and the front end unit 53 may be a power conversion stage that converts power from the power source 51 delivering power at a relatively high but safe DC voltage to a power distribution bus 55, e.g. the DC voltage may vary from a minimum, e.g. 38 Volts, to a maximum, e.g. 55 Volts. Preferably, the front-end unit 53 provides voltage step down and isolation and may optionally provide power factor correction, regulation, or both. An optional backup power system 54 is shown connected to the power distribution bus 55 to provide power in the event of a loss of power from the primary power source 52. The backup power system may include batteries, a charger for maintaining the batteries, and a switchover mechanism that connects the batteries to the bus in response to predetermined events, such as a decline in voltage or loss of power from the output of the front end 53 or the primary power source 51.

One or more bus converters, e.g. bus converters 56, 57, may be connected to the power distribution bus 55 downstream from the front end 53 as shown in the example of FIG. 3 to convert power received from the relatively high voltage power distribution bus 55 for delivery to a respective lower voltage bus. As shown, bus converters 56 and 57 respectively supply power to buses 58 and 59 at voltages, e.g. at or near the requisite load voltages, that are lower than the voltage of the power distribution bus 55, providing step-down voltage transformation. The bus converters 56, 57 are generally separated by a distance from their respective regulators 60, 61. For example, in a typical system, one or more system circuit boards housed in a common enclosure may each include one or more bus converters, preferably located near the edge of, or other location on, the board where power connections are made to the board. A down-stream regulator receiving power from the bus converter(s) may be preferably located adjacent to the circuitry, e.g. a processor, ASIC, or other circuitry, to which it or they supply power. The physical distance separating the bus converter and a respective down-stream regulator in such an example may range from as much as a dimension of the system circuit board, i.e. a diagonal dimension where the bus converter and regulator located at opposite corners, a length or width dimension where they are located at opposite edges, a half-length or width where one is situated closer to the middle and the other is at an edge, etc. In another example, a bus converter may be located off of the system board in which case the electrical distance could be greater than a dimension of the system board. Naturally, the distance separating the bus converter and a respective down-stream regulator will depend on the system layout. However, a bus converter housed in a self-contained assembly adapted to be installed as a unit at a location remote from the down-stream regulator(s) may be separated by a distance from a down-stream regulator regardless of their respective mounting locations at the system level.

The output of each bus converter 56, 57 may, in turn, provide power via its respective bus 58, 59 to a respective plurality of regulators, preferably at or near the point of load, such as point-of-load switching voltage regulators 60, 61. It should be understood that although two bus converters 56, 57 are shown in the example of FIG. 3, any number of bus converters, e.g. one, may be used. Similarly, although regulators 60 and 61 are shown in FIG. 3 as comprising a plurality of individual regulators, any suitable number of regulators, e.g. one, may be connected to a particular bus converter within the constraints of the physical devices used. The regulators 60, 61 may supply power to respective loads (not shown). The loads can be a variety of devices, including integrated circuits and electromechanical devices (such as storage and cooling devices).

The bus converters 56, 57 shown in the system of FIG. 3, however, preferably do not provide galvanic isolation between their respective output busses 58, 59 and the power distribution bus 55 as described in additional detail below.

Series-Connected DC Transformer

Figure 1:
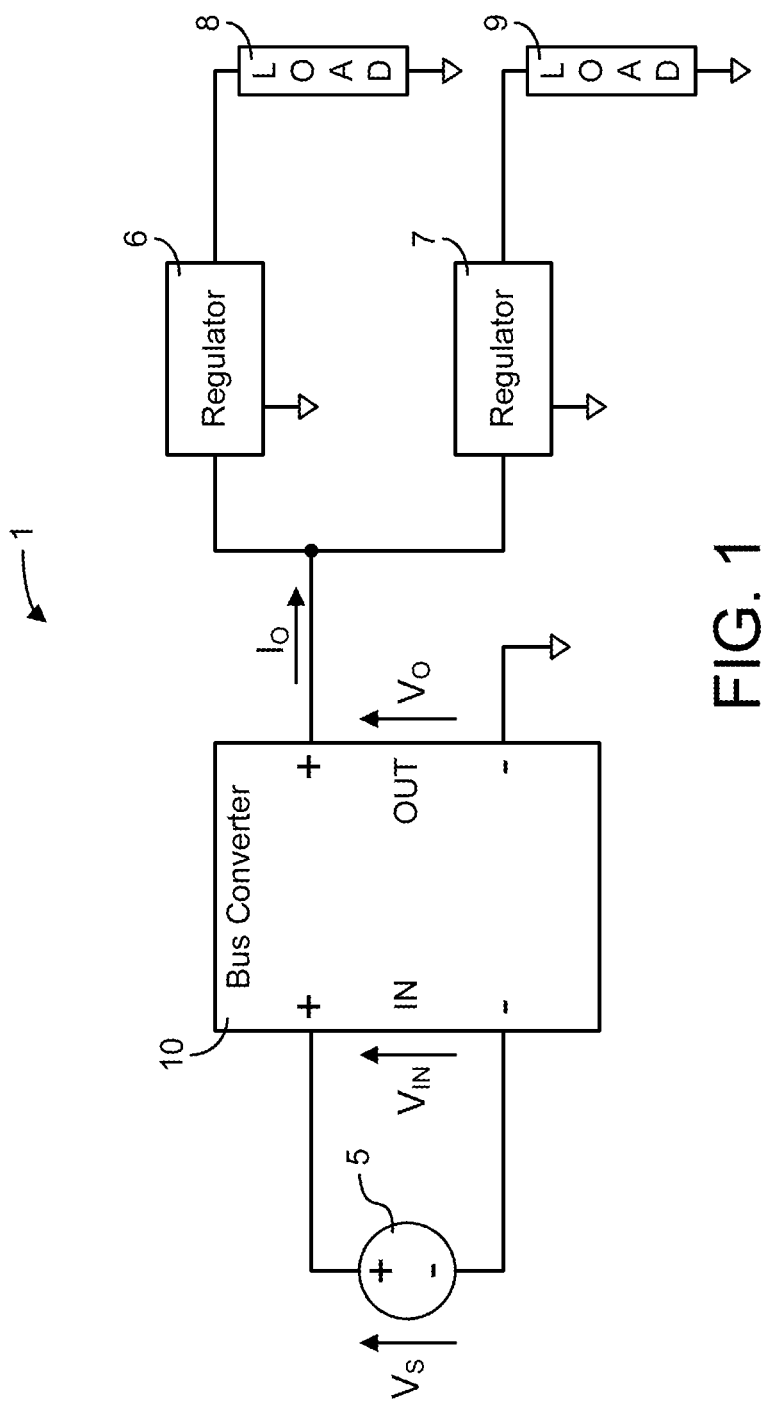
FIG. 1 shows a schematic block diagram of a prior art IBA power distribution system according to an illustrative embodiment.
Figure 2:
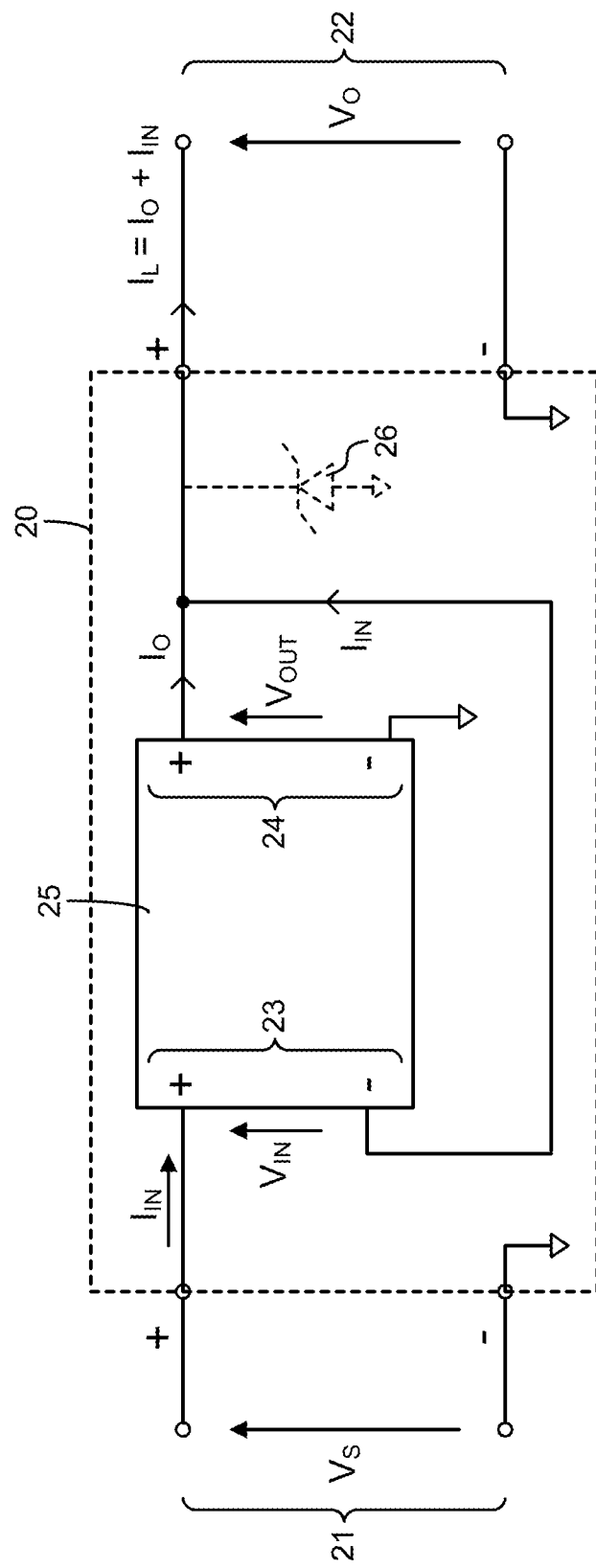
FIG. 2 shows a functional block diagram of a series-connected DC Transformer according to an illustrative embodiment.

Referring to FIG. 2, a functional block diagram of a series-connected power conversion system 20 suitable for use as a bus converter in the power distribution system 50 of FIG. 3 is shown. The power conversion system 20 includes an input 21 for receiving power from a source at a source voltage, $V_S$, and an output 22 for delivering power to a load at an output voltage, $V_O$, that is less than $V_S$, and a DC Transformer 25. The DC Transformer 25 may be implemented preferably using the Sine-Amplitude Converter ("SAC") topologies and timing architectures described in Vinciarelli, Factorized Power Architecture and Point of Load Sine Amplitude Converters, U.S. Pat. No. 6,930,893 and in Vinciarelli, Point of Load Sine Amplitude Converters and Methods, U.S. Pat. No. 7,145,786 both assigned to VLT., Inc. and incorporated here in their entirety by reference (hereinafter the "SAC Patents"). Alternatively, other converter topologies, such as hard-switching, fixed ratio DC-DC converters, may be used. The DC Transformer 25 converts power received from its input 23 (distinguished from the input 21 of the bus converter 20) at an input voltage, $V_{IN}$, for delivery to its output 24 at an output voltage, $V_{OUT}$, using an essentially fixed voltage gain or voltage transformation ratio.

The voltage gain or voltage transformation ratio of a system as defined generally herein is the ratio of its output voltage to its input voltage at a specified current such as an output current. For the system 20 in FIG. 2, the voltage transformation ratio may be expressed as $K_{SYS}=V_O/V_S@I_L$. Similarly, the voltage transformation ratio of the DC Transformer 25 may be stated as $K_{DC}=V_{OUT}/V_{IN}@I_O$. Note that the system output voltage, $V_O$, and the DC Transformer output voltage, $V_{OUT}$, are the same in the configuration shown. However, the input 23 and output 24 of the DC Transformer 25 are shown in a series-connected configuration across the system input 21. As a result, the input voltage, $V_{IN}$, to the DC Transformer input 23 is less than the input voltage, $V_S$, to the system input 21 by an amount equal to the output voltage:

$$V_{IN}=V_S-V_O. \tag{1}$$

Similarly as shown in FIG. 2, the current, $I_L$, drawn by the load from the system output 22 is greater than the current produced at the output 24 of the DC Transformer 25 by an amount equal to the input current:

$$I_O=I_L-I_N. \tag{2}$$

The system voltage transformation ratio, $K_{SYS}$, using the series-connected DC Transformer 25, may be expressed as a function of the DC Transformer voltage transformation ratio, $K_{DC}$:

$$K_{SYS}=K_{DC}/(K_{DC}+1) \tag{3}$$

The above equation (3) may be rearranged to express the DC Transformer 25 voltage transformation ratio, KDC, required in a series-connected system as a function of the system voltage transformation ratio, $K_{SYS}$:

$$K_{DC}=K_{SYS}/(1-K_{SYS}) \tag{4}$$

Figure 4:
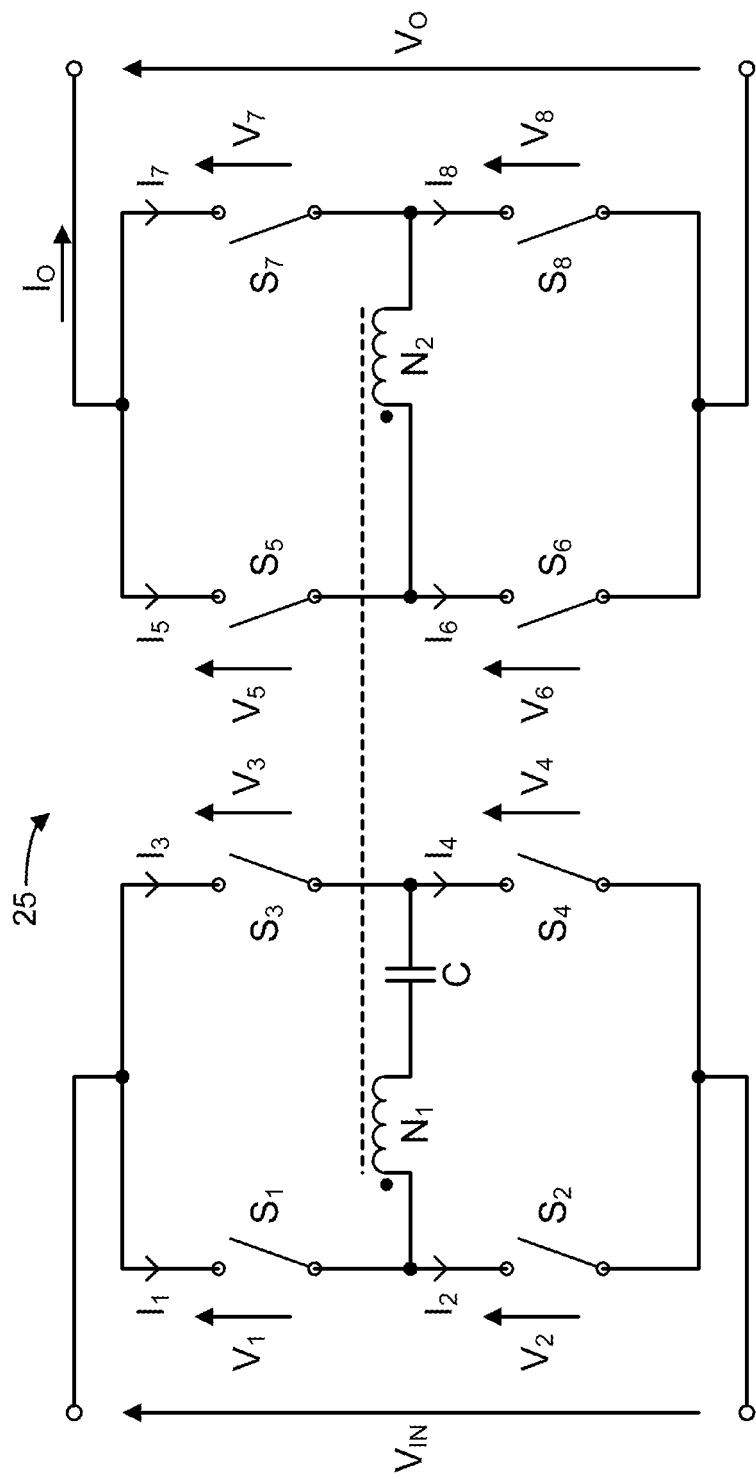
FIG. 4 shows a schematic diagram of an isolated SAC-based DC Transformer according to an illustrative embodiment.

Referring to FIG. 4, an isolated SAC that may be utilized for DC Transformer 25, according to one embodiment, is shown having a full-bridge input circuit, including switches S1, S2, S3, and S4, connected to drive the resonant circuit including capacitor C and the input winding, having N1 turns, with the input voltage $V_{IN}$. The isolated SAC is shown having a full-bridge output circuit, including switches S5, S6, S7, and S8, connected to rectify the voltage impressed across the output winding, having N2 turns, and delivering the output voltage, $V_O$. The voltage transformation ratio of the SAC will be essentially a function of the turns ratio: $K_{DC}=V_O/V_{IN}=N2/N1$.

Figure 5:
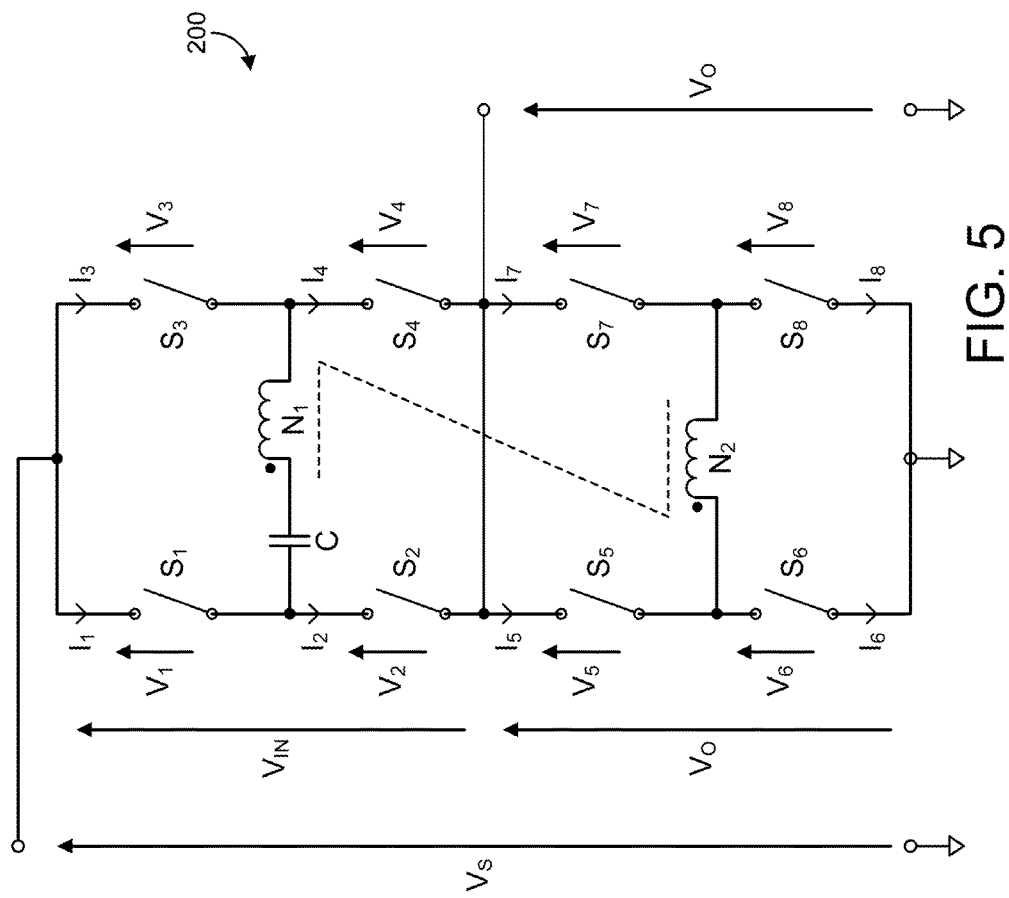
FIG. 5 shows a schematic diagram of a series-connected SAC-based DC Transformer according to an illustrative embodiment.

A series-connected SAC 200 is shown in FIG. 5. By way of comparison, the series-connected SAC 200 uses the same full-bridge input circuit topology, including switches S1, S2, S3, and S4, driving the resonant circuit including capacitor C and the input winding, having N1 turns, with the input voltage $V_{IN}$. SAC 200 also uses the same full-bridge output topology, including switches S5, S6, S7, and S8, connected to rectify the voltage impressed across the output winding, having N2 turns, and delivering the output voltage, $V_O$. The voltage transformation ratio of the series-connected SAC 200 from the input circuit to output circuit is also essentially a function of the transformer turns ratio N2/N1 and the same as the isolated SAC 25 in FIG. 4: $K_{DC}=V_O/V_{IN}=N2/N1$. However, when evaluated in terms of the system, i.e. using $V_S$ applied across the series-connected input and output, the voltage transformation ratio becomes: $K_{SYS}=V_O/V_S=N2/(N2+N1)$.

Many contemporary applications use a voltage transformation ratio equal to 1/5 requiring an odd transformer turns ratio (N2/N1=1/5) which is generally not optimal. Referring to equation (4) above, the $K_{SYS}=1/5$ bus converter may be implemented using a $K_{DC}=1/4$ series-connected topology (e.g. as shown in FIGS. 2, 4, and 5), allowing the use of an even, i.e. 1:4, turns ratio in the transformer. An even transformer turns ratio may provide greater transformer layout flexibility and efficiency.

Figure 6:
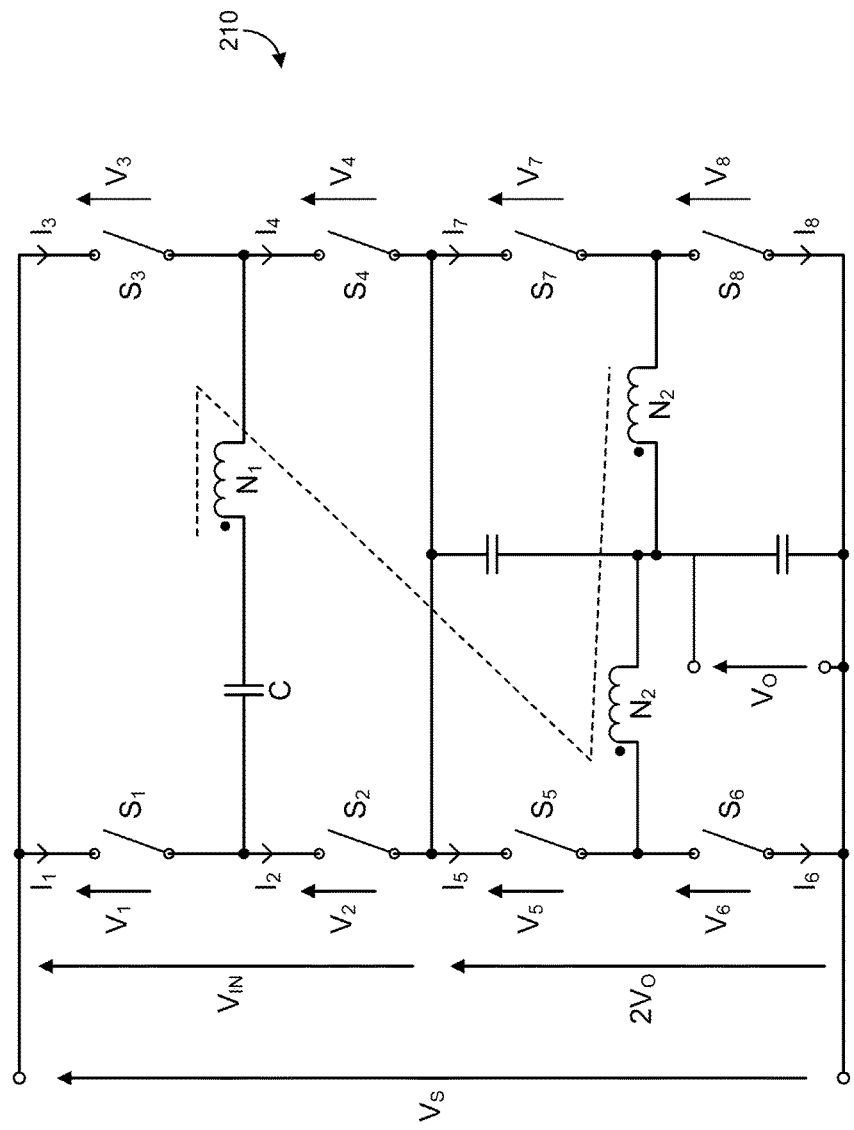
FIG. 6 shows a schematic diagram of a series-connected SAC-based DC Transformer having a center-tapped winding in the output circuit according to an illustrative embodiment.
Figure 7:
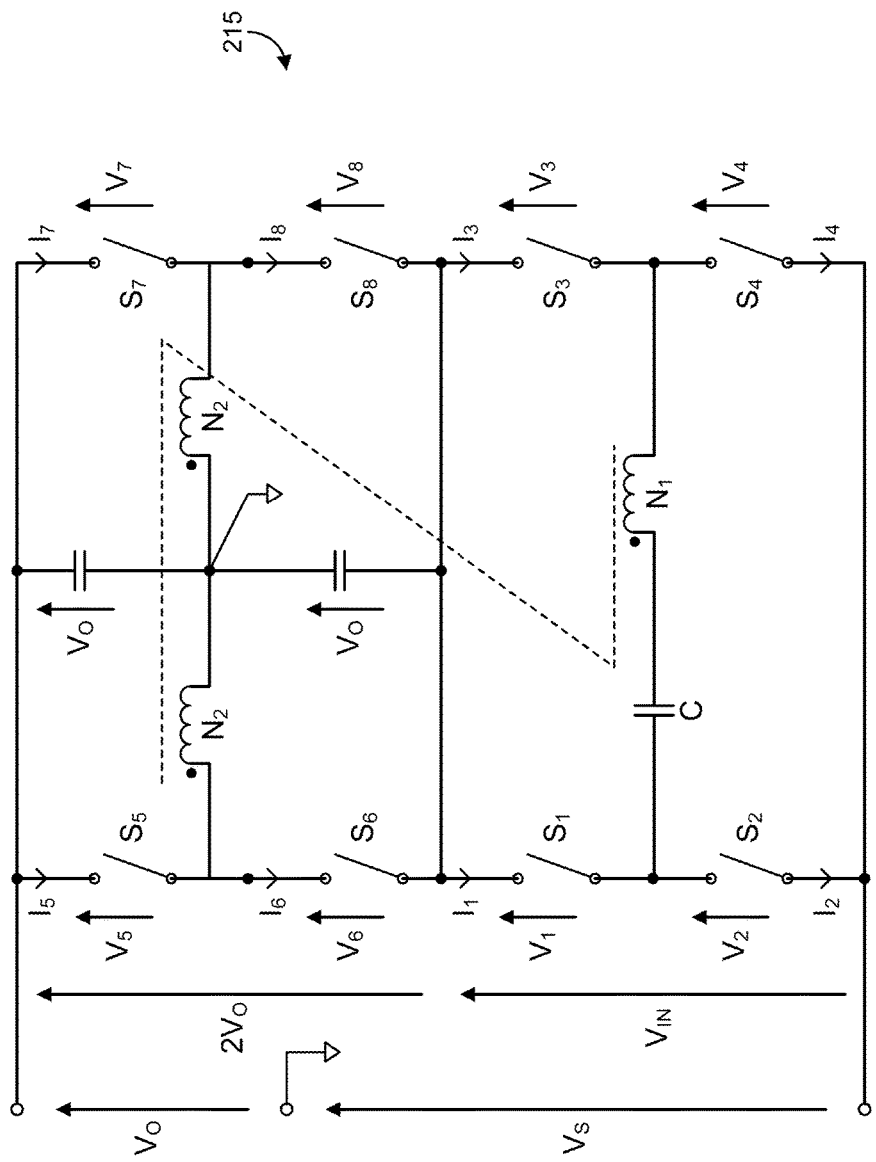
FIG. 7 shows a schematic diagram of a series-connected DC Transformer for receiving power from a negative input source and delivering power at a positive output voltage according to an illustrative embodiment.

Note that the series-connected converter 200 may be implemented by connecting an off-the-shelf isolated DC Transformer, such as the isolated converter shown in FIG. 4, as shown in FIG. 2. Alternatively, the converter 200 may be implemented as series-connected input and output circuits, e.g. as shown in FIGS. 5, 6, and 7 discussed below, in an integrated converter, optionally providing greater power density eliminating the isolation imposed design constraints, eliminating control circuit bias currents from flowing through to the output and the potential need for an output clamp, and providing system-ground referenced control circuitry (not shown) for interface signals that are referenced to ground rather than the output for the reconfigured off-the-shelf isolated converter.

Connecting the input and output of the DC Transformer 25 in series eliminates galvanic isolation between the input and output of the series-connected bus converter 20, which is counterintuitive. However, when used in the architecture of FIG. 3, isolation is deployed at an intermediate stage where the isolation may be superfluous. The architecture of FIG. 3, therefore, trades isolation at this stage for efficiency gain and reduced component stress. If isolation is required, e.g. for safety reasons, in the architecture of FIG. 3, it may preferably be provided by an upstream power conversion stage such as the front-end converter 53.

Efficiency

The power processed by the isolated SAC shown in FIG. 4 may be compared with that of the series-connected SAC 200 (FIG. 5) by summing the product of maximum voltage across ($V_n$) and average current ($I_n$) through each switch (n=1 through 8).

$$P_{Processed} = \sum_{n=1}^{n=8n}(Vn*In) \tag{5}$$

Each input switch (S1, S2, S3 and S4) in the full bridge input circuits (FIGS. 4, 5) is subjected to the input voltage, $V_{IN}$, (distinguished from the source voltage $V_S$) and an average of one half of the input current, $I_{IN}$. The sinusoidal nature of the current in the SAC topology represents a difference between the RMS and average currents, which is unimportant for the following comparison between two converters using the same topology. The power processed by the input circuits is:

$$P_{IN}=2*V_{IN}*I_{IN} \tag{6}$$

Similarly, each output switch (S5, S6, S7 and S8) in the full bridge output circuit of FIG. 4 will be subjected to the full output voltage, $V_O$, and will carry an average of one half of the output current, $I_O$. Note that the output current in the case of the isolated converter is equal to the load current, $I_L$ and in the case of the series-connected converter (discussed below) is not. The power processed by the output circuits may therefore be reduced to:

$$P_{OUT}=2*V_O*I_O \tag{7}$$

Combining equations (6) and (7) and making the appropriate substitutions using $K_{DC}=V_O/V_{IN}$ and the corollary $I_{IN}=K_{CD}*I_O$, the total power processed by the converters reduces to:

$$P=4*V_O*I_O \tag{8}$$

In the isolated converter of FIG. 4, the output current equals the load current ($I_O=I_L$), therefore, the power processed by the isolated converter, $P_{ISO}$, may be reduced to the following function of load power, $P_{Load}=V_O*I_L$:

$$P_{ISO}=4*P_{Load} \tag{9}$$

Neglecting fixed losses in the converter, the input current may be expressed as a function of the output current and voltage transformation ratio as follows:

$$I_N = I_O * K_{DC} \qquad (10)$$

Combining equations (2), (4), and (10), the output current of the series-connected converter may be expressed as a function of load current and voltage transformation ratio as follows:

$$I_{O\text{-}Series} = I_L * (1 - K_{SYS}) \qquad (11)$$

Substituting equation (11) into equation (8) produces the total power processed by the series-connected converter as a function of load power ($P_{Load} = V_O * I_L$) and system voltage transformation ratio:

$$P_{SERIES} 4 * P_{Load} * (1 - K_{SYS}) \qquad (12)$$

Accordingly, the efficiency advantage of the series-connected converter over the isolated converter—the ratio of equations (12) and (9)—reduces to:

$$P_{SERIES}/P_{ISO} = (1 - K_{SYS}) \qquad (13)$$

From equation (13) it can be seen that the series-connected converter offers a significant efficiency advantage. Consider a typical example for comparison, using a bus converter to convert power from a nominal 50 Volt power distribution bus for delivery to a 10 volt load ($K_{SYS}=1/5$) at 100 amps: the series-connected converter processes only 80% of the power, offering a 20% efficiency savings compared to the isolated converter.

In a typical isolated DC Transformer, like most DC-DC converters, the control circuitry is configured to operate from power drawn from the input producing a quiescent component of the input current. Use of such a converter, e.g. an off-the-shelf DC Transformer, in a series-connected configuration could, therefore, allow the quiescent input current to flow unregulated into a load connected to the output, which would be problematic while the power train is not operating and, therefore, incapable of regulating the output voltage. It may, for that reason, be desirable to clamp the output voltage using a zener diode, such as zener diode 26 in FIG. 2, or other clamp circuit or device appropriately scaled in breakdown voltage and power dissipation to carry the quiescent input current, protecting the load and perhaps the output circuitry of the converter. Integrating the series-connected input and output circuitry into a non-isolated converter topology such as shown in FIGS. 5, 6, and 7 affords the opportunity to configure the control circuitry to draw power from the input to ground preventing that component of the input current from flowing out to the load. Additionally, a DC blocking capacitor may be used in the power train to avoid leakage current from flowing from the input to the output. One or both of the above measures may be used to avoid the need to clamp the output.

Configuring the control circuitry to reference the system ground in the integrated converter (rather than the input return in the off-the-shelf isolated converter) easily allows any interface signals to be ground-referenced (rather than output referenced) which is advantageous from the perspective of the system integrator.

Center-Tap Secondary

Another series-connected SAC 210 is shown in FIG. 6. By way of comparison, the series-connected SAC 210 uses the same full-bridge input circuit topology, including switches S1, S2, S3, and S4, driving the resonant circuit including capacitor C and the input winding, having N1 turns, with the input voltage $V_{IN}$, as shown in FIG. 5. However, a center-tap output winding, having 2*N2 turns, is used in the output circuit, which includes switches S5, S6, S7, and S8, connected to rectify the voltage impressed across the output windings and delivering the output voltage, $V_O$. The system voltage transformation ratio of the series-connected SAC 210 (FIG. 6) is essentially a function of the transformer turns ratio: $K_{SYS} = V_O/V_{SYS} = N2/(N1 + 2*N2)$; as is the voltage transformation ratio from input circuit to output circuit: $K_{DC} = V_O/V_{IN} = N2/N1$.

The converter 210 of FIG. 6 differs from the series-connected converter 200 (FIG. 5) in that the input voltage, $V_{IN}$, presented to the input circuit is equal to the source voltage, $V_S$, reduced by twice the output voltage, $V_O$:

$$V_{IN\text{-}210} = V_S - 2V_O \qquad (14)$$

as suggested by the addition of N2 turns in the output winding of the transformer. Also, each output switch (S5, S6, S7 and S8) in the converter 210 is subjected to twice the output voltage, $V_O$, with the upper output switches (S5 and S7) each carrying an average of half of the input current, $I_{IN}$, and the lower output switches (S6 and S8) each carrying an average of half of the difference between the load current, $I_L$, and the input current, $I_{IN}$. Using the same analysis as described above, summing the product of maximum voltage across ($V_n$) and average current ($I_n$) through each switch (N=1 through 8), the total power processed by the converter 210 of FIG. 6 is:

$$P_{210} = 2*V_{IN}*I_{IN} + 2*V_O*I_{IN} + 2*V_O*(I_L - I_{IN}) \qquad (15)$$

Using the system voltage transformation ratio, $K_{SYS} = V_O/V_S$ in equation (14), the input voltage may be expressed as:

$$V_{IN\text{-}210} = V_O*((1/K_{SYS}) - 2) \qquad (16)$$

Recognizing that in an ideal converter the input power equals the output power $V_S * I_{IN} = V_O * I_L$ the input current may be expressed as:

$$I_{IN} = K_{SYS}*I_L \qquad (17)$$

Making the appropriate substitutions into equation (15), the total power processed by series-connected converter 210 (FIG. 6) reduces to:

$$P_{210} = 4*V_O*I_L*(1 - K_{SYS}) \qquad (18)$$

which may be further reduced to express the total power processed by the series-connected converter 210 using a center-tap output winding as shown in FIG. 6 as a function of load power ($P_{Load} = V_O*I_L$) and system voltage transformation ratio:

$$P_{210} = 4*P_{Load}*(1 - K_{SYS}) \qquad (19)$$

Which is the same result obtained in equation (12) above for the series-connected converter 200 in FIG. 5.

There may be certain advantages of one series-connected topology over the other depending upon the application. For example, the transformer in the converter 200 (FIG. 5) has N2 fewer turns than in the transformer of the converter 210 (FIG. 6) offering reduced winding losses. However, the input switches (S1, S2, S3 and S4) in the converter 210 (FIG. 6) are exposed to lower voltages than in the converter 200 (FIG. 5) which may afford lower switch conduction losses. Also, two of the output switches (S5 and S7) in converter 210 (FIG. 6) carry much less current and may be implemented with smaller and more cost effective devices than in converter 200 (FIG. 5).

Negative Input-Positive Output

Referring to FIG. 7, another series-connected SAC-based converter 215 is shown configured to receive a negative source voltage, $V_S$, and deliver a positive output voltage.

(The topology shown in FIG. 7 may alternatively be adapted to receive a positive source voltage and deliver a negative output voltage.) Converter 215 may be viewed as a variation of the converter 210 (FIG. 6) in which the input and output circuit positions have been rearranged with the output terminal serving as the common terminal. The converter 215 of FIG. 7 differs from the converter 210 (FIG. 6) in that the absolute value of the input voltage, $V_{IN}$, presented to the input circuit is equal to the absolute value of the source voltage, $V_S$, reduced by the absolute value of the output voltage, $V_O$ (compared to twice the output voltage in FIG. 6) because of the polarity change from input to output:

$$|V_{IN\text{-}215}|=|V_S|-|V_O| \tag{20}$$

as also suggested by the transformer configuration. Also, the upper output switches (S5 and S7) each carry an average of half of the output current, $I_O$, which equals the load current, $I_L$ in FIG. 7, compared to the difference between the load current, $I_L$, and the input current, $I_{IN}$, in FIG. 6. Once again, summing the product of maximum voltage across ($V_n$) and average current ($I_n$) through each switch (N=1 through 8) as described above, the total power processed by the converter 215 of FIG. 7 is:

$$P_{215}=2*V_{IN}*I_{IN}+2*V_O*I_{IN}+2*V_O*I_L \tag{21}$$

which, when reduced using equations (17) and (20), becomes:

$$P_{215}=4*P_{Load} \tag{22}$$

A comparison of the power processed by the converter 215 (equation (22); FIG. 7) with the power processed by the isolated converter 25 (equation (9); FIG. 4) may indicate no efficiency advantage, however, the input switches (S1, S2, S3 and S4) in the series-connected converter 215 of FIG. 7 are subjected to lower voltages potentially affording use of better figure of merit switches leading to potential efficiency improvements. Furthermore, the absence of isolation-related design constraints in such an integrated converter may be used to increase power density.

The converters 20 (FIG. 2), 200 (FIG. 5), 210 (FIGS. 6), and 215 (FIG. 7) are examples of a class of series-connected converters in which at least a portion of the output circuit is connected in series with the input circuit such that the absolute value of the voltage, $V_{IN}$, presented to the input circuit is equal to the absolute value of the source voltage $V_S$, minus N times the absolute value of the output voltage, $V_O$, where the value of N is at least 1:

$$|V_{IN}|=|V_S|-N*|V_O| \tag{23}$$

The value of N will vary depending upon the converter topology used, e.g. a center-tap secondary or not, polarity reversing or not, etc. In the examples described above: N=1 for converters 20 (FIG. 2), 200 (FIG. 5), and 215 (FIG. 7) and N=2 for converter 210 (FIG. 6) as shown in equation 14. Although a full bridge switch configuration is preferred for its superior noise performance, half-bridge switch configurations may also be deployed in the input circuitry, the output circuitry, or both.

The disclosure is described above with reference to drawings. These drawings illustrate certain details of specific embodiments that implement the systems, apparatus, and/or methods of the present disclosure. However, describing the disclosure with drawings should not be construed as imposing on the disclosure any limitations that may be present in the drawings. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

It should be noted that although the disclosure provided herein may describe a specific order of method steps, it is understood that the order of these steps may differ from what is described. Also, two or more steps may be performed concurrently or with partial concurrence. It is understood that all such variations are within the scope of the disclosure.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. An apparatus comprising:
    a power distribution system comprising a source for providing power at a DC source voltage $V_S$;
    a bus converter comprising an input circuit and an output circuit, the bus converter being adapted to convert power from the input circuit to the output circuit at a substantially fixed voltage transformation ratio, $K_{DC}$, at an output current, wherein an input voltage $V_{IN}$ is applied to the input circuit and an output voltage $V_{OUT}$ is produced by the output of the bus converter, and wherein the substantially fixed voltage transformation ratio can be represented as $K_{DC}=V_{OUT}/V_{IN}$;
    a power distribution bus connected to distribute power from the output circuit of the bus converter at the output voltage $V_{OUT}$; and
    a plurality of regulators, wherein each regulator comprises a regulator input connected to the power distribution bus to receive power from the output circuit of the bus converter and a regulator output connected to supply power to a respective load, the plurality of regulators each being separated by a distance from the bus converter;
    wherein the input circuit of the bus converter and at least a portion of the output circuit of the bus converter are galvanically connected in series across the source such that an absolute value of the input voltage $V_{IN}$ applied to the input circuit is approximately equal to the absolute value of the DC source voltage $V_S$ minus a number N times the absolute value of the output voltage $V_{OUT}$, where N is at least 1;
    wherein the bus converter comprises an inductive component and one or more power switches in the input circuit, the output circuit, or both; and
    wherein a current flowing in the inductive component charges and discharges capacitances in the bus converter reducing a voltage across said one or more switches prior to turning ON said one or more switches.

2. The apparatus of claim 1, wherein both the input circuit and the output circuit comprise full-bridge circuits, wherein the input circuit comprises a winding having a first number of turns, wherein the output circuit comprises a winding having a second number of turns, and wherein the voltage transformation ratio is a function of a ratio of the first number of turns to the second number of turns.

3. The apparatus of claim 1, wherein the output circuit comprises a center-tap output circuit comprising two windings, wherein each winding comprises a same number of turns, and wherein N is equal to approximately 2, such that the input voltage $V_{IN}$ is approximately equal to the DC source voltage $V_S$ minus 2 times the output voltage $V_{OUT}$.

4. The apparatus of claim 1, wherein the bus converter is configured to receive an input voltage $V_{IN}$ at the input circuit characterized by a first polarity and output an output voltage $V_{OUT}$ from the output circuit characterized by a second polarity, the second polarity being opposite the first polarity.

5. The apparatus of claim 1, wherein the bus converter comprises:
a transformer, and a resonant circuit including the transformer having a characteristic resonant frequency and period, the input circuit including two or more primary switches connected to drive the resonant circuit and the output circuit being connected to receive power from the transformer; and
a switch controller adapted to operate the primary switches in a series of converter operating cycles, each converter operating cycle characterized by two power transfer intervals of essentially equal duration each interval having a duration less than the characteristics resonant period, during which one or more of the primary switches are ON and power is transferred from the input to the output via the transformer.

6. The apparatus of claim 1, wherein the bus converter is a self-contained assembly adapted to be installed as a unit.

7. The apparatus of claim 1, further comprising a circuit board, wherein the bus converter and at least one regulator are assembled to the circuit board, and the regulator is configured to supply power to an integrated circuit.

8. The apparatus of claim 1, further comprising a clamp circuit connected to prevent the output voltage, $V_{OUT}$, from exceeding a predetermined level.

9. An apparatus comprising:
a power converter comprising an input circuit and an output circuit, wherein the power converter is configured to receive power from a power distribution system comprising a source for providing power at a DC source voltage $V_S$, the power converter being adapted to convert power from the input circuit to the output circuit at a substantially fixed voltage transformation ratio, $K_{DC}$, at an output current, wherein an input voltage $V_{IN}$ is applied to the input circuit and an output voltage $V_{OUT}$ is produced by the output of the power converter, and wherein the substantially fixed voltage transformation ratio can be represented as $K_{DC}=V_{OUT}/V_{IN}$, wherein the power converter further comprises:
a series connection between the input circuit of the power converter and at least a portion of the output circuit of the power converter across the source, such that an absolute value of the input voltage $V_{IN}$ applied to the input circuit is approximately equal to the absolute value of the DC source voltage $V_S$ minus a number N times the absolute value of the output voltage $V_{OUT}$, where N is at least 1;
wherein the power converter comprises an inductive component and one or more power switches in the input circuit, the output circuit, or both; and
wherein a current flowing in the inductive component charges and discharges capacitances in the power converter reducing a voltage across said one or more switches prior to turning ON said one or more switches.

10. The apparatus of claim 9, wherein both the input circuit and the output circuit comprise full-bridge circuits, wherein the input circuit comprises a winding having a first number of turns, wherein the output circuit comprises a winding having a second number of turns, and wherein the voltage transformation ratio is a function of a ratio of the first number of turns to the second number of turns.

11. The apparatus of claim 9, wherein the output circuit comprises a center-tap output circuit comprising two windings, wherein each winding comprises a same number of turns, and wherein N is approximately equal to 2, such that the input voltage $V_{IN}$ is approximately equal to the DC source voltage $V_S$ minus 2 times the output voltage $V_{OUT}$.

12. The apparatus of claim 9, wherein the power converter is configured to receive an input voltage $V_{IN}$ at the input circuit characterized by a first polarity and output an output voltage $V_{OUT}$ from the output circuit characterized by a second polarity, the second polarity being opposite the first polarity.

13. The apparatus of claim 9, wherein the power converter comprises:
a transformer, and a resonant circuit including the transformer having a characteristic resonant frequency and period, the input circuit including two or more primary switches connected to drive the resonant circuit and the output circuit being connected to receive power from the transformer; and
a switch controller adapted to operate the primary switches in a series of converter operating cycles, each converter operating cycle characterized by two power transfer intervals of essentially equal duration each interval having a duration less than the characteristics resonant period, during which one or more of the primary switches are ON and power is transferred from the input to the output via the transformer.

14. The apparatus of claim 9, wherein the power converter is part of a bus converter that is a self-contained assembly adapted to be installed as a unit.

15. The apparatus of claim 9, further comprising a circuit board, and wherein the power converter is configured to supply power to a plurality of regulators over a power distribution bus, the regulators disposed at a distance to the power converter, and wherein at least one of the regulators is assembled to the circuit board and configured to supply power to an integrated circuit.

16. An apparatus comprising:
a bus converter comprising an input circuit and an output circuit, wherein the bus converter is configured to receive power from a power distribution system comprising a source for providing power at a DC source voltage $V_S$, the bus converter being adapted to convert power from the input circuit to the output circuit at a substantially fixed voltage transformation ratio, $K_{DC}$, at an output current, wherein an input voltage $V_{IN}$ is applied to the input circuit and an output voltage $V_{OUT}$ is produced by the output of the bus converter, and wherein the substantially fixed voltage transformation ratio can be represented as $K_{DC}=V_{OUT}/V_{IN}$;
a power distribution bus connected to distribute power from the output circuit of the bus converter at the output voltage $V_{OUT}$; and
a plurality of regulators, wherein each regulator comprises a regulator input connected to the power distribution bus to receive power from the output circuit of the bus converter and a regulator output connected to supply power to a respective load, the plurality of regulators each being separated by a distance from the bus converter;

wherein the input circuit of the bus converter and at least a portion of the output circuit of the bus converter are connected in series across the source such that an absolute value of the input voltage $V_{IN}$ applied to the input circuit is approximately equal to the absolute value of the DC source voltage $V_S$ minus a number N times the absolute value of the output voltage $V_{OUT}$, where N is at least 1;

wherein the bus converter comprises an inductive component and one or more power switches in the input circuit, the output circuit, or both; and wherein a current flowing in the inductive component charges and discharges capacitances in the bus converter reducing a voltage across said one or more switches prior to turning ON said one or more switches.

17. The apparatus of claim 16, wherein both the input circuit and the output circuit comprise full-bridge circuits, wherein the input circuit comprises a winding having a first number of turns, wherein the output circuit comprises a winding having a second number of turns, and wherein the voltage transformation ratio is a function of a ratio of the first number of turns to the second number of turns.

18. The apparatus of claim 16, wherein the output circuit comprises a center-tap output circuit comprising two windings, wherein each winding comprises a same number of turns, and wherein N is equal to 2, such that the input voltage $V_{IN}$ is approximately equal to the DC source voltage $V_S$ minus 2 times the output voltage $V_{OUT}$.

19. The apparatus of claim 16, wherein the bus converter is a self-contained assembly adapted to be installed as a unit.

20. The apparatus of claim 16, wherein the bus converter is configured to receive an input voltage $V_{IN}$ at the input circuit characterized by a first polarity and output an output voltage $V_{OUT}$ from the output circuit characterized by a second polarity, wherein the first polarity is opposite the second polarity.

21. The apparatus of claim 16, wherein the bus converter comprises:

a transformer, and a resonant circuit including the transformer having a characteristic resonant frequency and period, the input circuit including two or more primary switches connected to drive the resonant circuit and the output circuit being connected to receive power from the transformer; and a switch controller adapted to operate the primary switches in a series of converter operating cycles, each converter operating cycle characterized by two power transfer intervals of essentially equal duration each interval having a duration less than the characteristics resonant period, during which one or more of the primary switches are ON and power is transferred from the input to the output via the transformer.

22. An apparatus comprising:

an intermediate bus architecture power distribution system for an electrical system comprising a source for providing power at a DC source voltage;

a circuit board comprising a bus converter, the bus converter comprising an input circuit, the input circuit comprising a primary transformer winding, the bus converter further comprising an output circuit, the output circuit comprising a secondary transformer winding, wherein the primary and secondary transformer windings are galvanically connected in series, and wherein the bus converter is configured to provide power to a power distribution bus that is not galvanically isolated from the source; and the circuit board further comprising a plurality of regulators, wherein each regulator comprises a regulator input connected to the power distribution bus to receive power from the output circuit of the bus converter and a regulator output connected to supply power to a respective load, the plurality of regulators each being separated by a distance from the bus converter.

23. The apparatus of claim 22, wherein the bus converter is adapted to convert power from the input circuit to the output circuit at a substantially fixed voltage transformation ratio, $K_{DC}$, at an output current, wherein an input voltage $V_{IN}$ is applied to the input circuit and an output voltage $V_{OUT}$ is produced by the output of the bus converter, and wherein the substantially fixed voltage transformation ratio can be represented as $K_{DC}=V_{OUT}/V_{IN}$; and wherein the input circuit of the bus converter and at least a portion of the output circuit of the bus converter are connected such that an absolute value of the input voltage $V_{IN}$ applied to the input circuit is approximately equal to the absolute value of the DC source voltage $V_S$ minus a number N times the absolute value of the output voltage $V_{OUT}$, where N is at least 1.

24. The apparatus of claim 22, wherein the bus converter is a self-contained assembly adapted to be installed as a unit.

25. The apparatus of claim 1 wherein the input circuit comprises a primary winding and primary switches connected to the primary winding, the output circuit comprises a secondary winding and secondary switches connected to the secondary winding, and a controller for operating the switches in a series of converter operating cycles, wherein the primary and secondary windings are connected in series during at least a portion of each converter operating cycle.

26. The apparatus of claim 9 wherein the input circuit comprises a primary winding and primary switches connected to the primary winding, the output circuit comprises a secondary winding and secondary switches connected to the secondary winding, and a controller for operating the switches in a series of converter operating cycles, wherein the primary and secondary windings are connected in series during at least a portion of each converter operating cycle.

27. The apparatus of claim 16 wherein the input circuit comprises a primary winding and primary switches connected to the primary winding, the output circuit comprises a secondary winding and secondary switches connected to the secondary winding, and a controller for operating the switches in a series of converter operating cycles, wherein the primary and secondary windings are connected in series during at least a portion of each converter operating cycle.

28. The apparatus of claim 1 wherein the voltage across said one or more power switches is reduced to essentially zero volts prior to turning ON said one or more switches.

29. An apparatus comprising:

a power distribution system comprising a source for providing power at a DC source voltage $V_S$;

a bus converter comprising an input circuit and an output circuit, the bus converter being adapted to convert power from the input circuit to the output circuit at a substantially fixed voltage transformation ratio, $K_{DC}$, at an output current, wherein an input voltage $V_{IN}$ is applied to the input circuit and an output voltage $V_{OUT}$ is produced by the output of the bus converter, and wherein the substantially fixed voltage transformation ratio can be represented as $K_{DC}=V_{OUT}/V_{IN}$;

a power distribution bus connected to distribute power from the output circuit of the bus converter at the output voltage $V_{OUT}$; and a plurality of regulators, wherein each regulator comprises a regulator input connected to the power distribution bus to receive power from the output circuit of the bus converter and a regulator output connected to supply power to a respective load, the plurality of regulators each being separated by a distance from the bus converter;

wherein the input circuit of the bus converter and the output circuit of the bus converter are galvanically connected; and wherein the bus converter comprises an inductive component and one or more power switches in the input circuit or output circuit or both; and wherein a current flowing in the inductive component charges and discharges capacitances in the converter reducing a voltage across said one or more switches prior to turn ON of said one or more switches.

30. The apparatus of claim 29 wherein the voltage across said one or more switches is reduced to essentially zero volts prior to turn ON of said one or more switches.

31. An apparatus comprising:
a power distribution system comprising a source for providing power at a DC source voltage $V_S$;
a bus converter comprising an input circuit and an output circuit, the bus converter being adapted to convert power from the input circuit to the output circuit at a substantially fixed voltage transformation ratio, $K_{DC}$, at an output current, wherein an input voltage $V_{IN}$ is applied to the input circuit and an output voltage $V_{OUT}$ is produced by the output of the bus converter, and wherein the substantially fixed voltage transformation ratio can be represented as $K_{DC}=V_{OUT}/V_{IN}$;
a power distribution bus connected to distribute power from the output circuit of the bus converter at the output voltage $V_{OUT}$; and
a plurality of regulators, wherein each regulator comprises a regulator input connected to the power distribution bus to receive power from the output circuit of the bus converter and a regulator output connected to supply power to a respective load, the plurality of regulators each being separated by a distance from the bus converter;
wherein the input circuit comprises a winding having a first number of turns, wherein the output circuit comprises a winding having a second number of turns, and wherein the voltage transformation ratio is a function of a ratio of the first number of turns to the second number of turns; and
wherein the input circuit of the bus converter and at least a portion of the output circuit of the bus converter are connected in series across the source such that an absolute value of the input voltage $V_{IN}$ applied to the input circuit is approximately equal to the absolute value of the DC source voltage $V_S$ minus a number N times the absolute value of the output voltage $V_{OUT}$, where N is at least 1.

32. An apparatus comprising:
a power distribution system comprising a source for providing power at a DC source voltage $V_S$;
a bus converter comprising an input circuit and an output circuit, the bus converter being adapted to convert power from the input circuit to the output circuit at a substantially fixed voltage transformation ratio, $K_{DC}$, at an output current, wherein an input voltage $V_{IN}$ is applied to the input circuit and an output voltage $V_{OUT}$ is produced by the output of the bus converter, and wherein the substantially fixed voltage transformation ratio can be represented as $K_{DC}=V_{OUT}/V_{IN}$;
a power distribution bus connected to distribute power from the output circuit of the bus converter at the output voltage $V_{OUT}$; and
a plurality of regulators, wherein each regulator comprises a regulator input connected to the power distribution bus to receive power from the output circuit of the bus converter and a regulator output connected to supply power to a respective load, the plurality of regulators each being separated by a distance from the bus converter;
wherein the input circuit comprises a winding having a first number of turns, wherein the output circuit comprises a winding having a second number of turns, and wherein the voltage transformation ratio is a function of a ratio of the first number of turns to the second number of turns; and
wherein the input circuit of the bus converter and the output circuit of the bus converter are galvanically connected.

33. An apparatus comprising:
a bus converter comprising an input circuit and an output circuit, the bus converter being adapted to convert power from the input circuit to the output circuit at a substantially fixed voltage transformation ratio, $K_{DC}$, at an output current, wherein an input voltage $V_{IN}$ is applied to the input circuit and an output voltage $V_{OUT}$ is produced by the output of the bus converter, and wherein the substantially fixed voltage transformation ratio can be represented as $K_{DC}=V_{OUT}/V_{IN}$;
wherein the input circuit of the bus converter and the output circuit of the bus converter are galvanically connected; and
wherein the bus converter comprises an inductive component and one or more power switches in the input circuit or output circuit or both; and
wherein a current flowing in the inductive component charges and discharges capacitances in the converter reducing a voltage across said one or more switches prior to turn ON said one or more switches.

34. The apparatus of claim 33, wherein the bus converter comprises:
a transformer, and a resonant circuit including the transformer having a characteristic resonant frequency and period, the input circuit including two or more primary switches connected to drive the resonant circuit and the output circuit being connected to receive power from the transformer; and
a switch controller adapted to operate the primary switches in a series of converter operating cycles, each converter operating cycle characterized by two power transfer intervals of essentially equal duration each interval having a duration less than the characteristics resonant period, during which one or more of the primary switches are ON and power is transferred from the input to the output via the transformer.

35. The apparatus of claim 33 wherein the voltage across said one or more switches is reduced to essentially zero volts prior to turn ON of said one or more switches.

36. The apparatus of claim 33 wherein the input circuit of the bus converter and at least a portion of the output circuit of the bus converter are connected in series across the source such that an absolute value of the input voltage $V_{IN}$ applied to the input circuit is approximately equal to the absolute value of the DC source voltage $V_S$ minus a number N times the absolute value of the output voltage $V_{OUT}$, where N is at least 1.

37. The apparatus of claim 33, wherein the input circuit comprises a first winding having a first number of turns, wherein the output circuit comprises a second winding having a second number of turns, and wherein the voltage transformation ratio is a function of a ratio of the first number of turns to the second number of turns.

38. The apparatus of claim 37, wherein at least a portion of the input circuit of the bus converter is connected in series with at least a portion of the output circuit of the bus converter such that an absolute value of a voltage applied to the first winding is approximately equal to the absolute value of the input voltage, $V_{IN}$, minus a number N times the absolute value of the output voltage $V_{OUT}$, where N is at least 1.

39. The apparatus of claim 22 wherein the bus converter comprises an inductive component and one or more power switches in the input circuit, the output circuit, or both, and wherein a current flowing in the inductive component charges and discharges capacitances in the bus converter reducing a voltage across said one or more switches prior to turning ON said one or more switches.

40. The apparatus of claim 22 wherein at least one of the regulators is assembled to the circuit board and configured to supply power to an integrated circuit.

* * * * *

Disclaimer

10,199,950 B1 - Patrizio Vinciarelli, Boston, MA (US); Andrew D'Amico, Marina Del Rey, CA (US). POWER DISTRIBUTION ARCHITECTURE WITH SERIES-CONNECTED BUS CONVERTER. Patent dated February 5, 2019. Disclaimer filed February 16, 2024, by the Vicor Corporation.

I hereby disclaim the following complete Claims 22, 24, 39 and 40 of said patent.

*(Official Gazette, March 26, 2024)*